United States Patent
Desjardien et al.

(10) Patent No.: US 10,086,596 B2
(45) Date of Patent: Oct. 2, 2018

(54) APPARATUS AND METHOD FOR AUTOMATED LAYUP OF COMPOSITE STRUCTURES

(71) Applicant: The Boeing Company, Chicago, IL (US)

(72) Inventors: Matthew R. Desjardien, Kenmore, WA (US); Blake Rafferty, Seattle, WA (US); Michael Karas, Seattle, WA (US); Mark S. Bunker, Renton, WA (US); Erik Lund, Issaquah, WA (US); Garrett C. Hanson, Renton, WA (US); Stephen G. Holley, Gig Harbor, WA (US); Benjamin B. Lee, Tacoma, WA (US); John D. O'Connell, Snohomish, WA (US); John D. Morris, Seattle, WA (US); Derek J. Flolid, Bothell, WA (US); Bruce S. Howard, Bellevue, WA (US); Mark C. Boberg, Bellevue, WA (US); Eric J. Walker, Bellevue, WA (US); Silas L. Studley, Seattle, WA (US); Derek Willis, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 608 days.

(21) Appl. No.: 14/656,424

(22) Filed: Mar. 12, 2015

(65) Prior Publication Data
US 2016/0263879 A1 Sep. 15, 2016

(51) Int. Cl.
B32B 41/00 (2006.01)
B29C 70/38 (2006.01)
B29C 70/54 (2006.01)
B29D 99/00 (2010.01)
(Continued)

(52) U.S. Cl.
CPC ............. *B32B 41/00* (2013.01); *B29C 70/38* (2013.01); *B29C 70/541* (2013.01);
(Continued)

(58) Field of Classification Search
CPC ..... B29C 70/38; B29C 70/541; B29C 70/382; B29C 70/384; B29C 70/386;
(Continued)

(56) References Cited

U.S. PATENT DOCUMENTS 6,893,247 B2 5/2005 Uytterhaeghe et al.
8,808,490 B2 8/2014 Hagman et al.
(Continued)

FOREIGN PATENT DOCUMENTS

DE 102011050099 A1 11/2012
FR 2791919 A1 10/2000

OTHER PUBLICATIONS

Translation of DE102011050099, Germany, Nov. 8, 2012, Benteler Sgl Gmbh.*
(Continued)

*Primary Examiner* — George R Koch

(57) ABSTRACT

An apparatus for forming a material layer onto a form tool may include at least one nosepiece configured to laterally sweep a ply carrier onto a form tool contour. The apparatus may include a pair of tension arms configured to support opposing lateral sides of a ply carrier having a material layer mounted to a lower surface thereof. The apparatus may include one or more actuators configured to position the tension arms during forming of the ply carrier to the form tool contour. The one or more actuators may be configured to sense and control lateral tension in the ply carrier during forming of the ply carrier to the form tool contour.

21 Claims, 44 Drawing Sheets

(51) Int. Cl.
*B32B 37/14* (2006.01)
*B32B 38/10* (2006.01)

(52) U.S. Cl.
CPC .......... *B29D 99/0003* (2013.01); *B32B 37/14* (2013.01); *B32B 38/10* (2013.01); *B32B 2309/16* (2013.01)

(58) Field of Classification Search
CPC . B29C 70/388; B29D 99/09003; B32B 37/14; B32B 38/18; B32B 41/00; B32B 2309/16
USPC .................................................. 156/360, 361
See application file for complete search history.

(56) References Cited

U.S. PATENT DOCUMENTS

| | | | |
|---|---|---|---|
| 2003/0057611 A1* | 3/2003 | Uytterhaeghe | B29C 70/541 264/422 |
| 2009/0081443 A1 | 3/2009 | Benson et al. | |
| 2012/0153539 A1* | 6/2012 | Henderson | B29C 70/30 264/294 |
| 2014/0190625 A1 | 7/2014 | Buttrick | |
| 2014/0305592 A1 | 10/2014 | Hagman et al. | |

OTHER PUBLICATIONS

European Search Report for Appl. No. 16154688.2, dated Aug. 11, 2016.
European Search Report for Appl. No. 16154688.2, dated Jun. 26, 2018.

\* cited by examiner

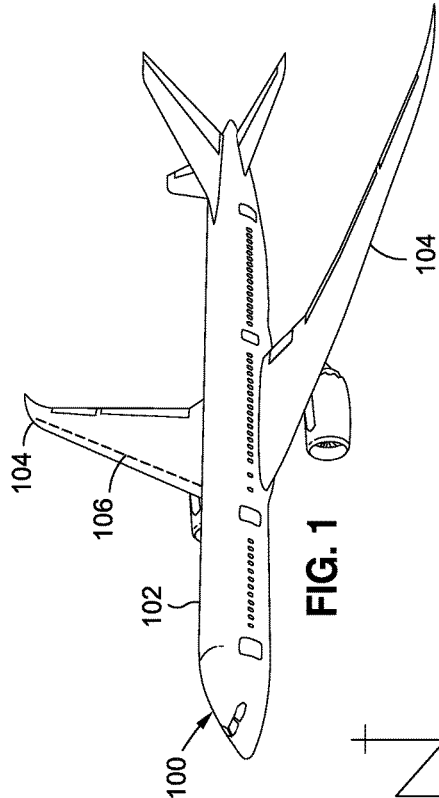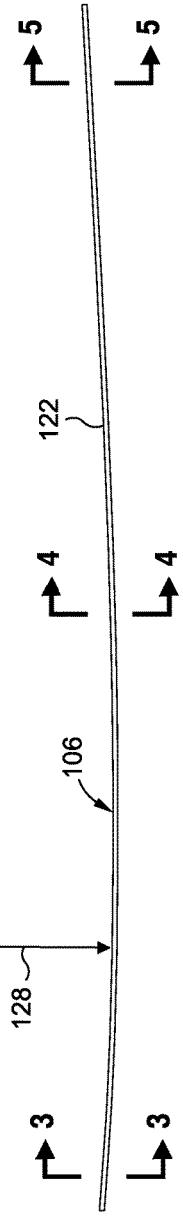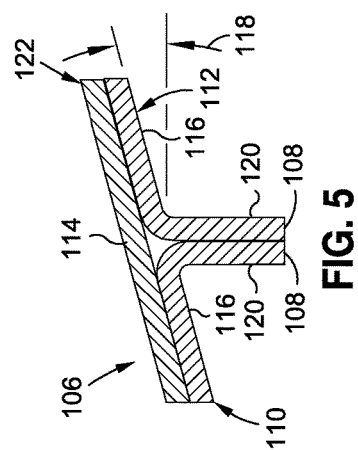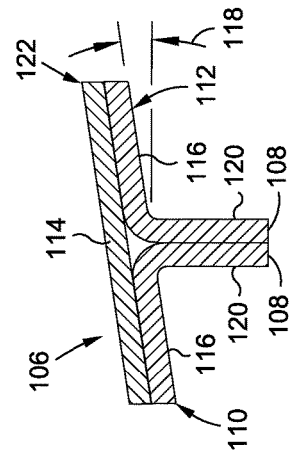

FIG. 6

STRINGER FORMING APPARATUS, 200

FRAME ASSEMBLY, 262

CHORD FRAME, 280

Z ACTUATOR 288

STOMP SYSTEM 300
- STOMP BEAM ACTUATOR 304
- STOMP BEAM 302
- STOMP FOOT ACTUATOR 312
- STOMP FOOT 310

TENSION MANAGEMENT SYSTEM, 400
- VERTICAL POSITION ACTUATOR 408
- VERTICAL COUNTER-BALANCE CYLINDER 410
- ROTATIONAL POSITION ACTUATOR 412
- ROTATIONAL COUNTER-BALANCE CYLINDER 414
- TENSION ARM, 414

FORMING SYSTEM 500
- FORMING Z' ACTUATOR 504
- FORMING BEAM, 502
- FORMING MODULE, 520
  - VERTICAL FORCE CYLINDER 532
  - LATERAL FORCE CYLINDER 540
- NOSEPIECE, 552

Z ACTUATOR 288

PLY CARRIER, 450

COURSE, 460

FORM TOOL, 220

TOOL TABLE, 246

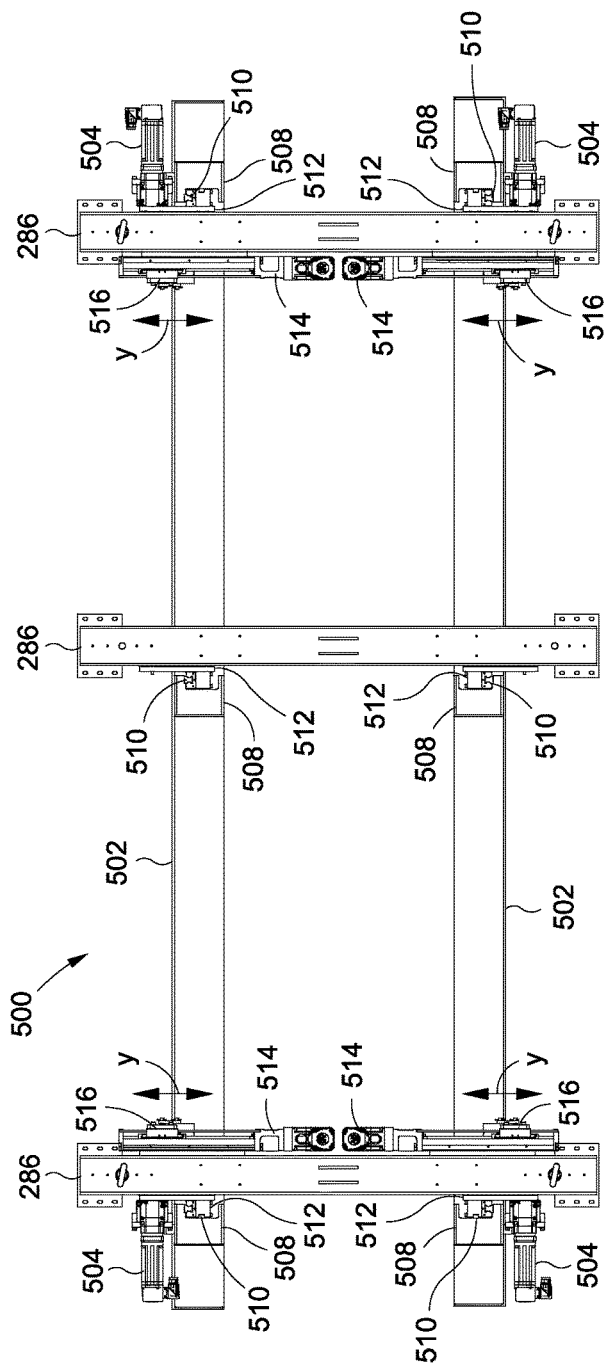
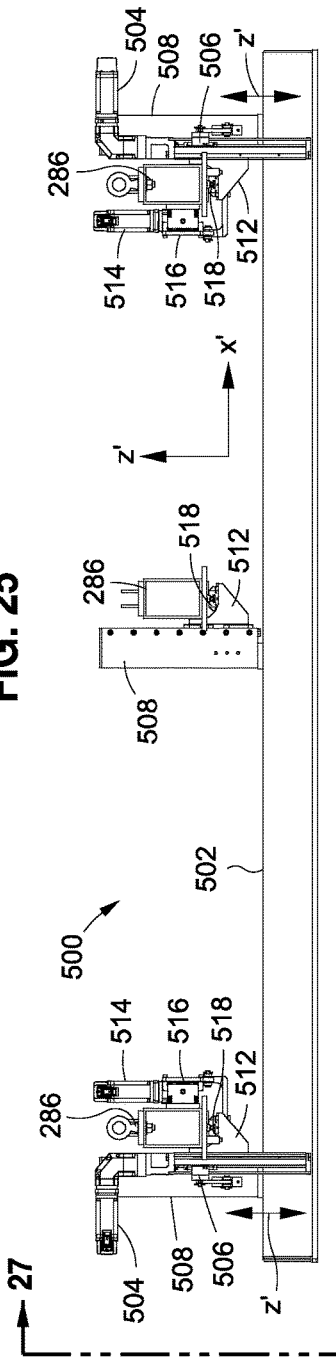
FIG. 25
FIG. 26

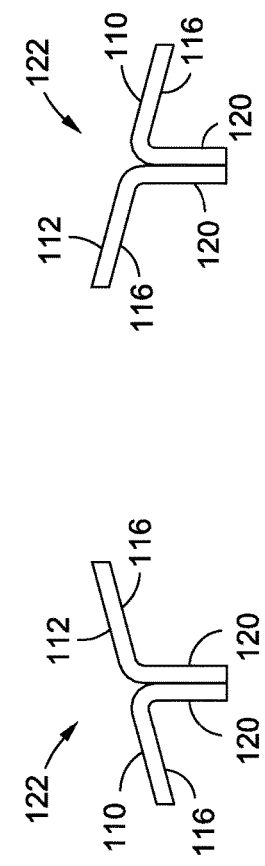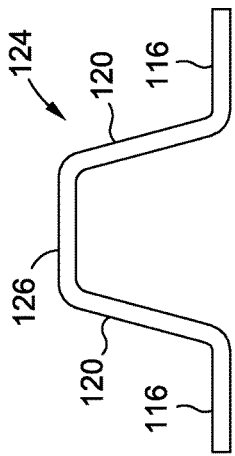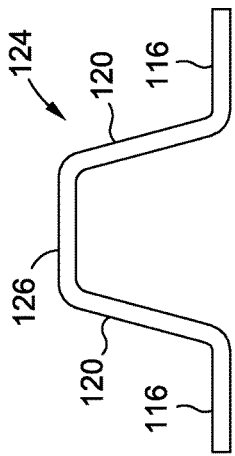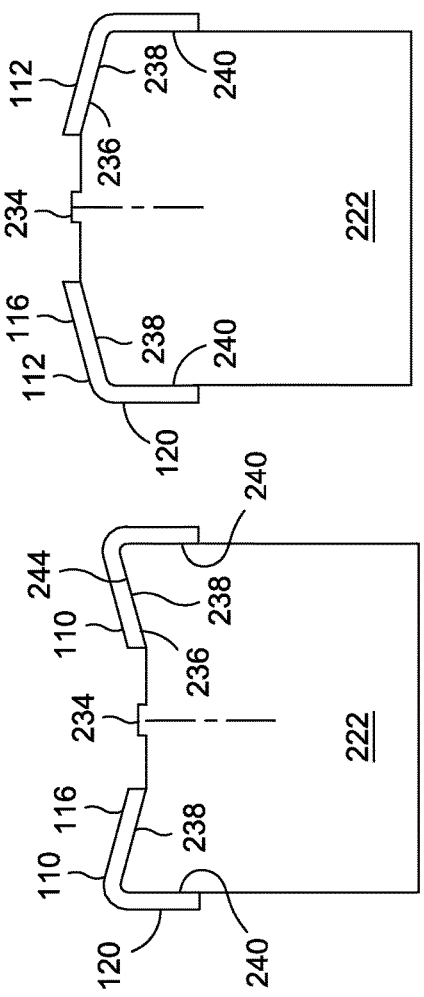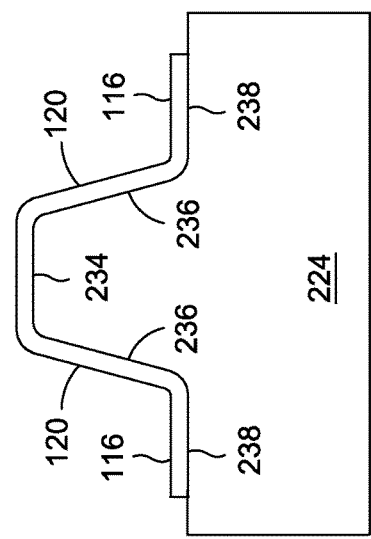

APPARATUS AND METHOD FOR AUTOMATED LAYUP OF COMPOSITE STRUCTURES

FIELD

The present disclosure relates generally to composites manufacturing and, more particularly, to systems and methods of laying up composite structures.

BACKGROUND

Composite structures are used in a wide variety of applications. In aircraft construction, composites are used in increasing quantities to form the fuselage, wings, tail section, and other components. For example, the wings of an aircraft may be constructed of composite wing skins with composite stiffening elements such as stringers extending in a spanwise direction along the wing skins. The stringers may be bonded to the wing skins to increase the bending strength and stiffness of the wing skins.

Stringers may be provided in a wide variety of cross-sectional shapes. For example, a stringer may be provided as a hat stringer having a hat-shaped cross-section including a base portion and a pair of webs extending from the base portion. The base portion may include a pair of flanges for coupling (e.g., bonding) to a skin member such as a wing skin. A stringer may also be provided as a blade stringer having a T-shaped cross-section and which may be formed by assembling a pair of L-shaped stringer halves. Each L-shaped stringer half may have a flange and a web. The webs of a pair of L-shaped stringer halves may be bonded together in back-to-back relation to form the blade stringer. The flanges of the blade stringer may be bonded to a skin member such as a wing skin.

Composite stringers may be formed by laying up a plurality of composite plies over a mandrel or form tool having the final shape of the stringer. After layup is complete, heat and/or pressure may be applied to cure the composite plies. Current methods of laying up individual composite plies over a form tool are performed manually or by machine. Manual layup is a time-consuming process requiring a large number of personnel performing a large amount of touch labor to layup multiple composite plies. The amount of touch labor may be significant for large-scale structures and high production rates. Machines such as automated tape-laying (ATL) machines may reduce the amount of touch labor for laying up composite structure. However, ATL machines are typically large and complex and may be prohibitively expensive for the total quantity of ATL machines that would be required to support a large-scale production program. In addition, ATL machines may require a large amount of machine path programming which may impact production cost and schedule.

As can be seen, there exists a need in the art for a system and method for laying up composite plies on a form tool with minimal touch labor and in an efficient and cost-effective manner.

BRIEF SUMMARY

The above-described needs associated with forming composite stringers are specifically addressed and alleviated by the present disclosure which, in an embodiment, provides an apparatus for automated forming of a material layer onto a form tool. The apparatus may include at least one nosepiece configured to laterally sweep a ply carrier onto a form tool contour. The apparatus may additionally include a pair of tension arms configured to support opposing lateral sides of a ply carrier having a material layer mounted to a lower surface thereof. The apparatus may also include one or more actuators configured to position the tension arms during forming of the ply carrier to the form tool contour. The one or more actuators may be configured to sense and control lateral tension in the ply carrier during forming of the ply carrier to the form tool contour.

In a further embodiment, disclosed is a stringer forming apparatus for laying up a course of composite material on a form tool. The apparatus may include a tension management system having a pair of tension arms configured to support opposing lateral sides of a ply carrier having a course mounted thereto. The tension management system may include one or more actuators configured to sense and control lateral tension in the ply carrier during forming to a form tool contour. The apparatus may further include a stomp system having an array of stomp foot actuators configured to clamp the ply carrier onto the form tool. The apparatus may also include a forming system having an array of forming modules each including a nosepiece configured to form the ply carrier to the form tool contour and sense and control compaction pressure applied by the nosepiece onto the ply carrier.

Also disclosed is a method of laying up a material layer. The method may include positioning a ply carrier over a form tool. A material layer may be mounted to a lower surface of the ply carrier. The method may further include conforming the ply carrier to a form tool contour. In addition, the method may include maintaining lateral tension in the ply carrier within a predetermined range during the conforming of the ply carrier to the form tool contour.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective view of an aircraft;

FIG. 2 is a side view of a stringer of an aircraft wing;

FIG. 3 is a cross-sectional view of a blade stringer taken along line 3 of FIG. 2 and illustrating a T-shaped cross-section of the blade stringer formed by assembling a pair of stringer halves in back-to-back arrangement to one another and assembled with a base charge;

FIG. 4 is a cross-sectional view of the blade stringer taken along line 4 of FIG. 2 and illustrating the stringer flange oriented at a non perpendicular flange angle relative to the web;

FIG. 5 is a cross-sectional view of the blade stringer taken along line 5 of FIG. 2 and illustrating the stringer flanges oriented at an increased flange angle relative to the flange angle of FIG. 4;

FIG. 6 is a block diagram of an example of a stringer forming apparatus for automated layup of a composite structure such as a blade stringer or a hat stringer;

FIG. 25 is a top view of the forming system of FIG. 24;

FIG. 26 is a side view of the forming system of FIG. 24;

FIGS. 43-44 are cross-sectional views of symmetrical blade form tools for respectively forming a pair of first and second stringer halves;

FIGS. 45-46 are cross-sectional views of blade stringers each assembled from a first stringer half and a second stringer half;

FIG. 47 is a cross-sectional view of a hat form tool for laying up a hat stringer;

FIG. 48 is a cross-sectional view of a hat stringer which may be formed using a stringer forming apparatus described herein;

DETAILED DESCRIPTION

Figure 7:
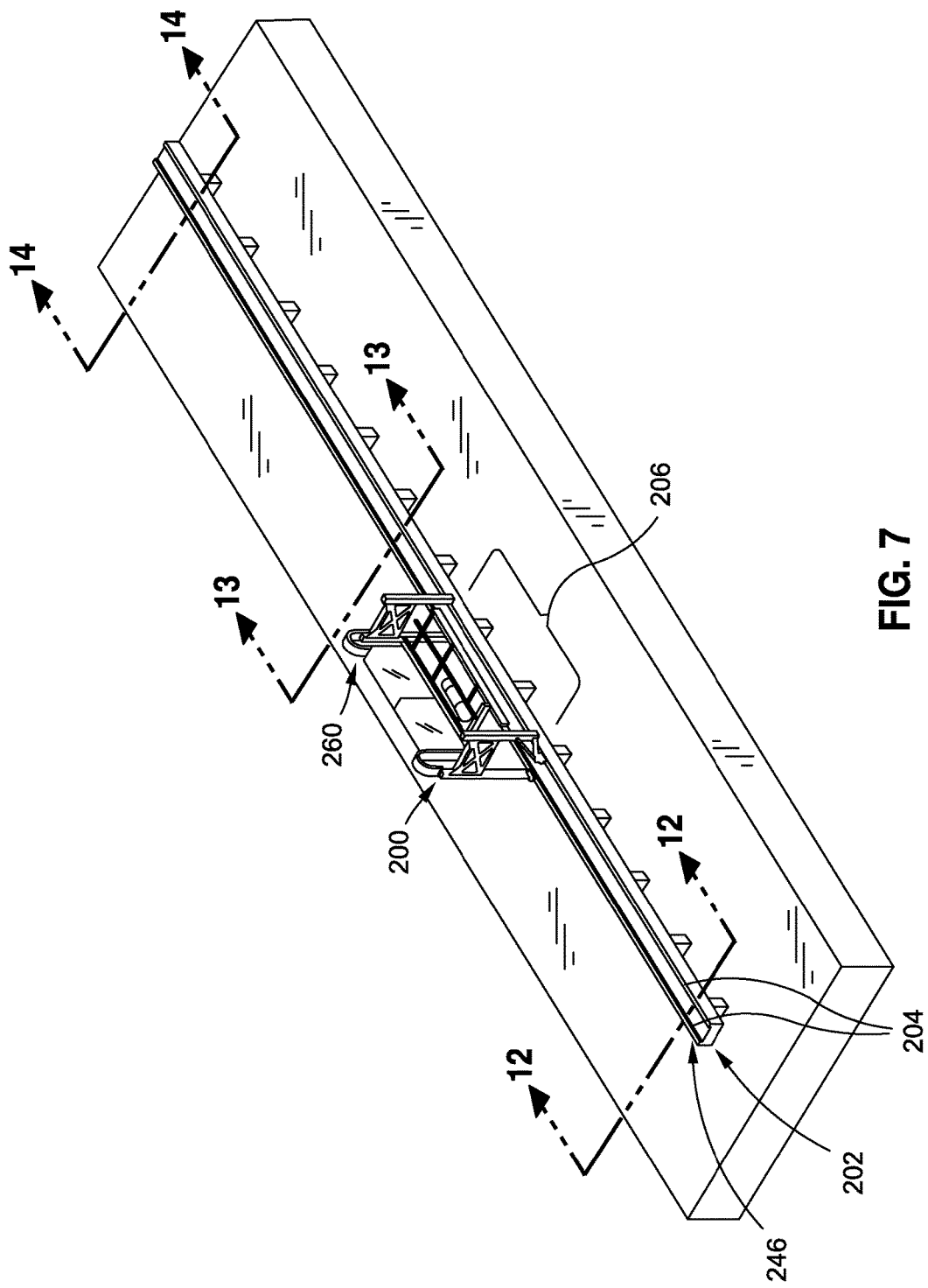
FIG. 7 is a perspective view of a stringer forming system including a stringer forming apparatus for forming a blade stringer and which may be movable along a stringer forming lane for sequential layup of composite plies on a form tool.

Referring now to the drawings wherein the showings are for purposes of illustrating preferred and various embodiments of the disclosure, shown in FIG. 1 is an aircraft 100 having a fuselage 102 and a tail section. The aircraft 100 may include a pair of wings 104 extending outwardly from the fuselage 102. The fuselage 102, the wings 104, and/or the tail section may be formed of composite material and may include stiffening components such as composite stringers 106 for increasing the bending stiffness and/or the strength of the skin members covering the fuselage 102, wings 104, and tail section. For example, the wing 104 may include a plurality of spanwise stringers 106 extending from an inboard root section of each wing 104 to an outboard tip section for increase the bending stiffness and strength of the wing skin.

FIG. 2 is a side view of an example of a T-shaped blade stringer 122 formed using a stringer forming apparatus 200 (FIG. 6) and method disclosed herein. The blade stringer 122 may have spanwise curvature which may match the spanwise curvature of the wing skin. FIGS. 3-5 illustrate the variation in cross-sectional shape of the blade stringer 122 at different locations along the span of the stringer 106 from the inboard root section to the outboard tip section. FIG. 3 shows a cross-section of the blade stringer 122 at the root section showing the T-shaped cross-section which may be formed by assembling a pair of back-to-back L-shaped stringer halves 108 with a base charge 114 covering the flanges 116. In FIG. 3, the flange 116 of each one of the stringer halves 108 is oriented perpendicularly to a web 120 of each one of the stringer halves 108. FIG. 4 shows the flanges 116 of the blade stringer 122 oriented at a non-perpendicular flange angle 118 relative to the webs 120. FIG. 5 shows the flanges 116 of the blade stringer 122 oriented at an increasing flange angle 118 relative to FIG. 4.

FIGS. 2-5 represent non-limiting examples of the spanwise curvature and variation in cross-sectional shape that may be included in a composite structure laid up using the stringer forming apparatus 200 (FIG. 6) and method disclosed herein. Although the stringer forming apparatus 200 and method is described in the context of laying up a blade stringer 122 such as for a wing 104 (FIG. 1) of an aircraft 100 (FIG. 1), the stringer forming apparatus 200 and method may be implemented for forming composite structures of any size, shape, and configuration, without limitation. In addition, the stringer forming apparatus 200 and method is not limited to forming composite structures of extended length or having a high length-to-width aspect ratio such as the stringer 106 example disclosed herein. In this regard, the stringer forming apparatus 200 and method may be implemented for laying up relatively small composite structures and/or laying up composite structures that may have a relatively small length-to-width aspect ratio.

FIG. 6 is a block diagram of an example of a stringer forming apparatus 200. The stringer forming apparatus 200 may include a frame assembly 262 configured to support one or more components of the stringer forming apparatus 200. For example, the frame assembly 262 may include a chord frame 280 which may be configured to support a stomp system 300, a tension management system 400, and a forming system 500, all of which may be operated in a coordinated manner to lay up one or more courses 460 of material (e.g., composite plies) over a mandrel or form tool 220. The form tool 220 may be supported on surface such as a tool table 246. The chord frame 280 may be mounted to the frame assembly 262 by one or more Z actuators 288. In one embodiment, a pair of Z actuators 288 may be located at each one of the opposing ends of the chord frame 280. The Z actuators 288 may be configured to adjust the vertical position of each end of the chord frame 280 relative to the form tool 220. The Z actuators 288 may also be operated to vary a pitch angle of the chord frame 280 to match the local angle at a given spanwise location of the form tool 220 to facilitate the layup of a course 460 of composite material on the form tool 220.

In FIG. 6, the stringer forming apparatus 200 may include the stomp system 300 for clamping a ply carrier 450 to the form tool 220 prior to the start of the forming process. The ply carrier 450 may include a material layer 458 (e.g., a course of composite material) mounted to or attached to a lower surface of the ply carrier 450. The material layer 458 may be formed of any material without limitation. For example, the material layer 458 may be a course 460 of composite material such as a pre-impregnated composite ply of fiber-reinforced polymer matrix material (e.g., prepreg) such as epoxy-carbon fiber prepreg. The course 460 may be formed of any type of composite material including, but not limited to, unidirectional tape, unidirectional cloth, woven fabric, chopped fiber mat, and any one of a variety of other fiber forms.

In any of the stringer forming apparatus 200 embodiments disclosed herein, the ply carrier 450 may be formed of material that has a higher degree or modulus of elasticity (e.g., in-plane stretchability) along a lengthwise direction of the ply carrier 450 relative to the in-plane stretchability or modulus of elasticity of the ply carrier 450 along the lateral direction. For example, the ply carrier 450 may be formed of a latex and fabric material configured to be stretchable or elastic along the lengthwise direction and non-stretchable or non-elastic along the lateral direction. As indicated above, the nosepieces 552 move generally along a lateral direction when conforming the ply carrier 450 and material layer 458 to the form tool 220. The higher modulus of elasticity or higher in-plane stiffness of the ply carrier 450 along the lateral direction parallel to the direction of nosepiece 552 sweep may prevent the compaction pressure of the dragging nosepieces 552 from distorting the ply carrier 450 and the material layer 458. The increased stretchability of the ply carrier 450 along the lengthwise direction may allow the stringer forming apparatus 200 to conform the ply carrier 450 and material layer 458 to spanwise curvature in the form tool contour 236 (FIG. 12) without the occurrence of distortion, wrinkles, or pleats in the material layer 458.

In FIG. 6, the stomp system 300 may include a stomp beam 302 which may be actuated by one or more stomp beam actuators 304. The stomp beam actuators 304 may be operated to vertically position the stomp beam 302 relative to the chord frame 280 during the forming process. In one example, each one of the opposing ends of the stomp beam 302 may be coupled to a corresponding end of the chord frame 280 by means of a stomp beam actuator 304. The stomp system 300 may include an array of stomp foot 310 actuators mounted to the stomp beam 302. Each one of the stomp foot actuators 312 may include a stomp foot 310. The stomp foot actuators 312 may be operated in a coordinated manner to clamp the ply carrier 450 to the form tool 220 and lock the position of the ply carrier 450 against movement during the forming process.

The stringer forming apparatus 200 (FIG. 6) may include the tension management system 400 which may be mounted to the chord frame 280 and may be configured to position and manage lateral tension 462 (FIG. 33) in the ply carrier 450 (FIG. 6) during the forming process. The tension management system 400 may include one or more tension arms 414 each supporting one of opposing lateral sides 454 (FIG. 20) of the ply carrier 450. The tension management system 400 may include one or more actuators for adjusting the vertical position and/or the angular position of the tension arms 414 relative to the chord frame 280 (FIG. 6). For example, each end of each one of the tension arms 414 may include a tension arm vertical position actuator 406 coupling the end of the tension arm 414 to the chord frame 280. The tension arm vertical position actuators 406 (FIG. 6) may be configured to adjust the vertical position of the tension arm 414 relative to the chord frame 280. The tension management system 400 may further include one or more rotational position actuators 410 configured to adjust the angular position of the tension arms 414 (FIG. 6) relative to the chord frame 280.

In FIG. 6, the tension management system 400 may also include one or more devices for counterbalancing the mass of the tension arm 414 so that lateral tension 462 (FIG. 33) in the ply carrier 450 may be accurately sensed during the process of forming the ply carrier 450 to the form tool 220. In this regard, the tension management system 400 may sense lateral tension 462 in the ply carrier 450 and maintain the lateral tension 462 within a predetermined tension range such that the material layer 458 may be applied to the form tool 220 without the formation of wrinkles or pleats. As described in greater detail below, the tension management system 400 may maintain the lateral tension 462 of the ply carrier 450 in such a manner that the material layer 458 is taught enough to prevent the ply carrier 450 and material layer 458 from contacting the form tool 220 except at the location where the nosepiece 552 is conforming the ply carrier 450 and material layer 458 to the form tool 220.

The tension management system 400 (FIG. 6) may also maintain lateral tension 462 (FIG. 33) in the ply carrier 450 (FIG. 6) such that the material layer 458 is loose enough to allow an array of nosepieces 552 (FIG. 6) to apply a desired amount of compaction pressure to the material layer 458 (FIG. 6) against the form tool 220 (FIG. 6) such that the material layer 458 may conform to the form tool contour 236. In addition, the tension management system 400 may maintain the lateral tension 462 within a predetermined range to allow the nosepieces 552 to apply an appropriate level of compaction pressure onto the ply carrier 450 to allow the material layer 458 (FIG. 6) to adhere to the substrate (e.g., to the form tool 220 or to a previously-applied material layer 458) due to the tack (e.g., stickiness) of the course 460 (FIG. 6) or material layer 458 such that the course 460 or material layer 458 remain adhered to the substrate during the process of peeling the ply carrier 450 away from the form tool 220.

In this regard, the tension management system 400 (FIG. 6) may include one or more counterbalancing cylinders. For example, a vertical counterbalance cylinder 408 (FIG. 6) may be included for each vertical position actuator 406 (FIG. 6) to counterbalance the mass of the tension arm 414 (FIG. 6) such as during vertical translation of the tension arm 414. A rotational counterbalance cylinder 412 (FIG. 6) may be included for each rotational position actuator 410 (FIG. 6) to counterbalance the mass of the tension arm 414 during pivoting or angular positioning of the tension arm 414. The counterbalance devices may advantageously remove the mass of the tension arm 414 from force-sensing mechanisms that may be included with the vertical and rotational position actuators 406, 410, and thereby allow such vertical and rotational position actuators 406, 410 to accurately sense and maintain the lateral tension 462 (FIG. 33) in the ply carrier 450 within the desired range. Further in this regard, the tension management system 400 may also sense and manage the tension in the ply carrier 450 (FIG. 6) during the forming process in a manner such that distortion, pleating, or wrinkling of the material layer 458 is avoided, and such that early separation of the material layer 458 (FIG. 6) is prevented during peeling away the ply carrier 450 from the form tool 220 (FIG. 6).

Figure 12:
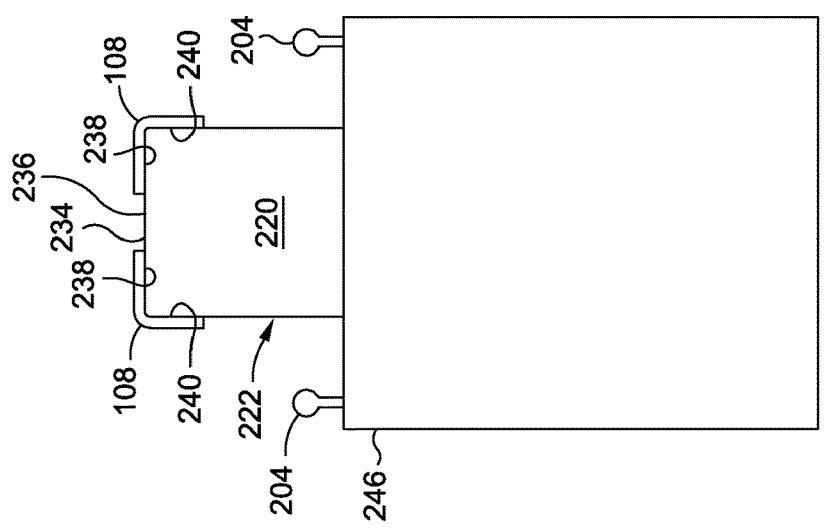
FIG. 12 is a cross-sectional view of the tool table and blade form tool taken along line 12 of FIG. 7 and illustrating the flange contour of the blade form tool oriented perpendicularly relative to the web contour on opposite sides of the blade form tool.

The forming system 500 (FIG. 6) may be operated in coordination with the stomp system 300 (FIG. 6) and the tension management during the process of conforming and compacting the ply carrier 450 (FIG. 6) and material layer 458 (FIG. 6) onto the form tool 220 and during the peeling away of the ply carrier 450 from the form tool 220 (FIG. 6). In some examples, the forming system 500 may include a pair of forming beams 502 (FIG. 6). The forming beams 502 may be operatively coupled to the chord frame 280 (FIG. 6) by one or more forming actuators. For example, each end of each forming beam 502 may be coupled to the chord frame 280 by a forming Z' actuator 504 and a forming Y actuator 514 (FIG. 6) which may be configured to position the forming beam 502 along the respective Z' axis and the Y axis. The forming system 500 may also include an array of forming modules 520 (FIG. 6) mounted to each one of the forming beams 502. Each one of the forming modules 520 may include a vertical force cylinder 532 (FIG. 6) and a lateral force cylinder 540 (FIG. 6) for manipulating the nosepiece 552 (FIG. 6) during the process of conforming the ply carrier 450 to the form tool contour 236. The vertical force cylinder 532 and the lateral force cylinder 540 of each forming module 520 may be configured to sense compaction pressure applied by the nosepiece 552 against the ply carrier 450, and maintain the compaction pressure of each nosepiece 552 within a predetermined range during the process of conforming the ply carrier 450 to the form tool contour 236 (FIG. 12).

FIG. 7 shows an example of a stringer forming apparatus 200 having at least one stringer forming lane 202 along which a stringer forming apparatus 200 may be translated. Each stringer forming lane 202 may include a tool table 246 upon which the form tool 220 may be mounted. The tool table 246 may include car rails 204 for guiding the translation of the stringer forming apparatus 200 in sequentially laying up composite plies to form a stringer. For example, in one mode of operation, the stringer forming apparatus 200 may be positioned at a first spanwise location along the forming lane 202 such as at an end of the form tool 220 (FIG. 6). A pre-kitted course (not shown) of material (e.g., a woven or unidirectional prepreg composite ply) may be attached to the lower surface 452 (FIG. 20) of the ply carrier 450 (FIG. 6). The lateral sides 454 (FIG. 20) of the ply carrier 450 may be attached to the tension arms 414 of the tension management system 400. The stomp system 300 (FIG. 6), the tension management system 400, and the forming system 500 (FIG. 6) may be operated in a coordinated manner to conform the ply carrier 450 to the form tool 220 (FIG. 6) at the first spanwise location, after which the ply carrier 450 may be peeled away leaving the course 460 (FIG. 6) on the form tool 220. The empty ply carrier 450 may be detached from the tension arms 414 (FIG. 6) of the tension management system 400, and a new ply carrier 450 containing a course 460 may be attached to the tension arms 414.

The stringer forming apparatus 200 (FIG. 7) may be moved to the next spanwise location along the stringer forming lane 202, and a second course of material may be applied to the form tool 220 in end-to-end relation with the first course of material. The process may be repeated to lay up a series of courses 460 (FIG. 6) in end-to-end relation along a desired length of the form tool 220 (FIG. 6). Additional plies may be applied over previously-laid plies in the above-described manner until the desired ply stacking sequence of the stringer is achieved. After layup is complete, the finished layup may be removed from the form tool 220 for curing and/or assembly to form a complete stringer. Although FIG. 7 shows a single stringer forming lane 202, any number of stringer forming lanes 202 may be provided. For example, a plurality of blade stringer 122 (FIG. 2) forming lanes 202 and a plurality of hat stringer 124 (FIG. 48) forming lanes 202 may be operated in the same locale.

Figure 8:
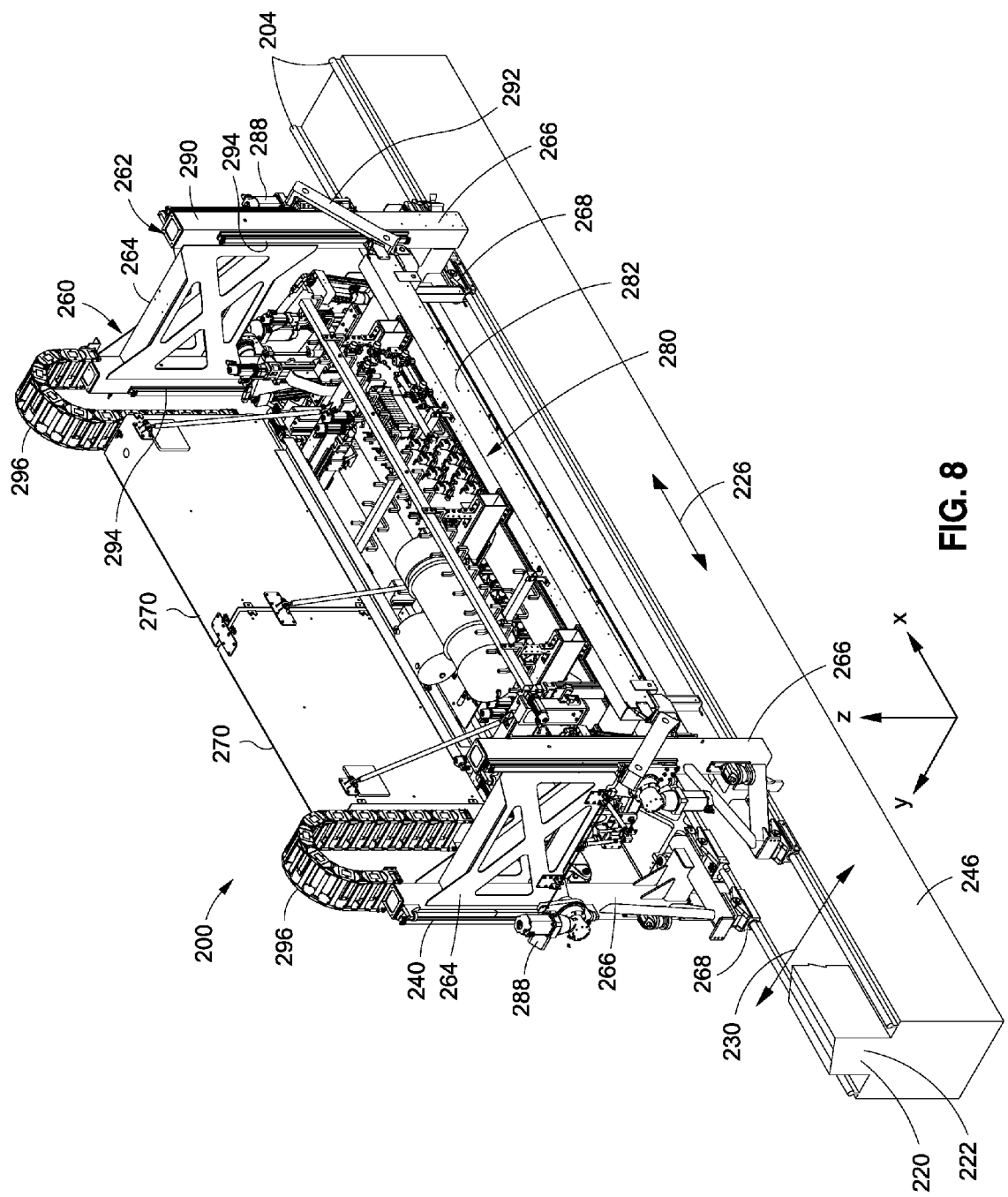
FIG. 8 is a perspective view of an example of a stringer forming apparatus configured to be movable along a pair of car rails.

FIG. 8 shows an example of a stringer forming apparatus 200 configured as a forming car 260 adapted to be movable along a pair of car rails 204 to facilitate the sequential application of a series of individual courses 460 (FIG. 6) at different spanwise locations along the form tool 220. The form tool 220 may be provided in any length. For example, in an aircraft wing, a form tool 220 for a stringer may have a length of up to 130 feet or longer. In FIG. 8, the car rails 204 are mounted on the tool table 246 which supports the form tool 220. However, the car rails 204 may be mounted on a shop floor or on another surface. As indicated above, the form tool 220 may be configured as a blade form tool 222 for forming a blade stringer 122 having a T-shaped cross-section. In another example, the form tool 220 may be configured as a hat form tool 224 for forming a hat stringer 124 having a hat-shaped cross-section. However, the form tool 220 may be provided in any one of a variety of alternative cross-sectional shapes, without limitation.

In the present disclosure, the structure and operation of the various components of the stringer forming apparatus 200 may be described with reference to rectangular coordinate systems. For example, in FIGS. 8-9, the X direction may be described as the lengthwise direction of the tool table 246. As indicated above, the stringer forming apparatus 200 may move along the X direction. The Y direction may be described as a lateral direction 230 across the width of the tool table 246. The individual forming beams 502 (FIG. 6) may move along the Y direction. The Z direction may be described as normal to the X-Y plane. Each end of the chord frame 280 may move independently along the Z direction.

In FIG. 8, the stringer forming apparatus 200 may include a frame assembly 262 for supporting the chord frame 280. The frame assembly 262 may be mounted on a track system such as the parallel car rails 204. However, in an embodiment not shown, the stringer forming apparatus 200 may be stationary or non-movable, and may be coupled to a shop floor or to another non-movable feature. In the present disclosure, the frame assembly 262 may have an opposing pair of end frames 264. Each one of the end frames 264 may have frame legs 266 that may terminate at frame feet 268 which may be supported on the car rails 204. Each end of the chord frame 280 may be coupled to an end frame 264. The stringer forming apparatus 200 may include one or more electrical enclosures 270 for housing electrical devices, switches, wiring, interconnects, and other components. The stringer forming apparatus 200 may include one or more cable carriers 296 for supporting electrical wiring extending between the end frames 264 and the chord frame 280 components. Additional devices such as an air tank 272 for pneumatic cylinders and actuators may also be mounted on the chord frame 280.

Figure 9:
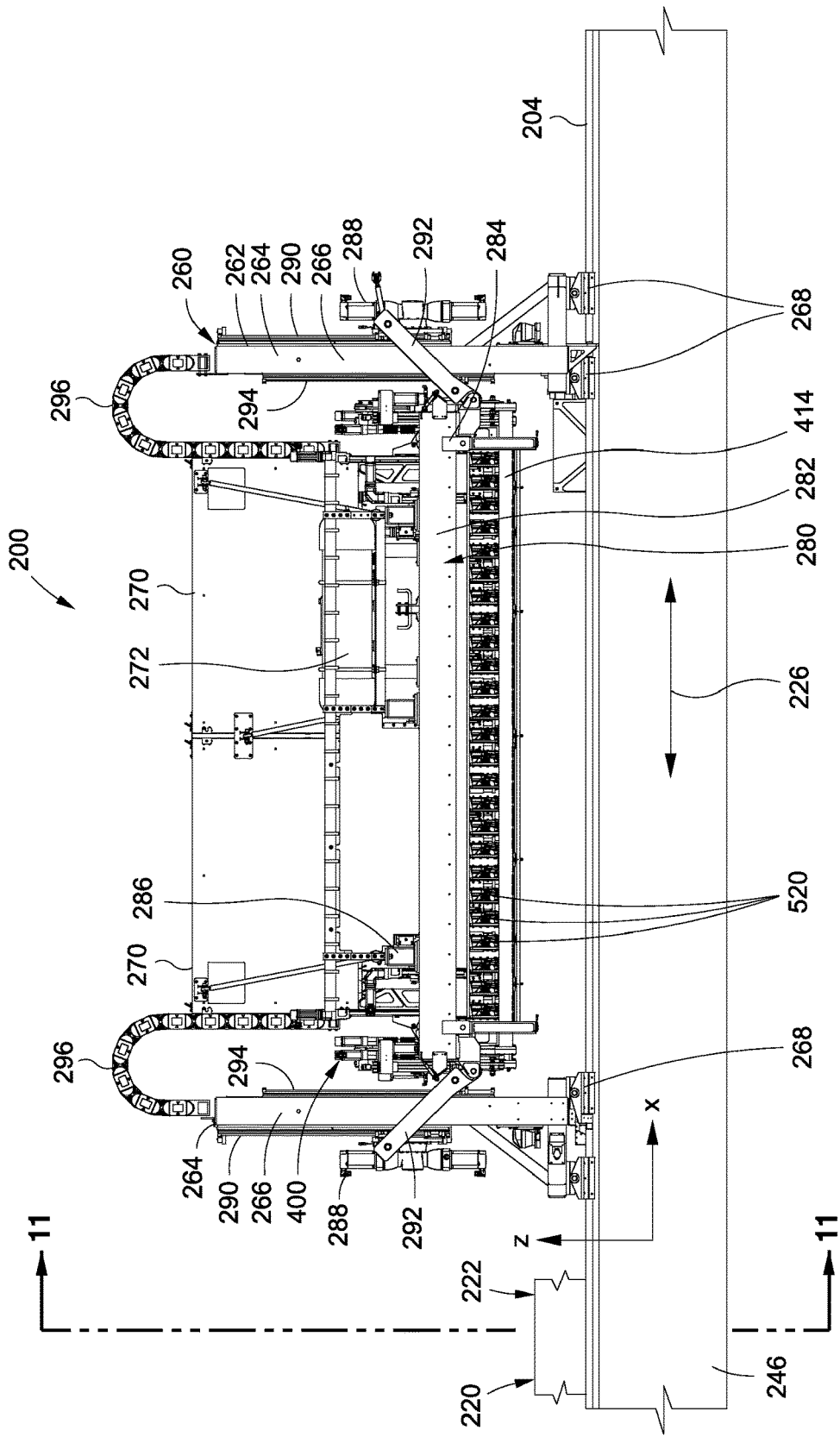
FIG. 9 is a side view of the stringer forming apparatus of FIG. 8 and illustrating a chord frame.
Figure 15:
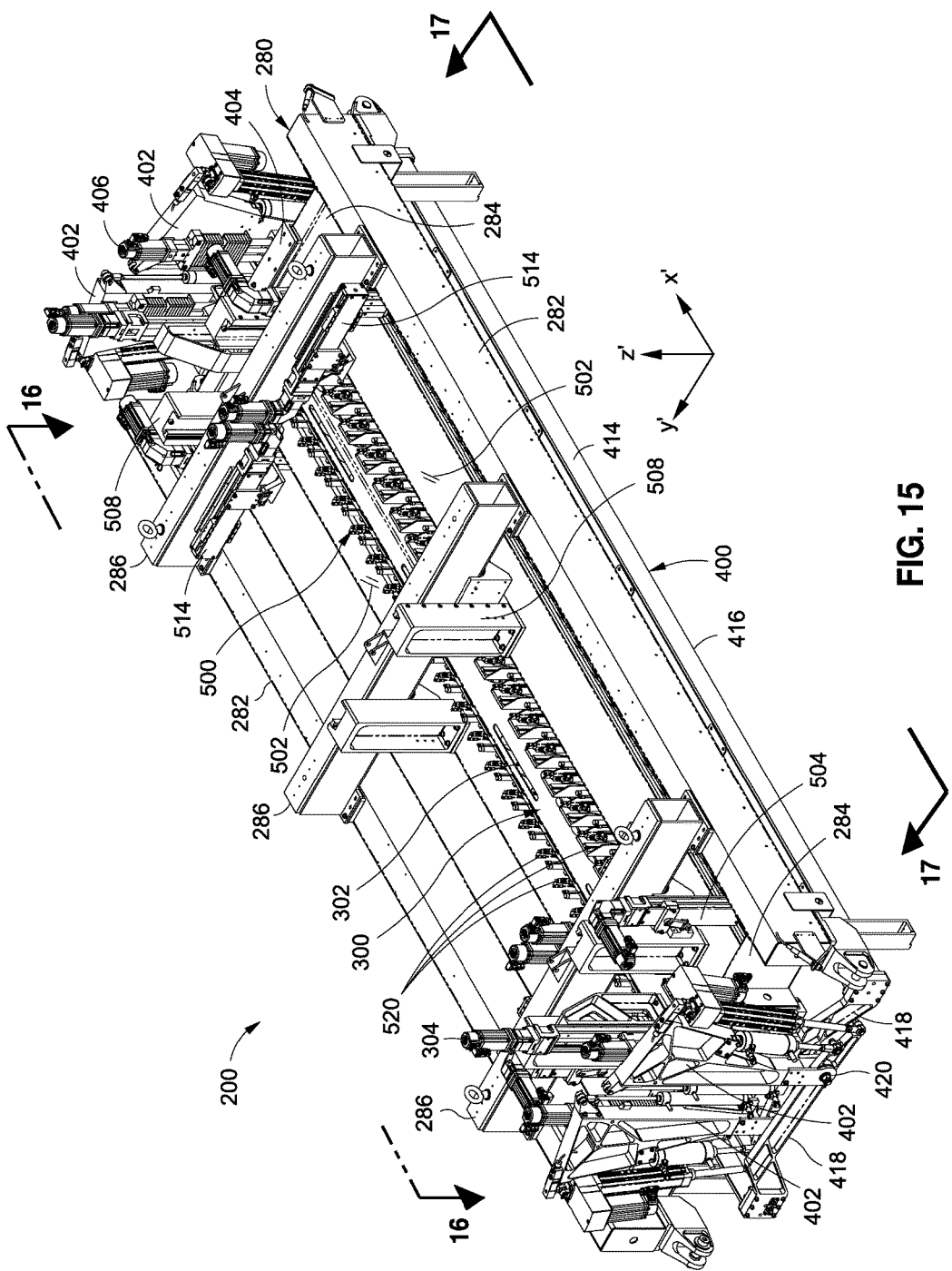
FIG. 15 is a perspective view of an example of a stomp system, a tension management system, and a forming system assembled to the chord frame.
Figure 19:
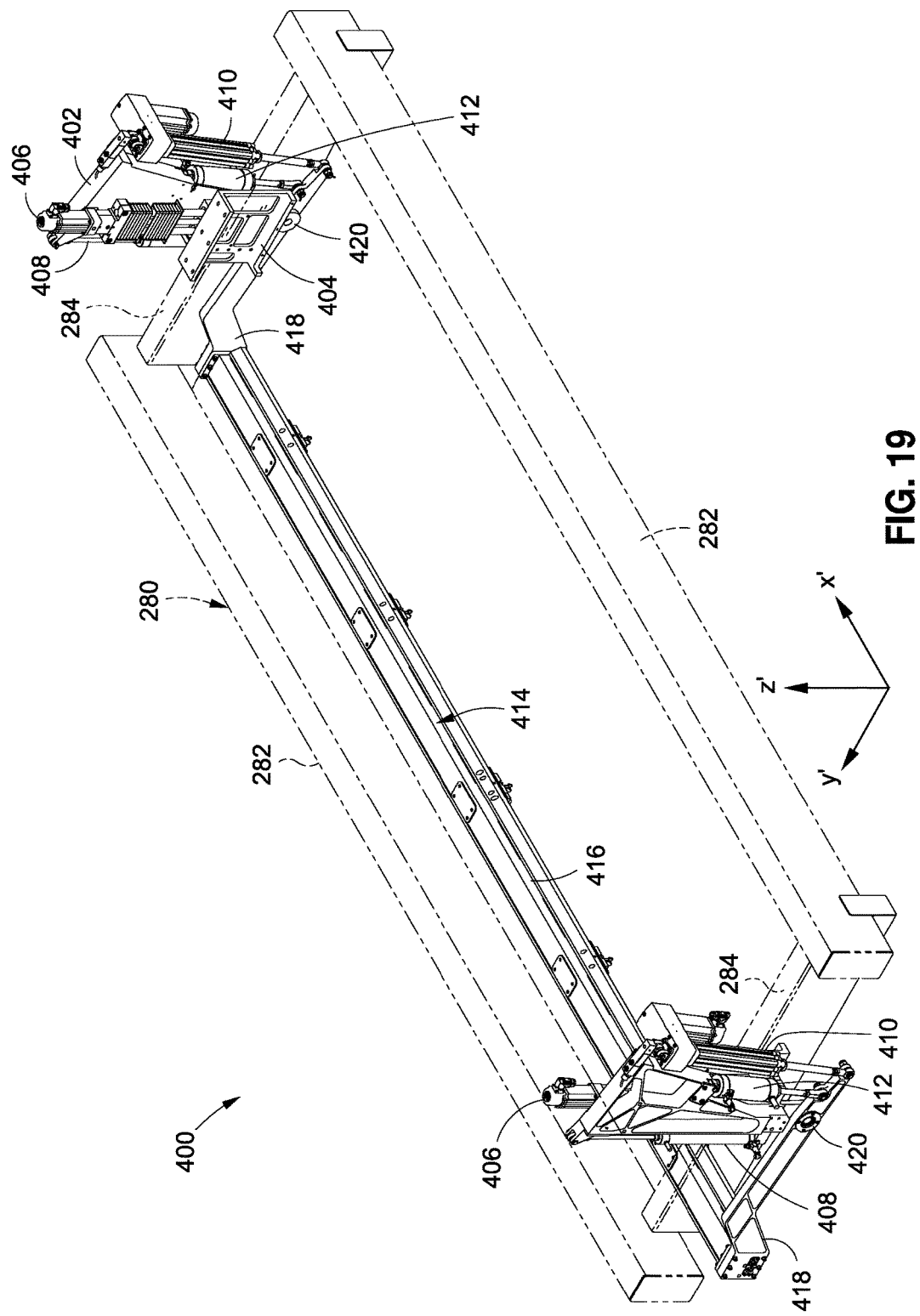
FIG. 19 is a perspective view of an example of a tension management system including a tension arm and a vertical position actuator and rotational position actuator and corresponding vertical counterbalance cylinder and rotational counterbalance cylinder.

FIG. 9 is a side view of the stringer forming apparatus 200 showing an example of the manner in which the chord frame 280 may be coupled to the end frames 264 of the frame assembly 262. The chord frame 280 may include a pair of side beams 282 extending along a lengthwise direction of the chord frame 280. In the present example of the stringer forming apparatus 200, the side beams 282 may be interconnected by end beams 284 extending between the side beams 282, as best seen in FIG. 19. The end beams 284 may be located at opposite ends of the chord frame 280. The side beams 282 may also be interconnected by one or more cross beams 286 (FIG. 15). The cross beams 286 may be oriented parallel to the end beams 284 and may extend between the side beams 282. In the example shown, the cross beams 286 may be mounted on top of the side beams 282.

Figure 10:
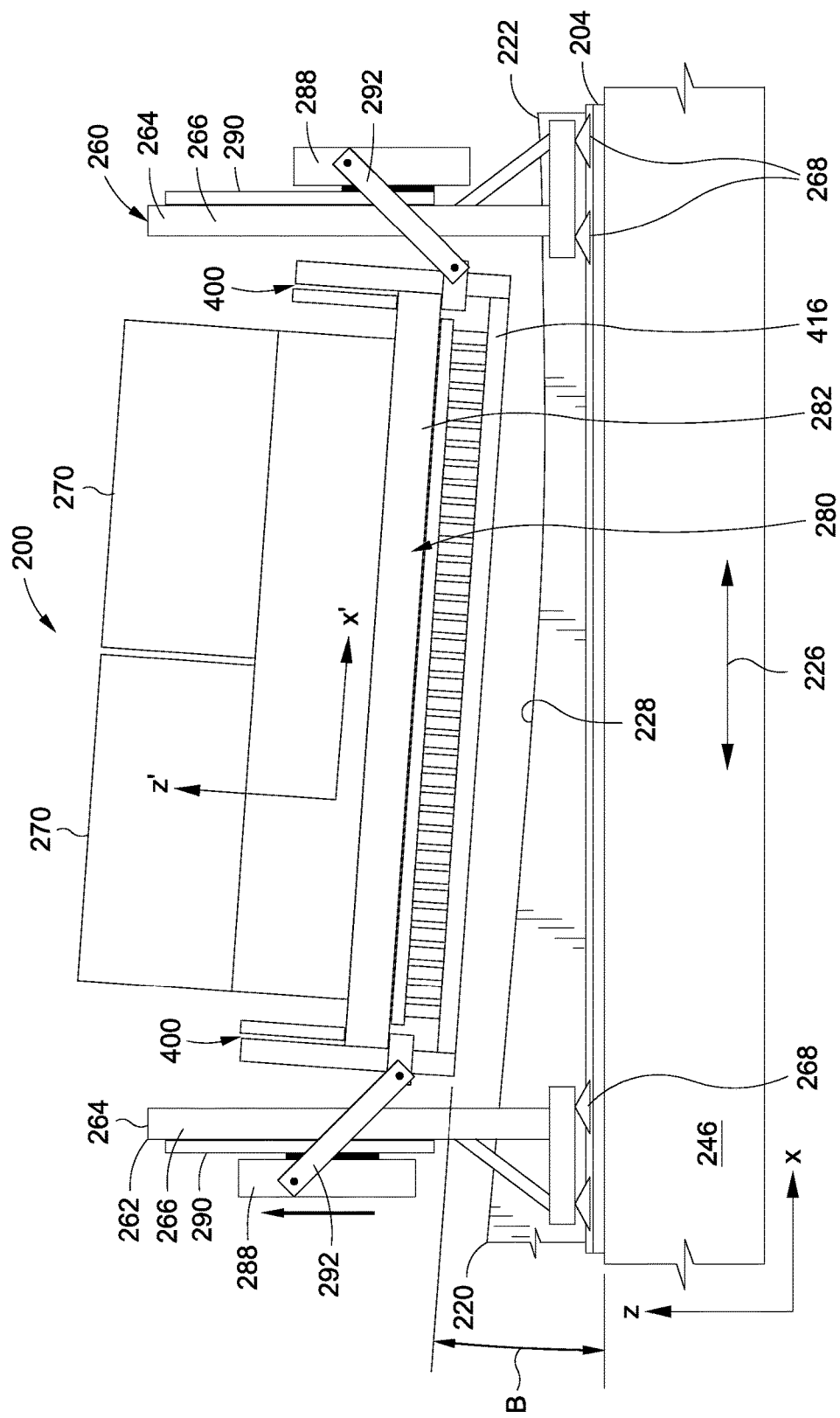
FIG. 10 is a side view of the chord frame oriented at a pitch angle generally matching a local angle of the form tool.

Referring to FIGS. 9-10, each end of the chord frame 280 may be coupled to an end frame 264 by a pair of chord frame guide rails 294 which may allow sliding motion of the ends of the chord frame 280 along the Z axis. A pair of Z actuators 288 (e.g., servomotors) may be coupled to each end frame 264. Each one of the Z actuators 288 may be movable along a Z actuator guide rail 290 mounted to an end frame 264. Each Z actuator 288 may be coupled by a frame link 292 to the chord frame 280. The Z actuators 288 at each end of the chord frame 280 may be independently operated in synchronized manner to adjust the vertical position of the respective ends of the chord frame 280 along the Z direction. Differential actuation of the Z actuators 288 may allow for adjusting the pitch angle B of the chord frame 280 relative to a top of the tool table 246. For example, the Z actuators 288 may be adjusted such that the pitch angle B of the chord frame 280 is oriented generally parallel to a local tangent (not shown) of a spanwise curvature 228 of the form tool 220 at a given location (e.g., a midpoint) between the end frames 264.

Figure 11:
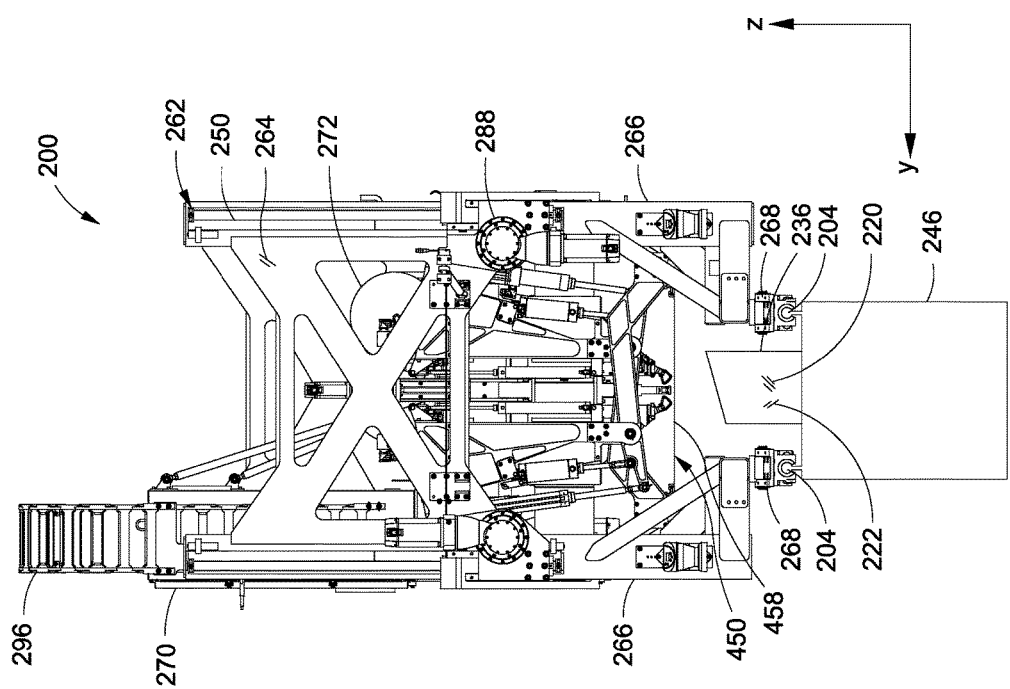
FIG. 11 is an end view of the stringer forming apparatus of FIG. 8 mounted over a blade form tool for forming a blade stringer.

FIG. 11 is an end view of the stringer forming apparatus 200 showing the end frames 264 mounted to the car rails 204. The frame legs 266 are shown straddling the form tool 220 supported on the tool table 246. Also shown are the Z actuator guide rails 290 for guiding the vertical movement of the Z actuators 288 when adjusting the vertical position of the ends of the chord frame 280. The ply carrier 450 is shown supported by the tension arms 414 above the form tool 220. Positioned above the ply carrier 450 are left-hand and right-hand arrays of nosepieces 552 on opposite sides of a centrally-located array of stomp feet 310.

Figure 14:
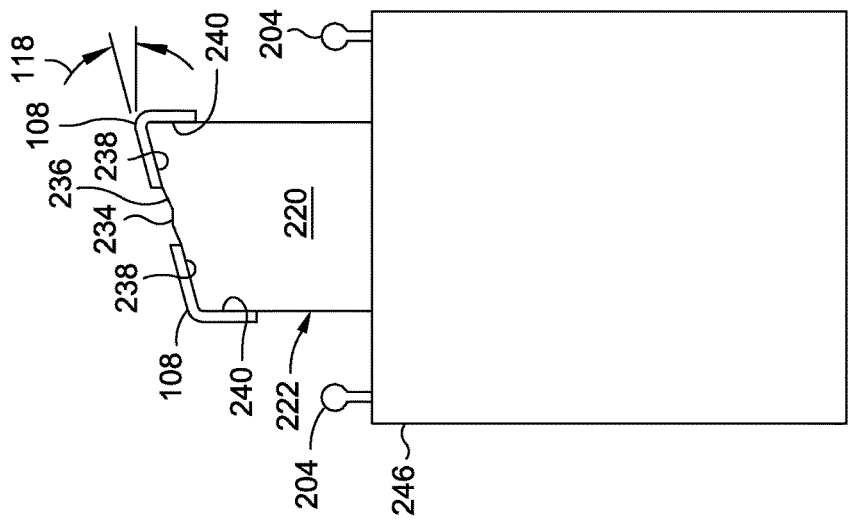
FIG. 14 is a cross-sectional view of the tool table and blade form tool taken along line 14 of FIG. 7 and illustrating the flange contour oriented at an increased flange angle relative to the flange angle shown in FIG. 13.
Figure 13:
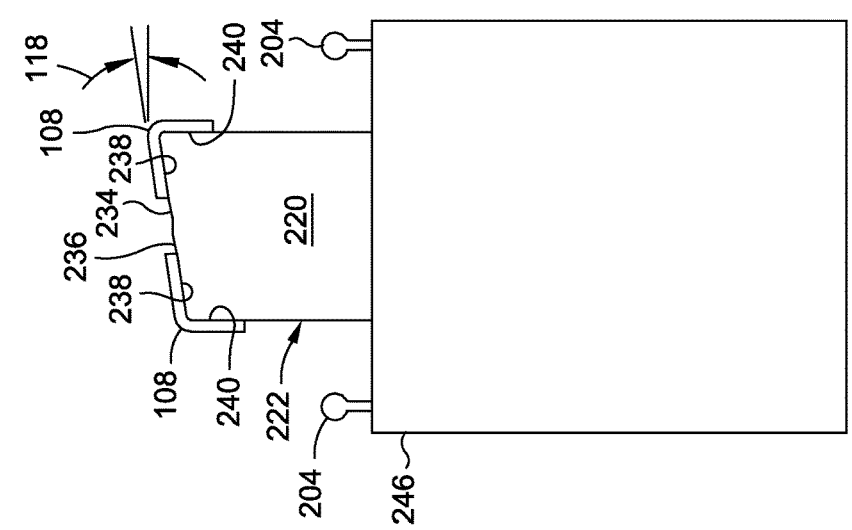
FIG. 13 is a cross-sectional view of the tool table and blade form tool taken along line 13 of FIG. 7 and illustrating the flange contour of the blade form tool oriented at a non-perpendicular flange angle relative to the vertically-oriented web contour of the blade form tool.

FIGS. 12-14 are cross-sectional views of an example of a form tool 220 which may be implemented for forming a blade stringer 122 (FIG. 2). The form tool 220 is mounted on a tool table 246 (FIG. 11) and is located between the car rails 204. The form tool 220 has a center datum 234 for clamping the ply carrier 450 (FIG. 11) to the form tool 220 during the forming process. The form tool 220 also has a tool contour 236 for laying up a left-hand stringer half 108 and a right-hand stringer half 108. After layup is complete, the left-hand and right-hand stringer halves 108 may be removed from the form tool 220 and assembled to form a complete blade stringer 122 as shown in FIGS. 2-5 and described above.

In FIG. 12, the flange contours 238 on opposite sides of the center datum 234 on top of the form tool 220 are oriented perpendicularly relative to the web contours 240 on the sides of the form tool 220. The flange contours 238 are separated by the flat, horizontally-oriented center datum 234 which may extend along the length of the form tool 220. The center datum 234 advantageously provides a flat region on the form tool 220 where the array of stomp feet 310 (FIG. 11) may clamp the ply carrier 450 (FIG. 11) to the form tool 220. In this regard, the center datum 234 functions as an indexing feature for the form tool 220.

FIG. 13 shows the form tool contour 236 at another spanwise location along the form tool 220. The flange contours 238 are oriented at a non-perpendicular flange angle 118 relative to the vertical web contours 240 on opposite sides of the form tool 220. FIG. 14 shows the form tool contour 236 at another spanwise location along the form tool 220 having an increased flange angle 118 relative to the flange angle 118 shown in FIG. 13. As indicated above, the form tool 220 may be provided in any one variety of different form tool contours 236, and is not limited to the blade form tool 222 shown in FIGS. 12-14. For example, the form tool 220 may be configured as a hat form tool 224 (FIG. 47) for forming a hat stringer 124 (FIG. 48) having a hat-shaped configuration, as described in greater detail below.

FIG. 15 is a perspective view of the stomp system 300, the tension management system 400, and the forming system 500 assembled to the chord frame 280. The orientation and motion of systems mounted on the chord frame 280 may be described in terms of an X' axis (X prime), a Y' axis (Y prime), and a Z' axis (Z prime). The X' axis may be described as extending along a length of the forming beams 502. The Y' axis is oriented perpendicular to the X' axis, and may be described as the orientation of the end beams 284 and/or the cross beams 286 of the chord frame 280. The Z' axis is oriented normal the X'-Y' plane. The tension arms 414 of the tension management system 400, and the forming beams 502 of the forming system 500 may be described as moving along the Z' axis.

Figure 16:
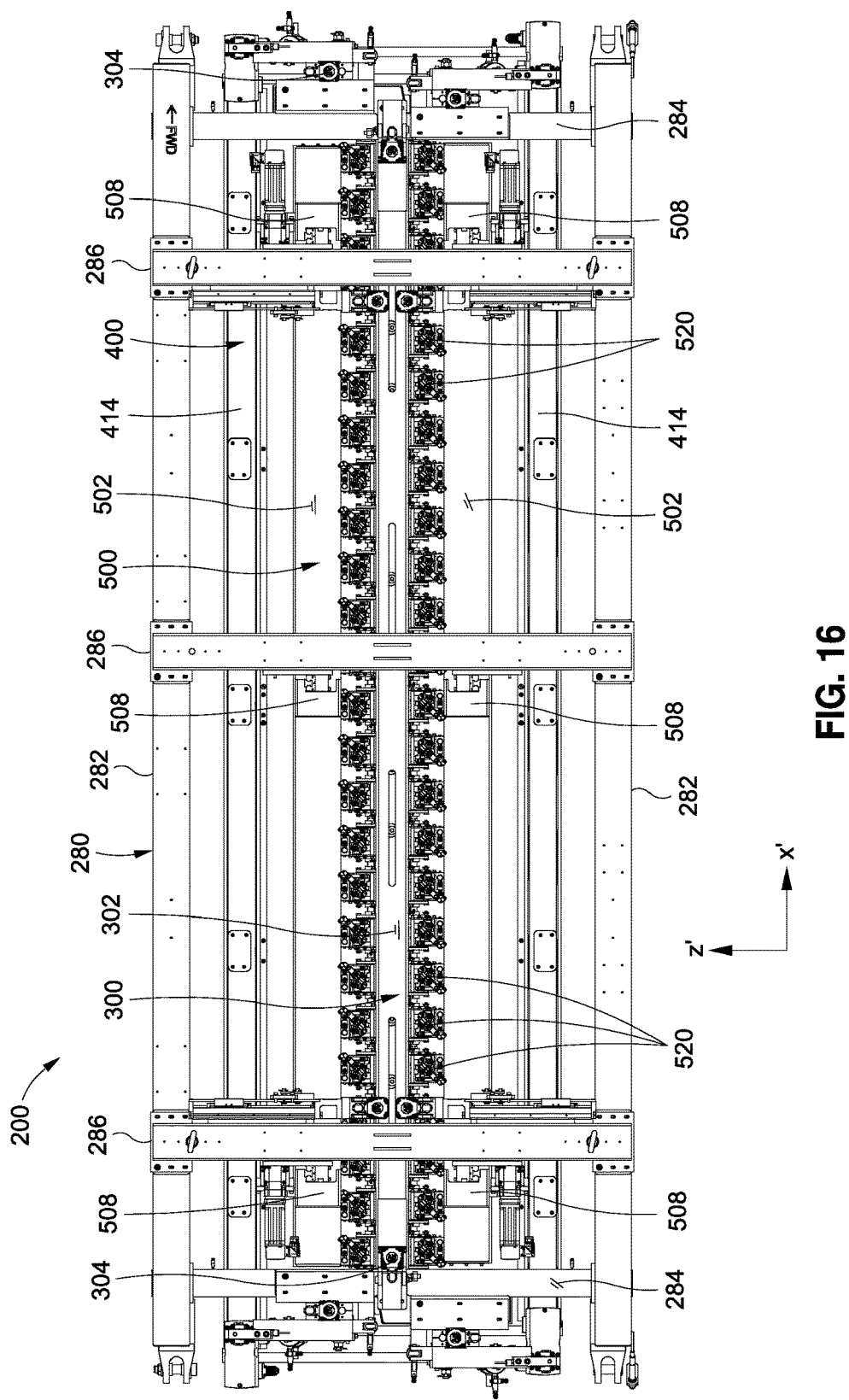
FIG. 16 is a top view of the stomp system, the tension management system, and the forming system of FIG. 15 assembled to the chord frame.

FIG. 16 is a top view of the stomp system 300, the tension management system 400, and the forming system 500 assembled to the chord frame 280. In the example shown, the stomp system 300 may include a centrally-located stomp beam 302 which may extend between the end beams 284 of the chord frame 280. The tension management system 400 may include a parallel pair of tension arms 414 oriented parallel to the lateral sides of the chord frame 280. The forming system 500 may include a parallel pair of forming beams 502 each located between the central stomp beam 302 and a side beam 282 of the chord frame 280. An array of forming modules 520 are shown mounted to each one of the forming beams 502 on opposite sides of the central stomp beam 302.

Figure 17:
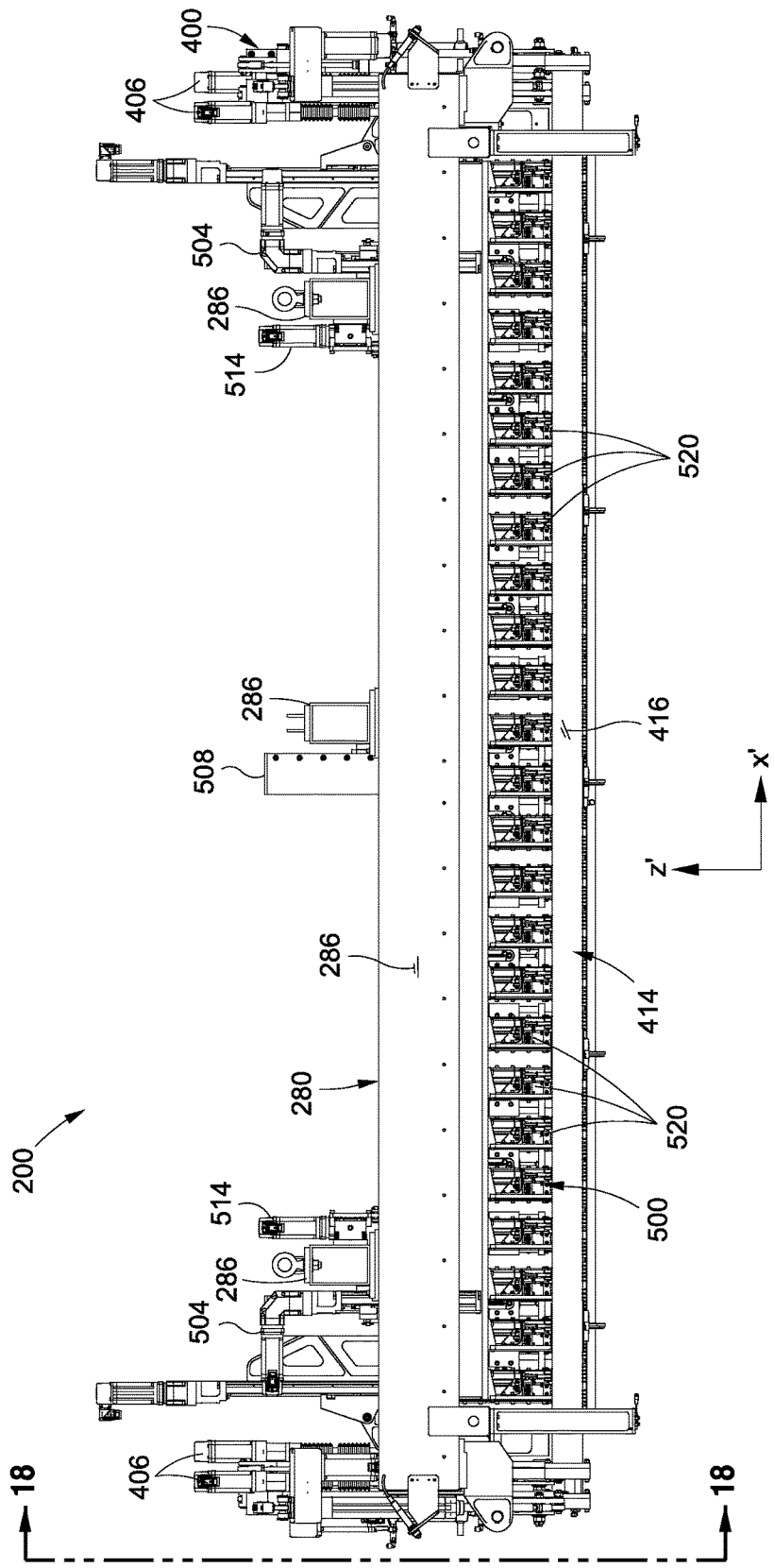
FIG. 17 is a side view of the stomp system, the tension management system, and the forming system mounted to the chord frame.

FIG. 17 is a side view of the stomp system 300, the tension management system 400, and the forming system 500 mounted to the chord frame 280. The stomp beam actuators 304 may be located at opposing ends of the stomp beam 302. Likewise, the forming Z' actuators 504 and forming Y actuators 514 of the forming system 500 may be located at opposing ends of the forming beams 502. An array of forming modules 520 may be uniformly distributed along the length of each one of the forming beams 502. The actuators 406, 410 (FIG. 18) and counterbalance cylinders 408, 412 (FIG. 18) of the tension management system 400 may be located at the opposing ends of the chord frame 280.

Figure 18:
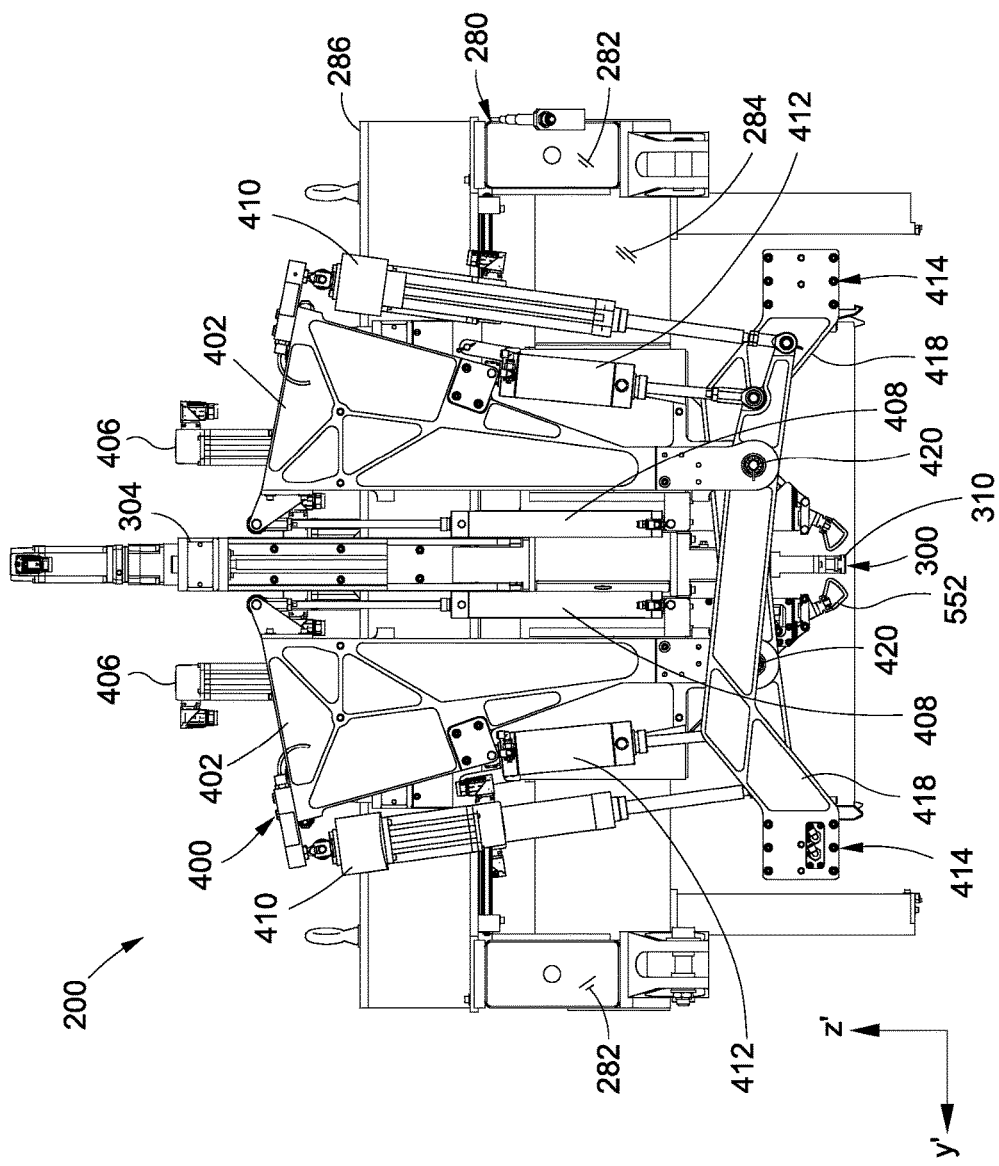
FIG. 18 is an end view of the stomp system, the tension management system, and the forming system mounted to the chord frame.

FIG. 18 is an end view of the tension management system 400 showing the set of actuators 406, 410 and counterbalance cylinders 408, 412 for controlling the motion of the pair of tension arms 414. The tension arms 414 extend along opposite sides of the chord frame 280 and may be vertically movable and angularly rotatable (e.g., pivotable) about a pivot point 420. As indicated above, each tension arm 414 is movable independent of the other tension arm 414. However, the tension arms 414 may be operated in a synchronized manner to support and position the ply carrier 450 (FIG. 11) relative to the form tool 220 (FIG. 11). In addition, the tension arms 414 may be configured to maintain the lateral tension 462 (FIG. 33) in the ply carrier 450 within a predetermined range. As indicated above, the ply carrier 450 may be configured to support a material layer 458 (FIG. 6), such as a course 460 of composite material. In some examples, the material layer 458 may be releasably adhered to a lower surface 452 of the ply carrier 450.

FIG. 19 is a perspective view of an example of one of the tension arms 414 of the tension management system 400 which may be configured and operated in a manner similar to the other tension arm 414 of the pair. As indicated above, each one of the tension arms 414 may include a set of actuators and counterbalance cylinders. Each tension arm 414 may include a tension beam 416 configured to support a stretcher rail 456 (FIGS. 33-42) extending along a lateral side 454 of the ply carrier 450. The tension arm 414 may be assembled as a pair of pivot arms 418 extending laterally from respective opposing ends of a tension beam 416.

Figure 20:
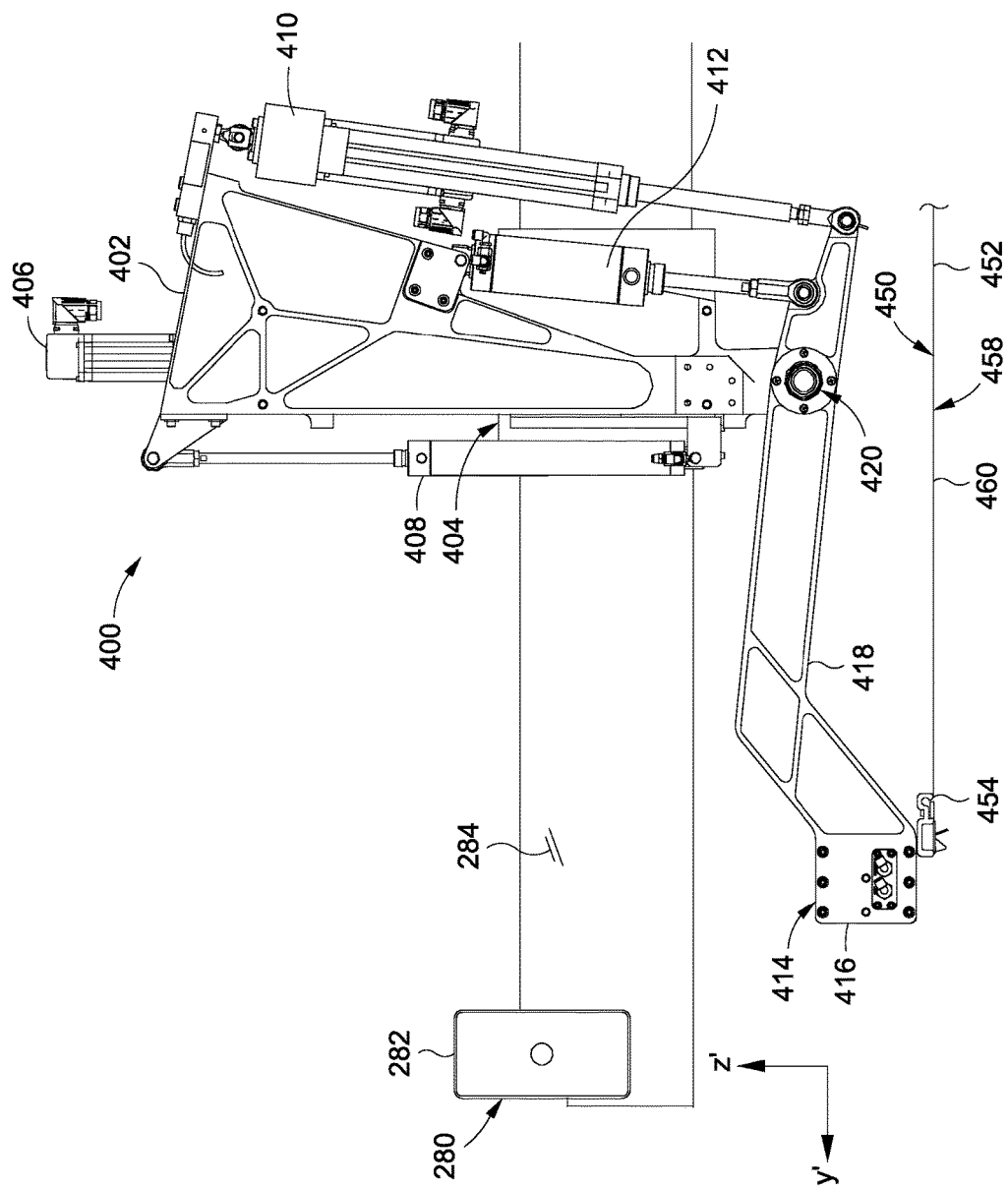
FIG. 20 is an end view of the tension management system of FIG. 19.

FIG. 20 is an end view of the tension management system 400. Each end of the tension arm 414 may include a tension arm vertical position actuator 406 which may couple the tension arm 414 to the chord frame 280 and may control the vertical position of the tension arm 414 relative to the chord frame 280. In one example, each tension arm vertical position actuator 406 may be mounted to an end beam 284 of the chord frame 280 by a tension arm mounting bracket 404. A tension arm support bracket 402 may be coupled to the tension arm vertical position actuator 406. Although described as an electro-mechanical actuator (e.g., a servo-motor), the tension arm vertical position actuator 406 may be provided in any configuration that facilitates vertical translation of the tension arm 414 relative to the chord frame 280. In one example, the tension arm vertical position actuator 406 may be a ball-screw actuator for vertically positioning the tension arm 414 relative to the chord frame 280.

In FIG. 20, a rotational position actuator 410 may be coupled to each one of the pivot arms 418. The pair of rotational position actuators 410 for each tension arm 414 may be operated in a coordinated manner to rotate the pivot arms 418 about a pivot point 420 and adjust the angular position of the pivot arms 418 relative to the chord frame 280. A vertical counterbalance cylinder 408 may be mounted to each tension arm support bracket 402. The vertical counterbalance cylinders 408 of each tension arm 414 may be operated in a coordinated manner to counterbalance the mass of the tension arm 414 during vertical translation and to sense and maintain lateral tension 462 (FIG. 33) in the ply carrier 450 within a predetermined range.

In addition, one or more rotational counterbalance cylinders 412 may be mounted to each tension arm support bracket 402 (FIG. 20). The rotational counterbalance cylinders 412 (FIG. 20) of each tension arm 414 may be operated in a manner to counterbalance the mass of the tension arm 414 (FIG. 20) during pivoting of the tension arm. In this manner, the counterbalance cylinders 408, 412 (FIG. 200 may allow the vertical and rotational position actuators 406, 410 (FIG. 20) to sense and maintain lateral tension 462 (FIG. 33) within the ply carrier 450 within a predetermined range during the process of forming and compacting the ply carrier 450 and material layer 458 (FIG. 20) onto the form tool 220 (FIG. 11), and during the ply carrier 450 (FIG. 20) peeling process. When the vertical position actuators 406 and the vertical counterbalance cylinders 408 are active, the rotational position actuators 410 and the rotational counterbalance cylinders 412 may be inactive (and vice versa) such that the vertical position actuators 406 may accurately sense lateral force in the ply carrier 450 without influence from the rotational position actuators 410.

In an example of the magnitude of lateral tension 462 (FIG. 33) in a course of carbon fiber unidirectional ply material laid up on the blade form tool 222 (FIG. 8), the tension management system 400 may be configured to sense and maintain the lateral tension 462 within a range of approximately 0.2-0.8 pounds per linear inch (pli) along the lateral sides 454 (FIG. 11) of the ply carrier 450 (FIG. 20) and, more preferably, approximately 0.5 pli. For a ply carrier 450 having a length of 60 inches, the total magnitude of lateral tension 462 on each tension arm 414 (FIG. 20) may be approximately 30 pounds (e.g., 0.5 psi×60 inches). As may be appreciated, the magnitude of the lateral tension 462 may be dependent upon the material system from which the course 460 (FIG. 20) is formed, the material from which the ply carrier 450 is formed, the geometry of the form tool 220 (FIG. 11), the lateral width of the ply carrier 450, and other factors.

Figure 21:
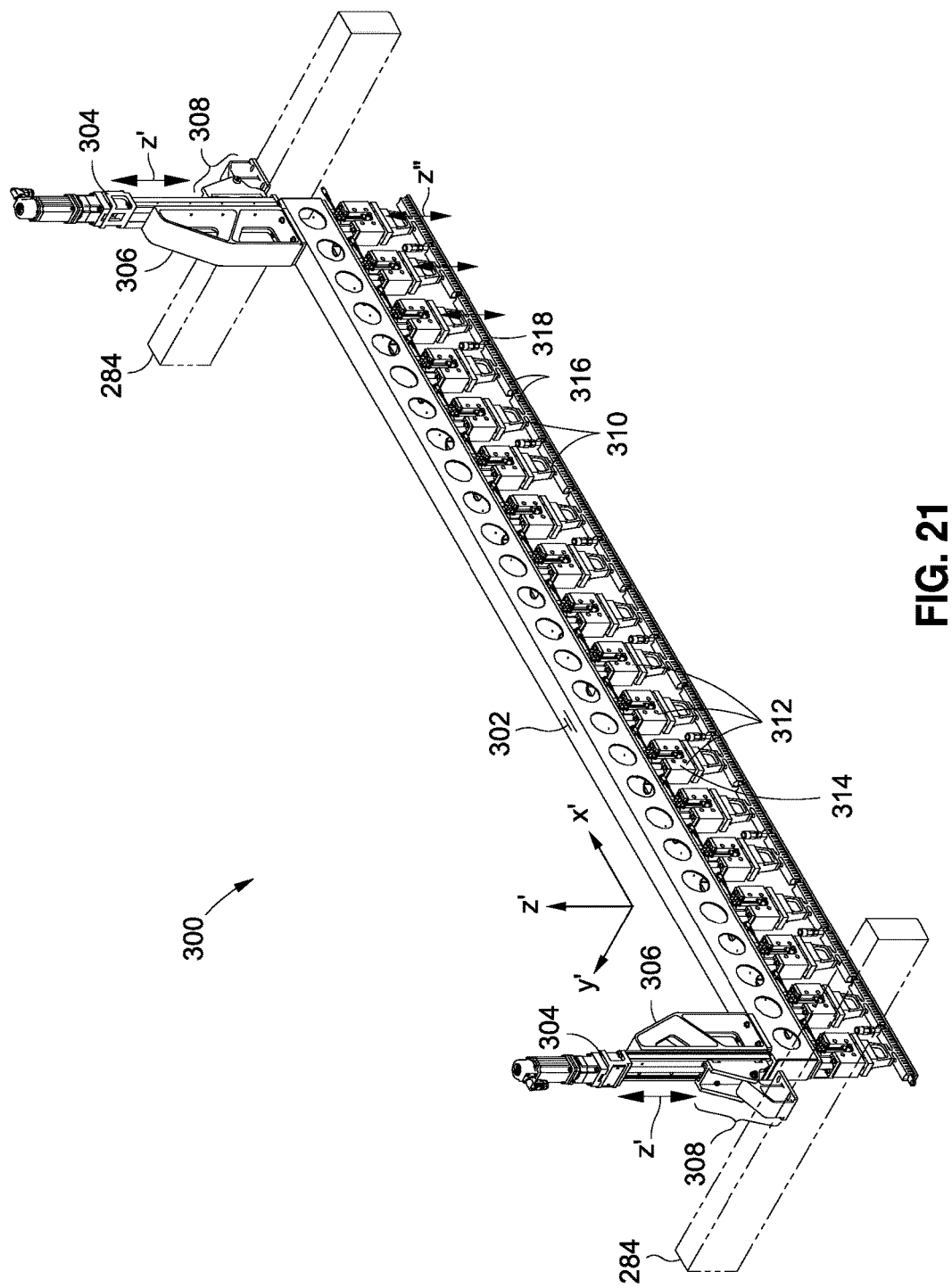
FIG. 21 is a perspective view of an example of a stomp system configured to clamp a ply carrier and material layer onto the form tool.
Figure 22:
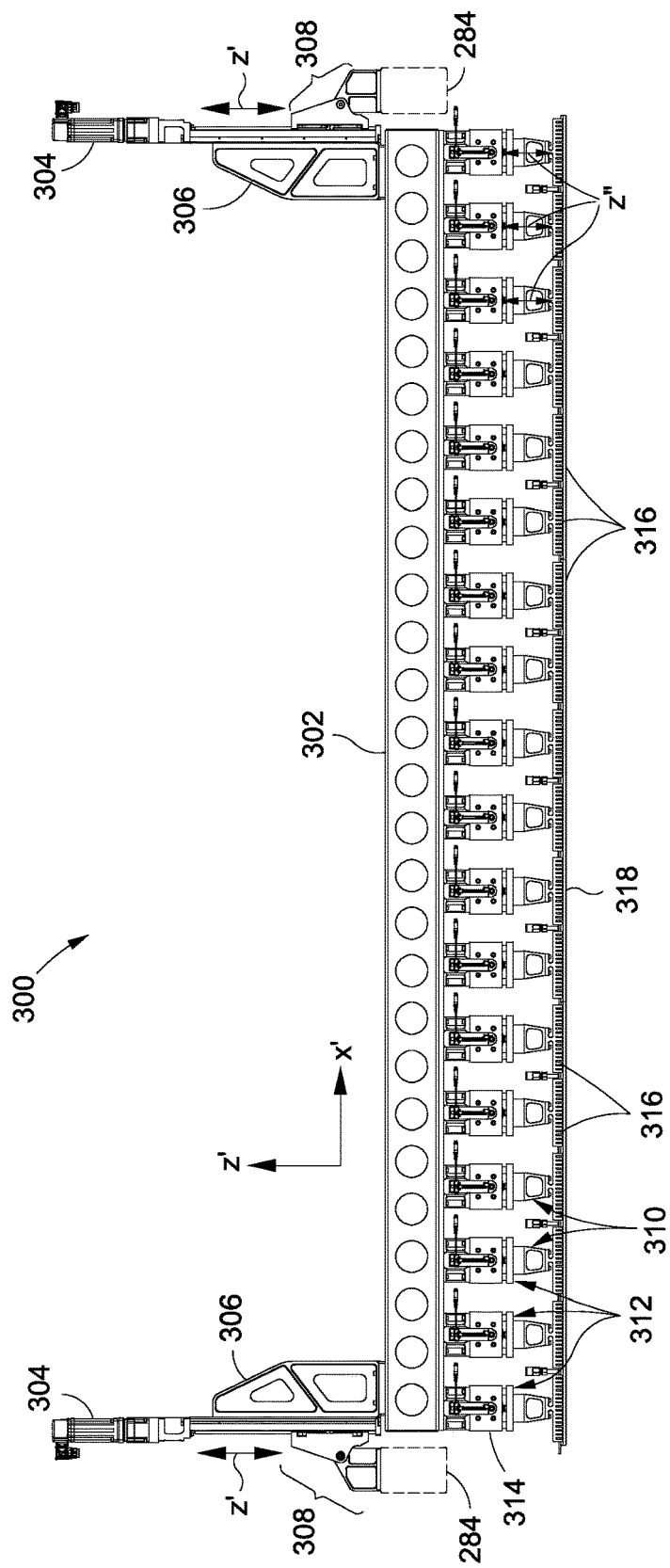
FIG. 22 is a side view of the stomp system of FIG. 21.

FIG. 21 is a perspective view of an example of a stomp system 300 configured to clamp the ply carrier 450 (FIG. 11) and material layer 458 (FIG. 11) onto the form tool 220 (FIG. 11). FIG. 22 is a side view of the stomp system 300. The stomp beam 302 may extend between opposing end beams 284 of the chord frame 280. A stomp beam end bracket 306 may be mounted to each end of the stomp beam 302. Each stomp beam end bracket 306 may be coupled to a stomp beam actuator 304. A stomp beam actuator bracket 308 may be operatively coupled to the stomp beam actuator 304. In the example shown, the stomp beam actuators 304 may be configured as electro-servo motors. However, the stomp beam actuators 304 may be provided as pneumatic actuators, electromechanical actuators, or any other actuator configuration or combination thereof. The stomp beam actuators 304 may be operated in a coordinated manner to move the stomp beam 302 along the Z' axis to position the stomp beam 302 relative to the chord frame 280.

Figure 23:
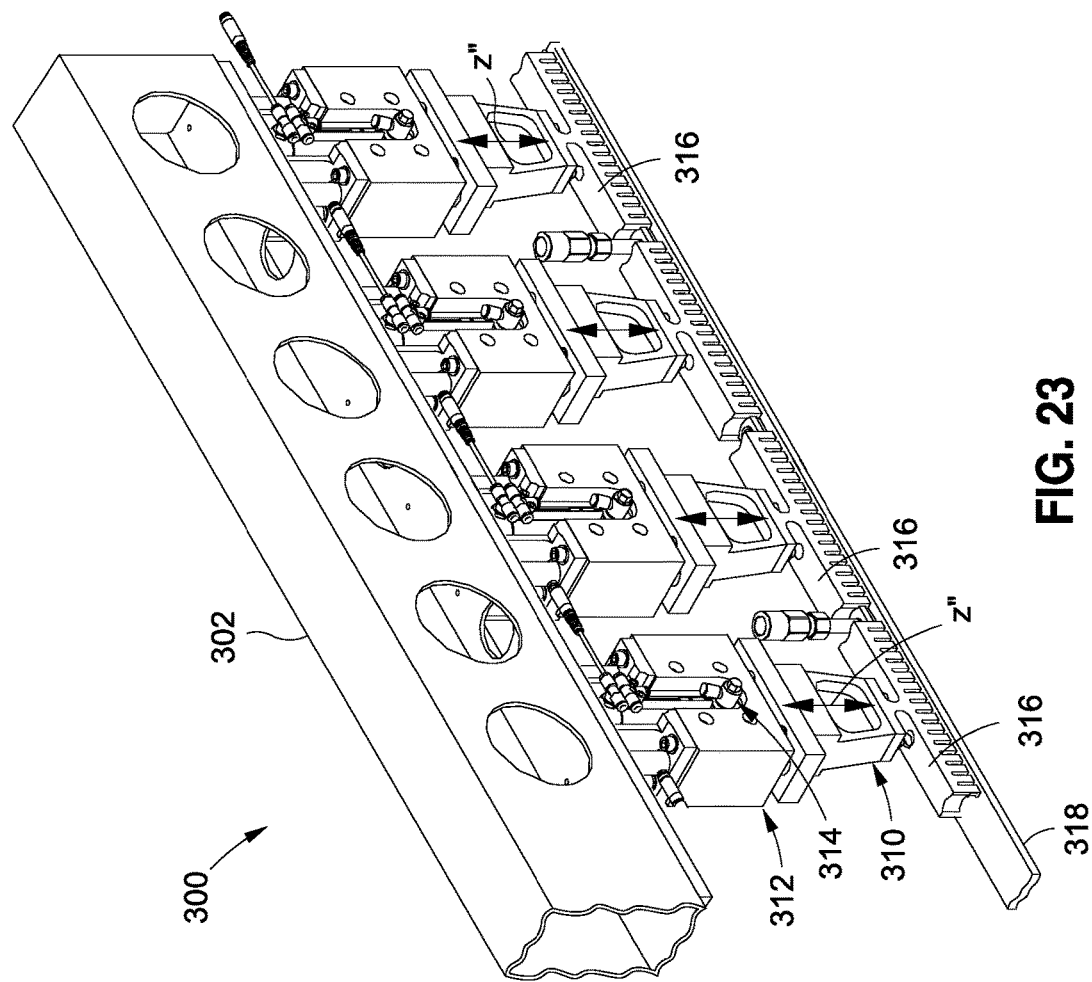
FIG. 23 is a perspective view of an array of stomp foot actuators supported by a stomp beam.
Figure 24:
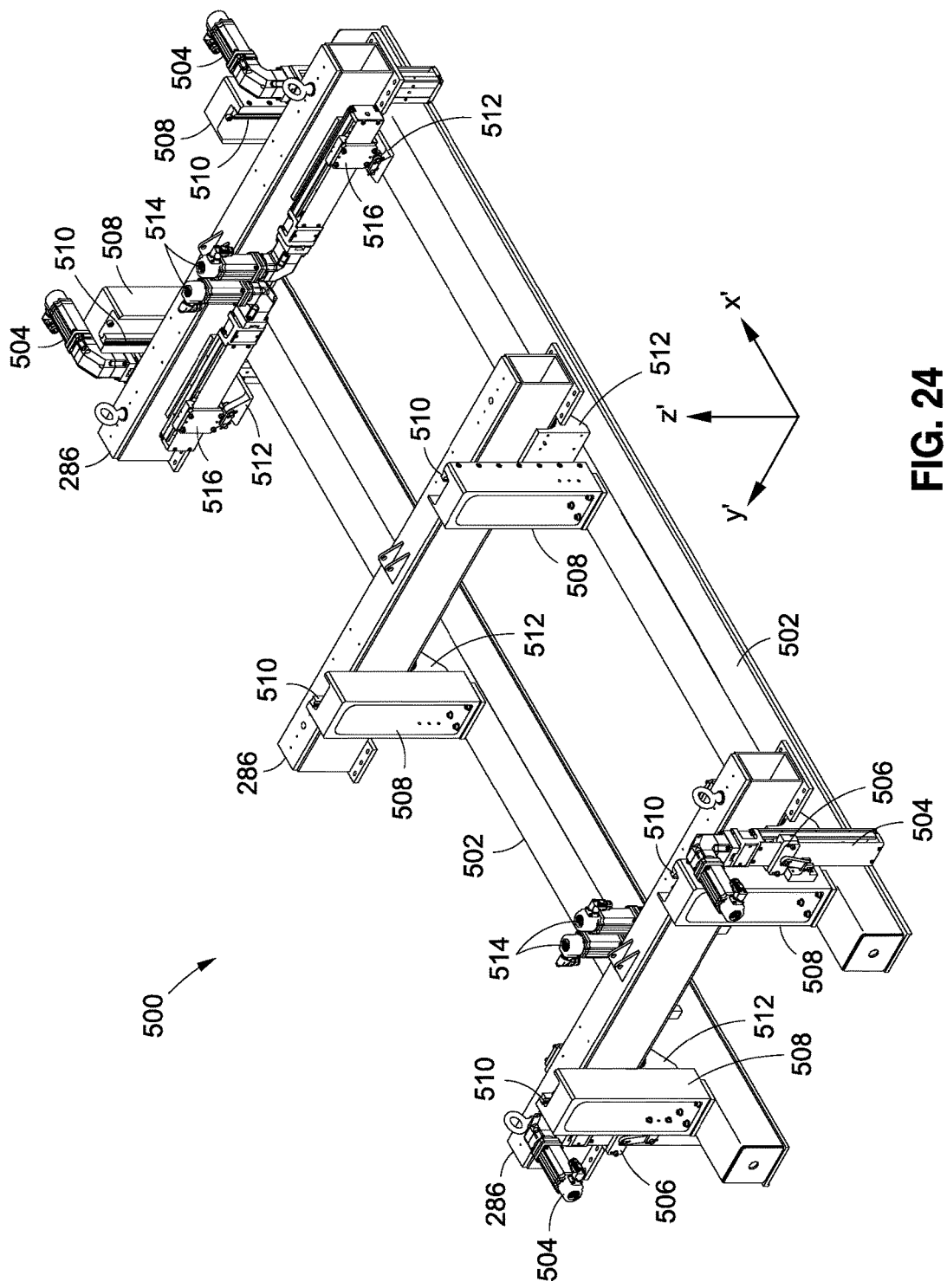
FIG. 24 is a perspective view of an example of a forming system for forming a ply carrier and material layer to the contour of the form tool and which may include a pair of forming beams each for supporting an array of forming modules.

FIG. 23 is a perspective view of an array of stomp foot actuators 312 supported by the stomp beam 302. In the example shown, the stomp beam actuators 304 (FIG. 22) may be mounted to an underside of the stomp beam 302. Each one of the stomp foot actuators 312 may be configured as a guided pneumatic cylinder 314 with position feedback. Each stomp foot 310 may move along a Z" axis (Z double-prime) defined by the direction of extension and retraction of the pneumatic cylinder 314. The operative end of each stomp foot actuator 312 may include a stomp segment 316 with a channel to receive a stomp foot 310. One or more of the stomp feet 310 may optionally include a vacuum plenum for vacuum assisted retention of the ply carrier 450 (FIG. 11) during clamping of the ply carrier 450 to the form tool 220 (FIG. 11). In the example shown, a flexible stomp strip 318 may extend across a plurality of the stomp segments 316. The stomp strip 318 may be a continuous strip configured to conform to the spanwise curvature 228 (FIG. 10) of the form tool 220. The stomp strip 318 may distribute the point loads applied by each stomp foot 310 into the ply carrier 450 against the form tool 220.

As described in greater detail below, the stomp beam actuators 304 (FIG. 22) may be operative to clamp the ply carrier 450 (FIG. 11) and material layer 458 (FIG. 11) onto the center datum 234 (FIG. 12) of the form tool 220 (FIG. 11). The stomp beam actuators 304 may lock the lateral position of the ply carrier 450 and thereby prevent lateral movement of the ply carrier 450 relative to the form tool 220 during the forming process. As described in greater detail below, one or more of the stomp foot actuators 312 (FIG. 22) may include a position sensor to sense contact of the stomp foot 310 with the form tool 220 during initial clamping to the form tool 220.

FIGS. 24-27 show an example of a forming system 500 for forming and compacting the ply carrier 450 (FIG. 11) and material layer 458 (FIG. 11) to the form tool 220 (FIG. 11) using parallel arrays of forming modules 520. Each forming module 520 may actuate a nosepiece. In the regard, the forming system 500 provides parallel arrays of nosepieces 552 that may be operated independently in a synchronized manner to sweep in a lateral direction 230 along the contours of the form tool 220 and conform the ply carrier 450 and material layer 458 to the form tool contour 236. In addition, the forming modules 520 may sense and control the magnitude of compaction pressure applied by the nosepieces 552 (FIG. 29) compacting the material layer 458 onto the substrate. In the present disclosure, the substrate may be described as either the form tool 220 or a previously-laid material layer 458.

Figure 33:
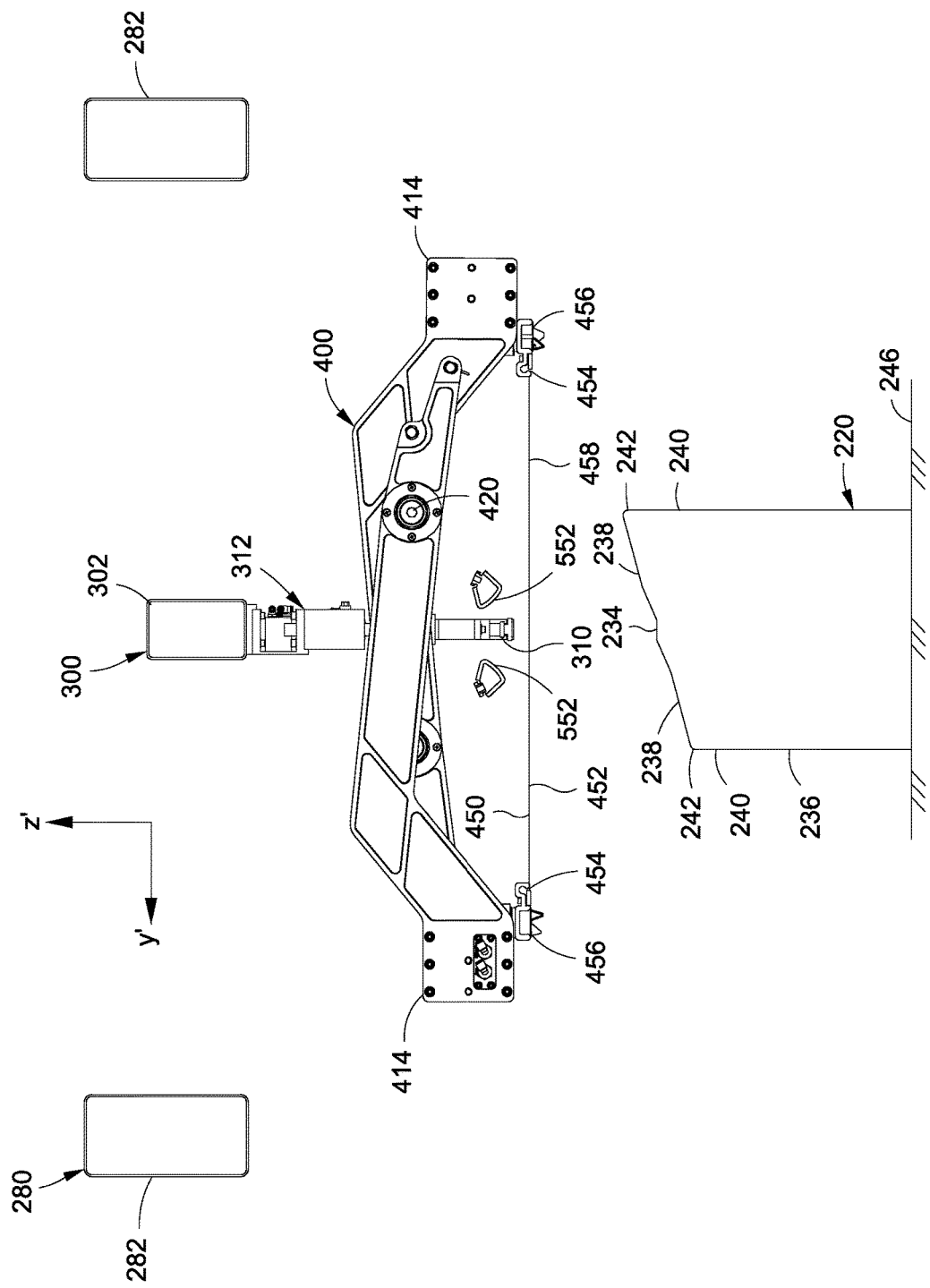
FIG. 33 is an end view of an example of a stringer forming apparatus for forming a blade stringer and showing the tension management system, the stomp system, and the forming system in their respective initial positions prior to the start of the process of forming a ply carrier onto a blade form tool.

FIGS. 25-26 are respective top and side views of the forming system 500 which may be supported on the chord frame 280 (FIG. 33). As indicated above, the forming system 500 may include a pair of forming beams 502 which may be movable in synchronized manner relative to the chord frame 280 to position the arrays of forming modules 520 (FIG. 6) proximate to the form tool 220. Each forming beam 502 may be movably coupled to the chord frame 280.

In the example shown, the opposing ends and the approximate midpoint of each forming beam 502 (FIG. 25) may be coupled to a respective cross beam 286 (FIG. 25) of the chord frame 280 (FIG. 33) by a Z' guide bracket 508 at each location. A Z' slider bracket 512 (FIG. 25) may be vertically slidably engaged to a Z' guide rail 510 (FIG. 25) that may be included with each Z' guide bracket, enabling motion of the forming beam 502 along the Z' axis. Each Z' slider bracket 512 may also be slidably engaged to a cross beam rail 518 (FIG. 26) which may be mounted to an underside of a cross beam 286 and enabling motion of the forming beam 502 along the Y' axis.

The ends of the forming beams 502 (FIG. 26) may each include a forming Z' actuator 504 (FIG. 26). The forming Z' actuator bracket 506 (FIG. 26) may couple the Z' slider bracket 512 (FIG. 26) to the forming Z' actuator 504 for actuating the forming beams 502 along the Z' direction relative to the chord frame 280 (FIG. 18). Each end of each one of the forming beams 502 may also include a forming Y actuator 514 (FIG. 26) which may be operatively coupled to the Z' slider bracket 512 via a forming Y actuator bracket 516 (FIG. 26). The forming Y actuators 514 may translate the forming beams 502 along the Y direction relative to the chord frame 280. The forming Z' actuators 504 and the forming Y actuators 514 may be operated in a coordinated manner for positioning the forming beams 502 relative to the form tool 220 (FIG. 14).

Figure 27:
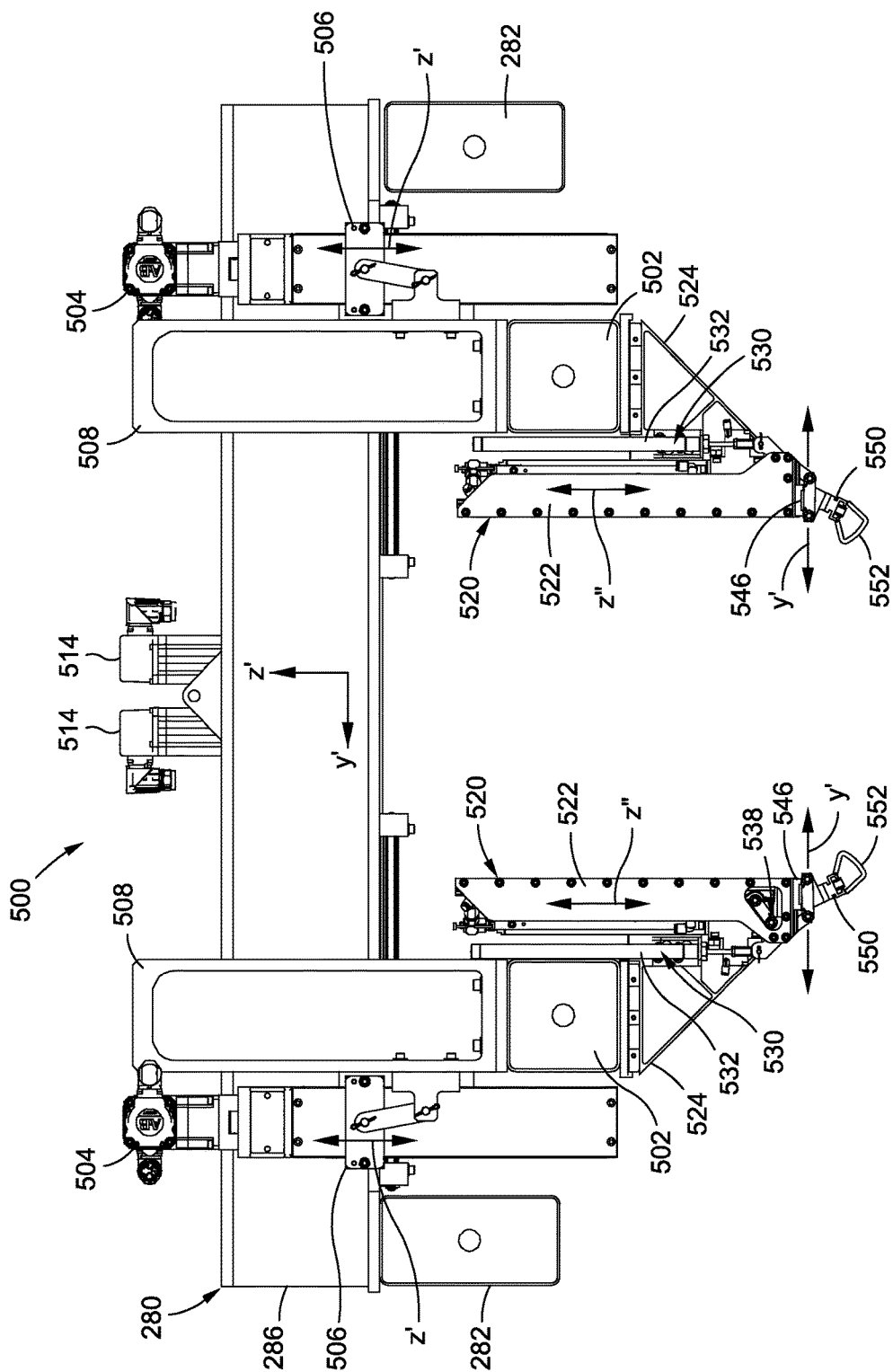
FIG. 27 is an end view of the forming system of FIG. 24 and illustrating a forming module mounted to each one of the forming beams.

FIG. 27 is an end view of the forming system 500 showing an example of forming modules 520 mounted to the forming beams 502 of the forming system 500. The forming modules 520 may be movable along the Z" direction (Z double-prime) to position the nosepieces 552 relative to the form tool 220 (FIG. 11) during the process of conforming the ply carrier 450 and material layer 458 to the form tool 220. The forming modules 520 may also be operative to move the nosepieces 552 along the Y' direction (Y prime) during the conforming process.

Figure 28:
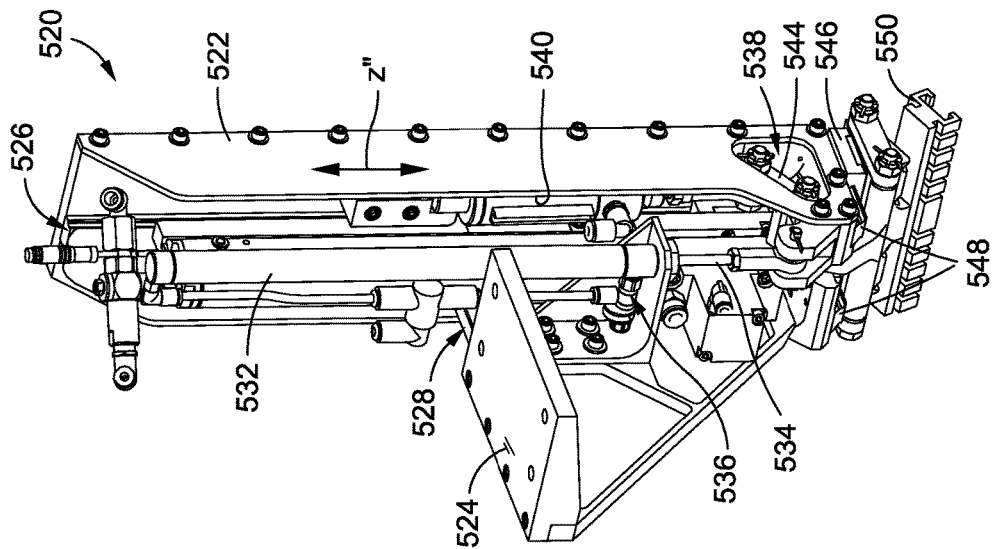
FIG. 28 is a perspective view of a forming module including a vertical force cylinder and a lateral force cylinder for actuating a nosepiece.

FIG. 28 shows an example of a forming module 520. As indicated above, an array of the forming modules 520 may be mounted to each one of the forming beams 502 (FIG. 27). Each one of the forming modules 520 may include a nosepiece 552 (FIG. 29) which may be actuated in a manner to conform and compact the ply carrier 450 (FIG. 11) and the material layer 458 (e.g., a course 460 of composite material) (FIG. 11) onto the tool contour 236 (FIG. 12) or to a previously-applied material layer 458 (FIG. 11). In the example shown, the forming module 520 may include a forming module frame 522 coupled to the forming beam 502 by a module mounting bracket 524. The module mounting bracket 524 may be fastened to the forming beam 502 such as to an underside of the forming beam 502. The module mounting bracket 524 may include a module mounting slider bracket 528 which may be slidably engaged to a forming module guide rail 526 of the forming module frame 522 to guide the vertical motion (e.g., along a Z" axis) of the forming module 520 relative to the forming beam 502 when actuated by a vertical force cylinder 532. Although FIGS. 27-31 illustrate the Z" axis as being vertically oriented, the forming modules 520 may be mounted to the forming beams 502 such that the Z" axis is slightly off-vertical or non-vertical.

In this regard, each one of the forming modules 520 (FIG. 28) may include one or more forming module mechanisms or actuators 530 (FIG. 27) for controlling the vertical position and/or the lateral position of the nosepieces 552 (FIG. 29) relative to the form tool 220 (FIG. 11) during the forming process. In addition, the one or more mechanisms for controlling the vertical position and/or the lateral position of the nosepiece 552 may include the capability for sensing and dynamically modulating the compaction pressure applied by the nosepiece 552 onto the ply carrier 450 (FIG. 11) against the form tool 220.

Figure 31:
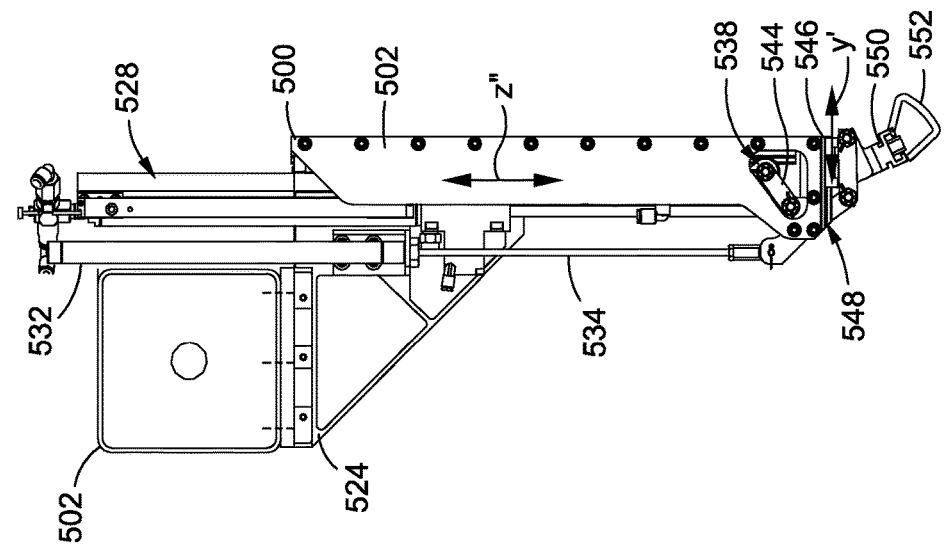
FIG. 31 is a side view of the forming module with the vertical force cylinder in an extended position.

In the example of the forming apparatus 200 shown in FIGS. 8-31 and 33-42 for forming a blade stringer, the forming module mechanisms or actuators 530 (FIG. 27) for controlling the vertical position and/or the lateral position of the nosepiece 552 (FIG. 29) may include a vertical force cylinder 532 (FIG. 28) and a lateral force cylinder 540 (FIG. 28) for each forming module 520 (FIG. 28). In some examples, the vertical force cylinder 532 and/or the lateral force cylinder 540 may be pneumatic cylinders operating via pneumatic pressure which may be supplied by the air tank 272 (FIG. 8). The vertical force cylinder 532 may be mounted to the forming module frame 522 (FIG. 28) and may include position feedback via electric-servo position control. The vertical force cylinder 532 may control the position and motion of the forming module 520 and attached nosepiece 552 along a Z" (Z double-prime) direction, as mentioned above. The Z" prime direction may be parallel to the actuation direction of a vertical cylinder rod 534 (FIG. 28) extendable and retractable from the vertical force cylinder 532. FIGS. 30-31 respectively show a forming module 520 with the vertical force cylinder 532 in a retracted position (FIG. 30) and in an extended position (FIG. 31).

The vertical force cylinder 532 (FIG. 28) may include a mechanism for locking the position of the vertical cylinder rod. For example, the vertical force cylinder 532 may include a vertical cylinder rod lock 536 (FIG. 28) for locking the vertical position of the forming module 520 (FIG. 28) and nosepiece 552 (FIG. 29) on command. In addition, the vertical force cylinder 532 may include position feedback for sensing the compaction pressure applied by the nosepiece 552 on the ply carrier 450 (FIG. 11) during the forming process. The position feedback may allow the vertical force cylinder 532 to maintain the compaction pressure of the nosepiece 552 within a predetermined range.

The lateral force cylinder 540 (FIG. 28) may be part of a lateral force mechanism 538 (FIG. 28) of the forming module 520 (FIG. 28). The lateral force cylinder 540 may control the lateral motion of the nosepiece 552 (FIG. 29) relative to the form tool 220 (FIG. 11). The lateral force cylinder 540 may be mounted to the forming module frame 522 (FIG. 28) and may include position feedback (e.g., electric-servo position control). The lateral force mechanism 538 may control the position and motion of the nosepiece 552 along the Y' direction by controlling the extension and retraction of the lateral force rod from the lateral force cylinder 540. The Y' direction may be parallel to the lengthwise orientation of one or more nosepiece rails 548 (FIG. 28) that may be included with the forming module.

Figure 29:
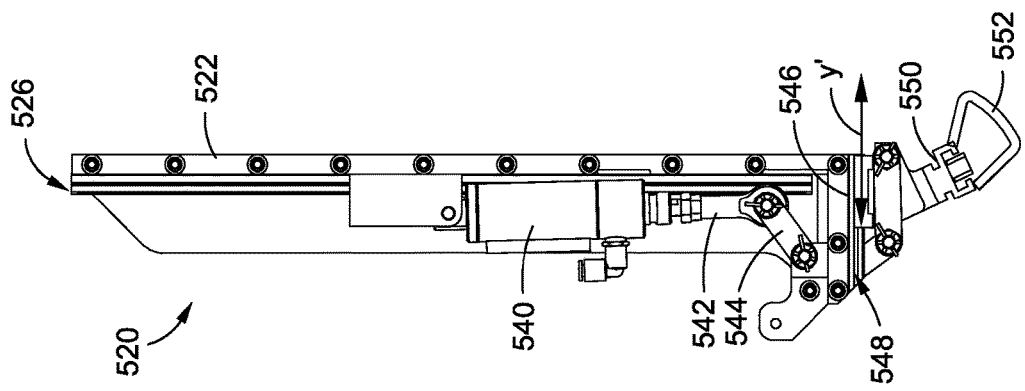
FIG. 29 is a side view of a forming module with a side plate removed to illustrate a linkage interconnecting a lateral force cylinder to a laterally-slidable bracket supporting the nosepiece.
Figure 30:
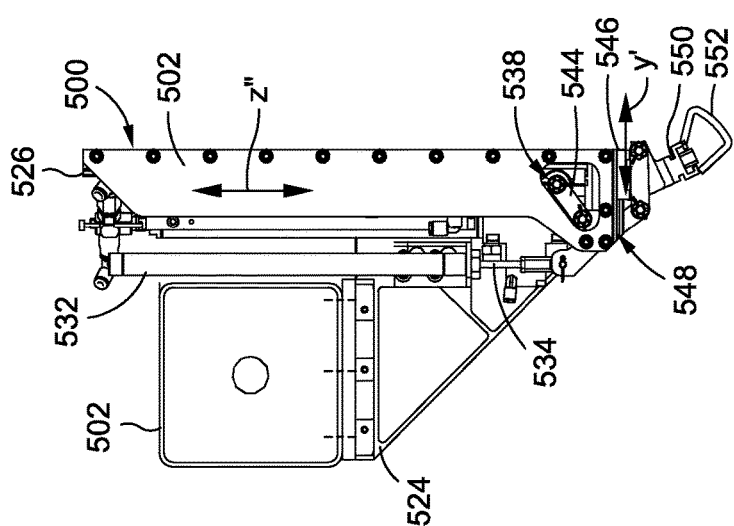
FIG. 30 is a side view of a forming module with the vertical force cylinder in a retracted position.

FIGS. 28-31 show a pair of nosepiece rails 548 mounted to the forming module 520 such as to the underside of the forming module frame 522. A nosepiece slider bracket 546 may be slidably engaged to and mounted on the nosepiece rails 548. The nosepiece slider bracket 546 may be laterally movable along the nosepiece rails 548 by extension and retraction of the lateral cylinder rod 542 extending from the lateral force cylinder 540. A linkage 544 may couple the lateral cylinder rod 542 to the nosepiece slider bracket 546 and may convert linear (e.g., vertical) motion of the lateral cylinder rod 542 into lateral motion of the nosepiece slider bracket 546. FIG. 29 is a side view of a forming module 520 with a side plate removed to illustrate the linkage 544 interconnecting the lateral force cylinder 540 to the laterally-slidable nosepiece. The nosepiece slider bracket 546 may include a nosepiece channel segment 550. The nosepiece channel segment 550 may be configured to support the nosepiece.

In the example shown, the nosepiece channel segment 550 may include slots to allow the nosepiece channel segment 550 (FIG. 30) and the nosepiece 552 (FIG. 30) to flex and conform to the local contour and spanwise convex and concave curvature of the form tool 220 (FIG. 11). In one example, the nosepiece 552 may be configured to conform to a spanwise curvature 228 ranging from a minimum concave radius 128 (FIG. 2) of approximately 3000 inches or less, to a maximum convex radius of approximately 5800 inches or more. However, the nosepiece 552 may be configured to conform and/or convex radii of curvature of less than 50 inches. In some examples, the nosepiece 552 may be configured conform to local changes in the form tool contour of at least 0.030 inch or more within a 10 inch length of the form tool 220. The stringer forming apparatus 200 may be configured such that the nosepieces 552 may conform the ply carrier 450 and material layer 458 to both convex spanwise curvature and concave spanwise curvature in the form tool 220 along the length of a single course 460.

The nosepieces 552 may be sized and configured such that the array of forming modules 520 (FIG. 30) provides an end-to-end array of nosepieces 552 (FIG. 30) with relatively small gaps between the adjacent nosepieces 552. The nosepieces 552 may be provided in any one of a variety of different sizes, shapes, and configurations, without limitation. In the example shown, a nosepiece 552 may be hollow. However, a nosepiece 552 may be formed as a solid element. The nosepieces 552 may be formed of material that allows for accurate application of compaction pressure onto the ply carrier 450 (FIG. 33) within a predetermined range. An exterior surface of the nosepiece 552 may be formed of a low-friction material such as a polymeric material (e.g., Nylon™) to allow the nosepiece 552 to slide along the ply carrier 450 with low frictional resistance during the forming process.

Figure 32:
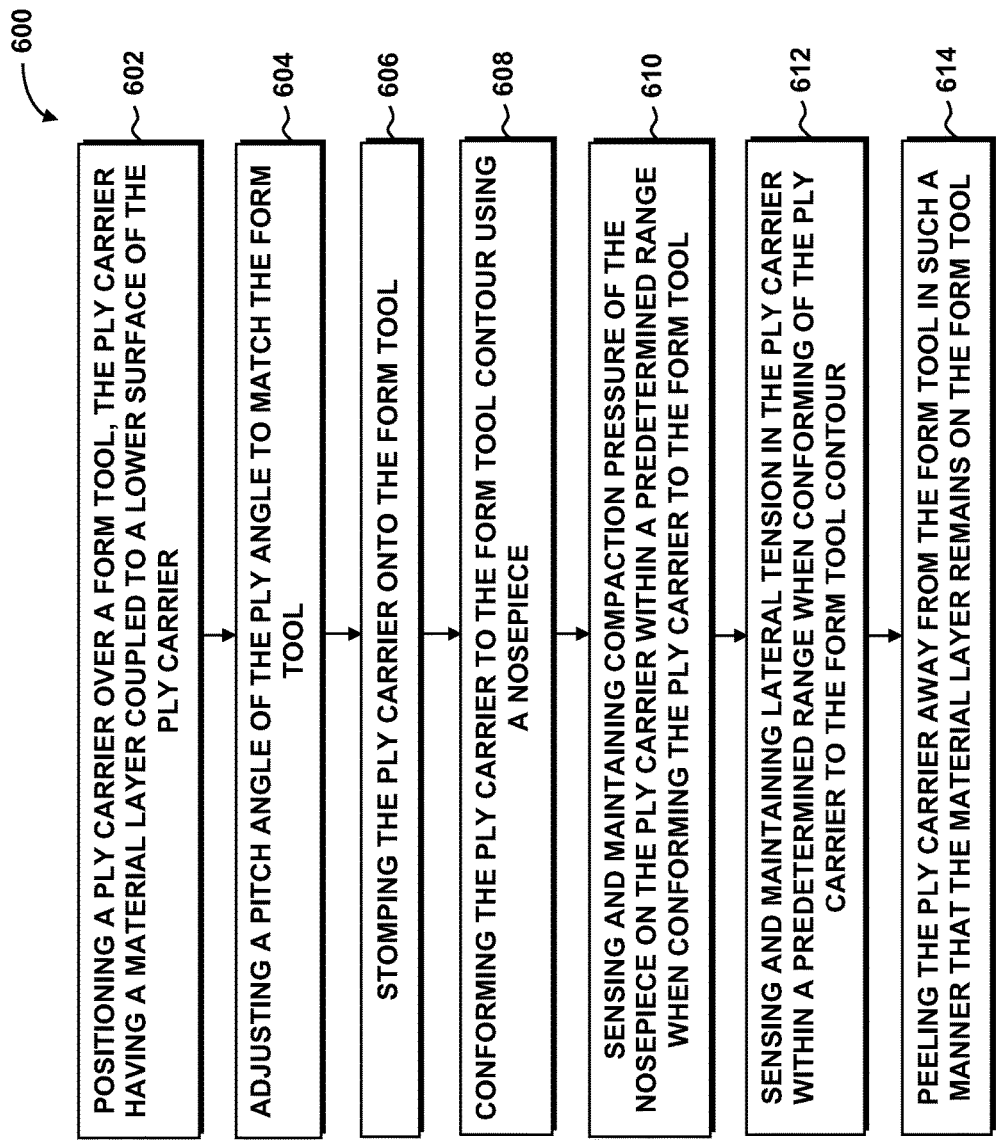
FIG. 32 is an illustration of a flowchart of one or more operations that may be included in a method of laying up a stringer.

FIG. 32 is an illustration of a flowchart of one or more operations that may be included in a method 600 of laying up a stringer. One or more of the operations may be performed using a stringer forming apparatus 200 (FIG. 11) as disclosed herein. The method 600 may include mounting a material layer 458 (e.g., a course 460 of composite material) to a ply carrier 450. For example, the material layer 458 (FIG. 33) may be applied to a lower surface 452 (FIG. 33) of the ply carrier 450 (FIG. 33) such as by releasably adhering the material layer 458 to the lower surface 452 of the ply carrier 450. The ply carrier 450 may be loaded into the stringer forming apparatus 200 by attaching lateral sides 454 (FIG. 33) of the ply carrier 450 to the tension arms 414 of the tension management system 400. The opposing ends of the ply carrier 450 may be free and unsupported.

Step 602 of the method 600 may include positioning the ply carrier 450 over the form tool 220 with the material layer 458 coupled to the ply carrier 450. FIG. 33 is an end view of an example of a stringer forming apparatus 200 (FIG. 11) in a ply carrier 450 exchange position. FIG. 33 shows the tension management system 400, the stomp system 300, and the forming system 500 in their respective initial positions prior to the start of the process of forming the ply carrier 450 onto the form tool 220. The tension arms 414 of the tension management system 400 support the lateral sides 454 of the ply carrier 450 over the form tool 220. The chord frame 280 (FIG. 33) may be positioned at its highest location and may be oriented parallel to the top surface of the tool table 246. The tension arms 414 may also be at their highest location and may be oriented such that the ply carrier 450 is generally planar and oriented parallel to the tool table 246 top surface.

Each one of the stomp foot actuators 312 (FIG. 33) in the stomp foot 310 array may be fully extended and the stomp beam 302 (FIG. 33) may be retracted to its highest location. In such an arrangement, each one of the stomp feet 310 (FIG. 33) may be positioned completely above and in non-contacting relation to the generally planar ply carrier 450 (FIG. 33). The stomp foot vacuum system, if provided, may initially remain unactivated. Each one of the forming beams 502 (e.g., a left-hand forming beam and a right-hand forming beam) (FIG. 31) may be positioned at their highest location relative to the chord frame 280 (FIG. 33) and may also be positioned at their inboard limit along the Y axis (e.g., closest to the stomp beam 302). Each forming module 520 (FIG. 29) in the array on the left-hand and right-hand forming beams 502 may have their vertical cylinder rods 534 (FIG. 30) fully retracted into the vertical force cylinder 532 (e.g., pneumatic) (FIG. 30). In addition, the lateral cylinder rod 542 (FIG. 29) of each lateral force cylinder 540 may be fully extended such that each one of the nosepieces 552 (FIG. 29) is at its inboard limit.

Step 604 of the method 600 may include adjusting a pitch angle B (FIG. 10) of the ply carrier 450 (FIG. 11) to be complementary to a local chord angle (not shown) of the portion of the form tool 220 (FIG. 11) to be covered by the course or material layer. The step of adjusting the pitch angle B may include actuating at least one of the Z actuators 288 (FIG. 11) at one or both ends of the chord frame 280 (FIG. 33), and adjusting the pitch angle of the chord frame 280 relative to the form tool 220 in response to actuating the Z actuator 288. The pitch angle B may be sensed by one or more optical sensors (not shown) that may optionally be located at each end of the chord frame 280. The chord frame 280 may be lowered until the optical beams emitted by the optical sensors on each end are broken. In some examples, the chord frame 280 may be lowered until the ply carrier 450 is approximately 6 inch above the center datum 234 of the form tool 220.

Step 606 of the method 600 may include stomping the ply carrier 450 onto the form tool 220 such that the lengthwise center portion of the ply carrier 450 conforms to a lengthwise curvature of the form tool 220. The step of stomping may include vertically translating the stomp beam 302 relative to the chord frame 280 using at least one stomp beam actuator 304 until the array of stomp feet 310 contact the form tool 220 and clamp the ply carrier 450 to the form tool 220 to thereby lock the lateral position of the ply carrier 450 relative to the form tool 220. More specifically, referring to FIG. 34, Step 606 may include pre-shaping the ply carrier 450 by extending each one of the stomp foot actuators 312 (e.g., pneumatic cylinders), and actuating the stomp beam actuators 304 to lower the stomp beam 302 until the stomp feet 310 touch the top of the ply carrier 450.

If vacuum is provided, a stomp vacuum may be applied to vacuum-couple the ply carrier 450 (FIG. 34) to the array of stomp feet 310 (FIG. 34) as a means to establish a centerline index of the ply carrier 450. The stomp beam actuators 304 (FIG. 22) may continue to lower the stomp beam 302 until the position feedback of each one of the stomp foot actuators 312 indicates that the stomp feet 310 have contacted the center datum 234 (FIG. 34) of the form tool 220 (FIG. 34), thereby capturing the ply carrier 450 against the form tool 220. The stomp foot actuators 312 (FIG. 34) may be continuously pressurized and may initially be fully extended. A position sensor in each one of the stomp foot actuators 312 may sense contact of the stomp foot 310 with the form tool 220. Upon indication of complete clamping of the ply carrier 450 onto the form tool 220, the stomp foot 310 vacuum may be deactivated.

As the centerline of the ply carrier 450 (FIG. 34) is driven down by the stomp feet 310 (FIG. 34) into contact with the center index of the form tool 220 (FIG. 34), the tensions arms of the tension management system 400 (FIG. 34) may be rotated to relax the tension induced by downward displacement of the stomp feet 310. In this regard, the above-described vertical and rotational position actuators 406, 410 (FIG. 20) and the vertical and rotational counterbalance cylinders 408, 412 (FIG. 20) of the tension management system 400 may cooperate to allow the actuators 406, 410 to sense and maintain the lateral tension 462 (FIG. 34) on each side of the ply carrier 450 within a predetermined range to prevent the ply carrier 450 and material layer 458 (FIG. 20) from sagging and contacting the form tool 220, yet still provide enough slack to allow the stomp feet 310 to clamp the ply carrier 450 onto the form tool 220.

Figure 34:
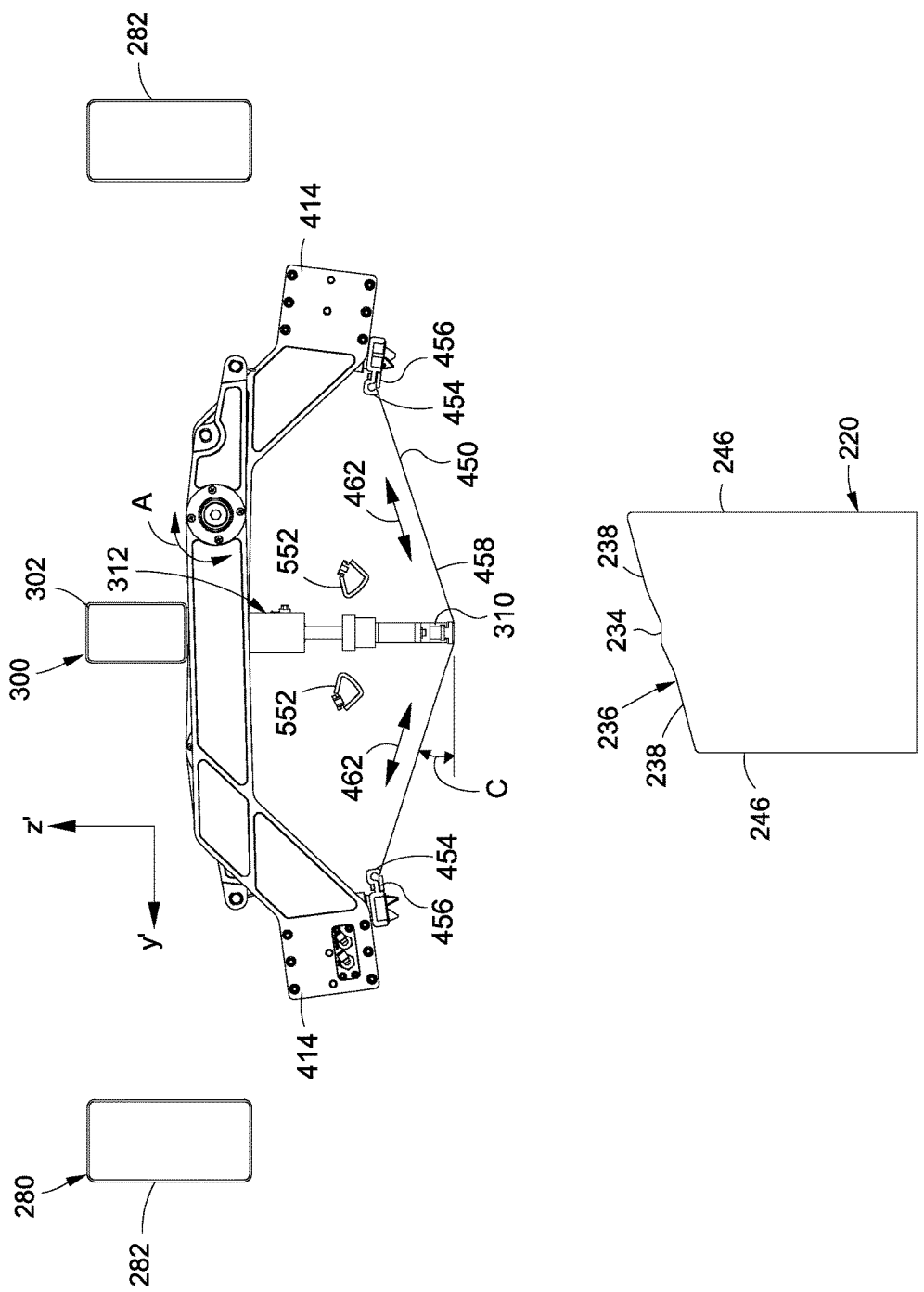
FIG. 34 is an end view of the stringer forming apparatus of FIG. 33 showing the stomp foot actuators extended into contact with the ply carrier.
Figure 35:
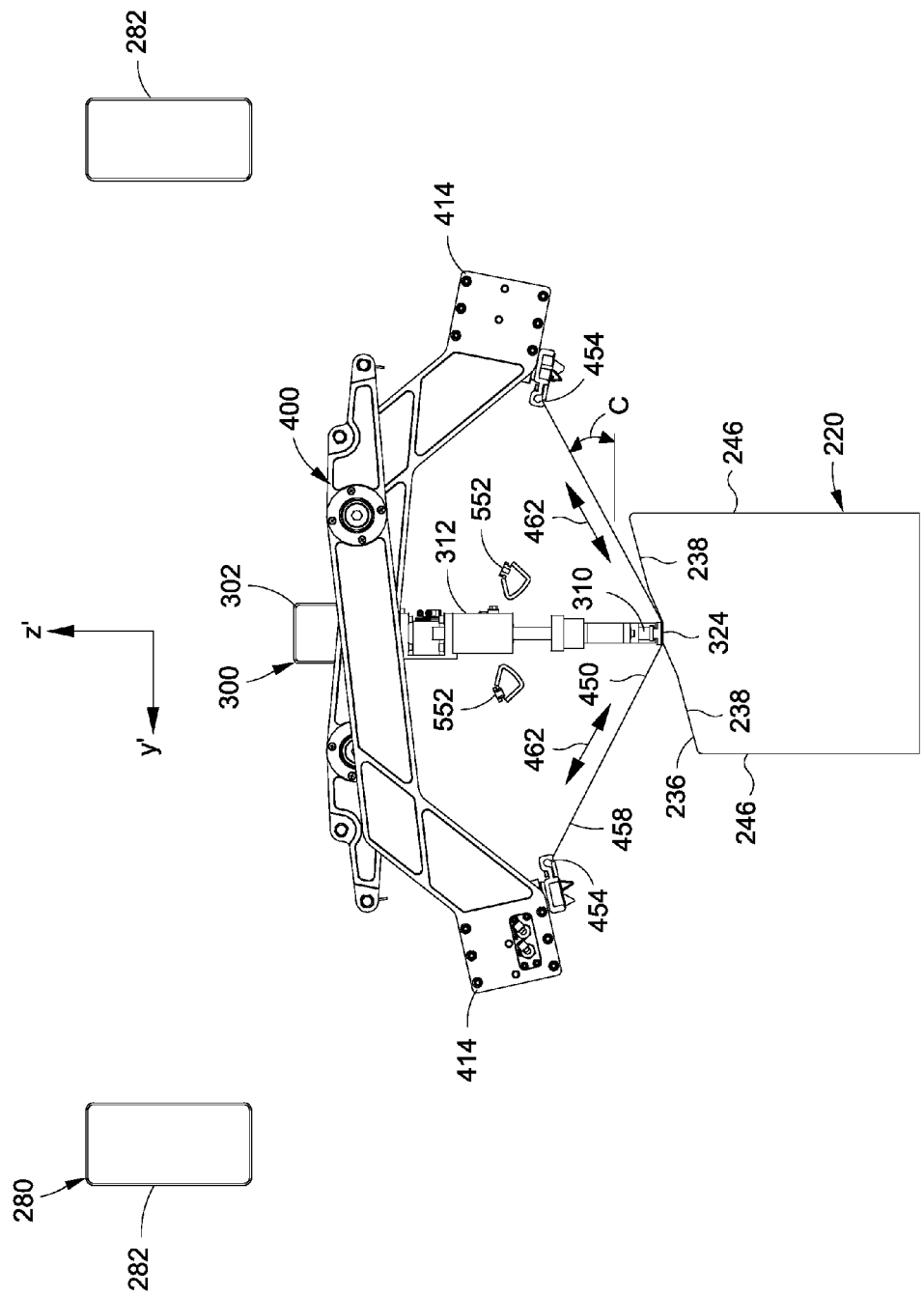
FIG. 35 is an end view of the stringer forming apparatus of FIG. 33 showing the stomp foot capturing the ply carrier against the blade form tool.

When the final stomp foot actuator 312 in the array contacts the form tool 220 (or contact a previously applied material layer 458), the position sensor in the final stomp foot actuator 312 may transmit a signal to the stomp beam actuators 304 (FIG. 22) to stop vertical translation of the stomp beam 302. With the ply carrier 450 stomped onto the form tool 220, each side of the ply carrier 450 may be oriented at a ply carrier angle C that prevents each side of the ply carrier 450 from contacting the form tool 220 in any location except where clamped to the center index. In the arrangement shown in FIG. 34, each side of the ply carrier 450 may be oriented at a ply carrier angle C of approximately 20-25° relative to horizontal. FIG. 35 shows the stomp foot 310 capturing the ply carrier 450 against the form tool 220.

Step 608 of the method 600 may include conforming the ply carrier 450 (FIG. 35) and the attached material layer 458 (FIG. 35) to the form tool contour 236 (FIG. 35). The conforming step may include laterally sweeping the left-hand and right-hand array of nosepieces 552 (FIG. 34) across the form tool 220 (FIG. 35) in a generally inboard-outboard direction, and compacting the ply carrier 450 and material layer 458 (e.g., the course 460) against the form tool 220 during the sweeping of the nosepieces 552. The compacting of the ply carrier 450 may be performed by translating the array of nosepieces 552 using the array of forming modules 520. In some examples, the left-hand and right-hand arrays of forming modules 520 (FIG. 30) may be operated independently but simultaneously during the process of forming the ply carrier 450 to the form tool 220. During the forming process, the chord frame 280 (FIG. 33) and the stomp beam 302 (FIG. 35) may be maintained in the same position as in the previous step. Both of the forming beams 502 (FIG. 30) may be lowered (e.g., approximately 2 inches) relative to the chord frame 280 using the forming Z' actuators 504 (FIG. 11). The forming beams 502 may be moved laterally using the forming Y actuators 514 (FIG. 27) to position the array of nosepieces 552 above the inboard edge of the flange contour 238 on each side of the center datum 234. The lateral cylinder rods 542 (FIG. 29) of each lateral force cylinder 540 may remain fully extended such that each nosepiece 552 (e.g., the nosepiece slider bracket 546) is at its inboard limit. The vertical cylinder rods 534 may be extended out of the vertical force cylinders 532 until the nosepieces 552 contact the ply carrier 450 and compact the material layer 458 (FIG. 35) against the form tool 220 on each side of the center datum 234.

Figure 36:
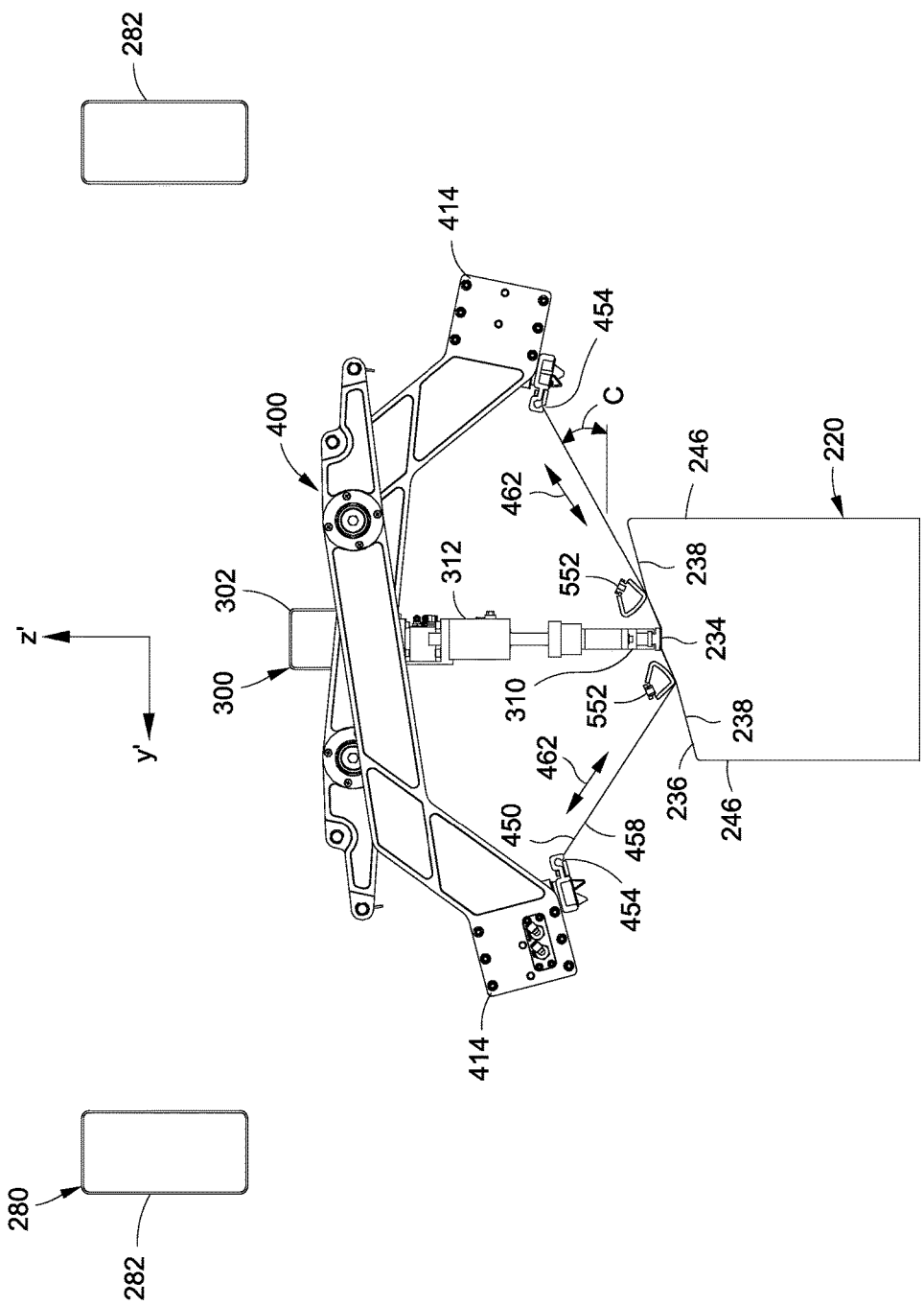
FIG. 36 is an end view of the stringer forming apparatus of FIG. 33 showing the nosepieces on the left and right sides of the center datum conforming the ply carrier against the flange contours on opposite sides of the blade form tool.

FIG. 36 shows the start of the flange forming process wherein the nosepieces 552 on the left and right sides of the center datum 234 sweep in laterally opposite directions and conforming the ply carrier 450 against the flange contours 238 on opposite sides of the blade form tool 222 (FIG. 11). The chord frame 280 (FIG. 33) and the stomp feet 310 may be maintained in the same position as in the previous step. Each one of the forming beams 502 may also be maintained in the same Z' position as in the previous step. The forming Y actuators 514 may translate each one of the forming beams 502 (FIG. 30) laterally outboard, pulling the nosepieces 552 laterally across the ply carrier 450 on each side of the center datum 234. The vertical force cylinders 532 (e.g., pneumatic) of the forming modules 520 may passively follow the flange contour 238 of the form tool 220 until each one of the nosepieces 552 reaches the radius 242 (FIG. 38) transition point at the intersection of the flange contour 238 and the web contour 240 on each side of the form tool 220.

Step 610 of the method 600 may include sensing and maintaining the compaction pressure of the nosepiece 552 (FIG. 36) on the ply carrier 450 (FIG. 36) within a predetermined range during conforming of the ply carrier 450 to the form tool contour 236 (FIG. 36). As indicated above, the position feedback of the vertical force cylinder 532 (FIG. 30) and the lateral force cylinder 540 (FIG. 28) of each one of the forming modules 520 may sense compaction pressure applied by the nosepiece 552 onto the ply carrier 450 during the forming process. The position feedback may allow the vertical force cylinder 532 and the lateral force cylinder 540 to maintain the compaction pressure of the nosepiece 552 within a predetermined range.

Figure 37:
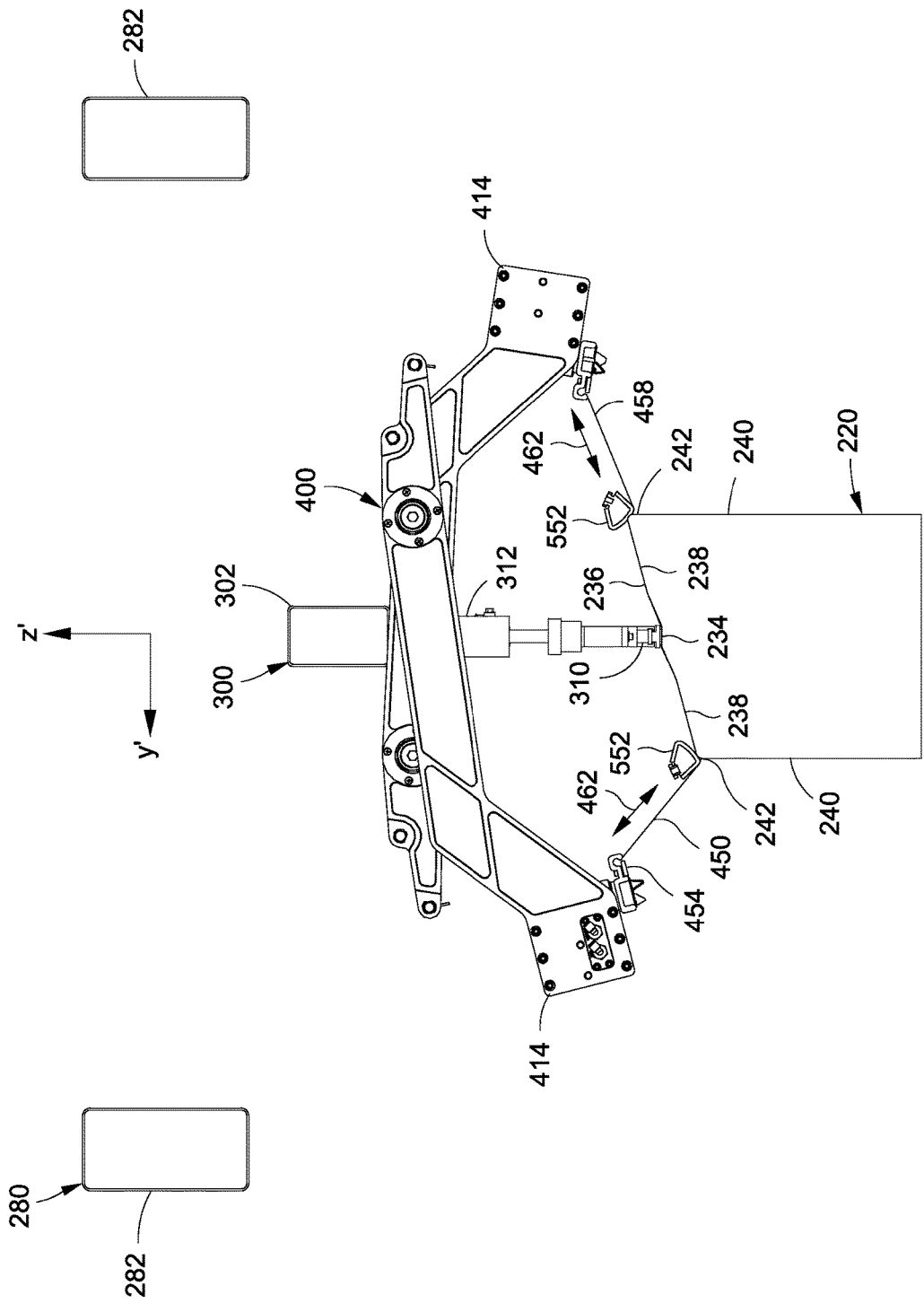
FIG. 37 is an end view of the stringer forming apparatus of FIG. 33 after the nosepieces on the left and right sides of the center datum have reached the respective radius transition points on opposite sides of the blade form tool.

FIG. 37 is an end view of the stringer forming apparatus 200 (FIG. 18) at the end of the flange forming process wherein the nosepieces 552 on the left and right sides of the form tool 220 have reached the respective radius 242 on opposite sides of the form tool 220. In this regard, the Z" position and the Y position of each forming module 520 (FIG. 30) may be monitored during the flange forming process. The radius 242 may be sensed when the change in the Z" position (e.g., the delta Z'") and the change in the Y position (e.g., the delta Y) are equal to each other. Once the radius 242 transition point is reached by the last nosepiece 552 in the array on a given side of the form tool 220, that arrays Y motion may be halted. The Z" motion may also be frozen by activating the cylinder rod lock 536 (FIG. 28) of the vertical force cylinder 532. During the process of forming the ply carrier 450 to the form tool 220, the lateral width of the ply carrier 450 on each side of the form tool 220 may be consumed as the material layer 458 is adhered to the form tool 220 or adhered to a previously-applied material layer 458. As shown in FIG. 37, each side of the ply carrier 450 may be oriented at an upward ply carrier angle C relative to horizontal. In this regard, the direction of the lateral tension 462 in each side of the ply carrier 450 may be lateral or slightly upward. During the process of forming the ply carrier 450 to the flange contour 238 on each side of the form tool 220, the tension arms 414 may rotate downwardly about the pivot point 420 to relax the tension in the ply carrier 450.

Figure 38:
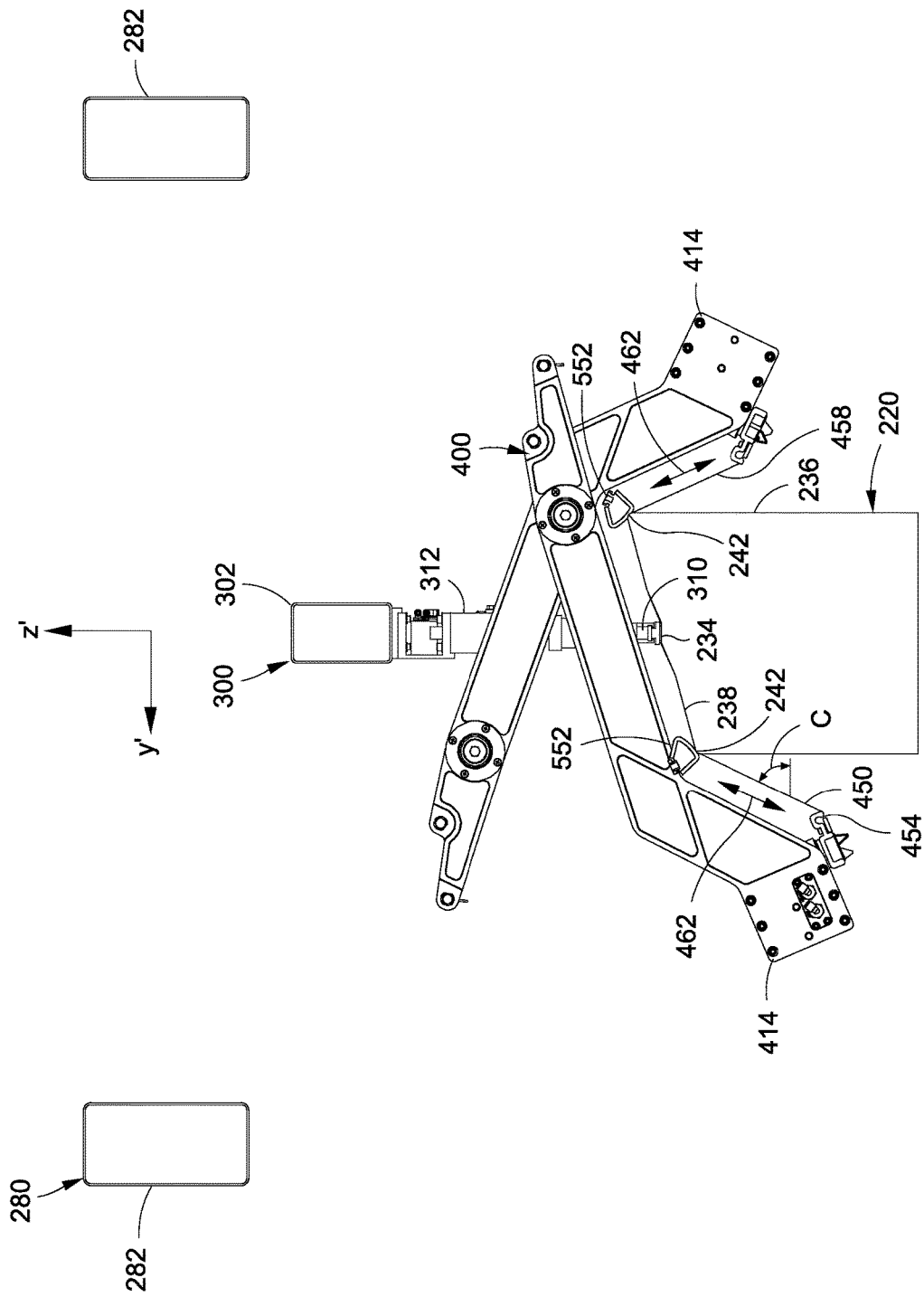
FIG. 38 is an end view of the stringer forming apparatus of FIG. 33 showing the tension arms rotated downwardly.

FIG. 38 is an end view of the stringer forming apparatus 200 (FIG. 11) at the start of the downward shifting of the ply carrier 450 and the start of the web forming process. In FIG. 38, the chord frame 280 (FIG. 33), the array of stomp feet 310, the forming modules 520 (FIG. 28), and the forming beams 502 (FIG. 30) maintain the same position as in the previous step. After all the nosepieces 552 have reached the radius 242 transition point, the tension arms 414 may be rotated downwardly to a predetermined ply carrier angle C relative to horizontal. In the example shown, the ply carrier 450 on each side of the form tool 220 may be oriented at a downward ply carrier angle C relative to horizontal. The tension arms 414 may be vertically translated downwardly on their individual Z' axes until lateral tension 462 in each side of a ply carrier 450 reaches a predetermined minimum value. With the ply carrier angle C oriented downwardly, the lateral tension 462 vector may also be oriented generally downwardly Step 612 of the method 600 may include sensing and maintaining lateral tension 462 (FIG. 38) in the ply carrier 450 (FIG. 38) within a predetermined range during the process of conforming of the ply carrier 450 to the form tool contour 236 (FIG. 38). As indicated above, the tension management system 400 (FIG. 38) is configured to control the lateral tension 462 in the ply carrier 450 when conforming the ply carrier 450 to the flange contours 238 (FIG. 38) and web contours 240 in such a manner that the material layer 458 is taught enough to prevent the material layer 458 (FIG. 38) from touching the form tool 220 (FIG. 38) except at the location where the nosepieces 552 are conforming the material layer 458 to the form tool 220, and the material layer 458 is loose enough to allow the nosepieces 552 to apply the desired amount of compaction pressure to adhere the material layer 458 to the form tool 220 or to the previously-applied material layer 458. In the presently-disclosed stringer forming apparatus 200, the step of sensing and maintaining lateral tension 462 in the ply carrier 450 may include supporting the lateral sides 454 (FIG. 38) of the ply carrier 450 using the pair of tension arms 414 (FIG. 38). The method may further include adjusting the vertical position and/or angular position of each one of the tension arms 414 relative to the form tool 220 using one or more actuators such as the above-described vertical position actuator 406 (FIG. 18) and rotational position actuator 410.

The method may additionally include counterbalancing the mass of each one of the tensions arms 414 (FIG. 38) during vertical and/or angular movement of the tensions arms 414 using one or more counterbalance cylinders 408, 412 (FIG. 18). For example, a vertical counterbalance cylinder 408 may balance the mass of the tension arm 414 for the vertical position actuator 406 (FIG. 18). A rotational counterbalance cylinder 412 may balance the mass of the tension arm 414 for the rotational position actuator 410 (FIG. 18). The method may additionally include sensing, using the actuators, the force on the tension arms 414 absent the force due to the mass (e.g., inertia) of the tension arms 414, and adjusting, using the actuators, the vertical and/or angular position of the tension arms 414 in a manner maintaining the lateral tension 462 (FIG. 38) in the ply carrier 450 (FIG. 38) within a predetermined range. The above-described process of sensing and maintaining lateral tension 462 in the ply carrier 450 may be performed continuously or at one or more points during the process of conforming the ply carrier 450 to the form tool contour 236 (FIG. 38). The process of sensing and maintaining lateral tension 462 in the ply carrier 450 may also be performed when peeling the ply carrier 450 off of the form tool 220 (FIG. 38). The tension in the ply carrier 450 may be managed during forming so as not to form pleats or wrinkles in the material layer 458 (FIG. 38). The position of the tension arms 414 may be controlled to control the ply carrier angle C on each side of the ply carrier 450. In this regard, the tension arm 414 position and resulting ply carrier angle C may be controlled in a manner that prevents premature separation of one or more portions of the material layer 458 from the ply carrier 450.

Figure 39:
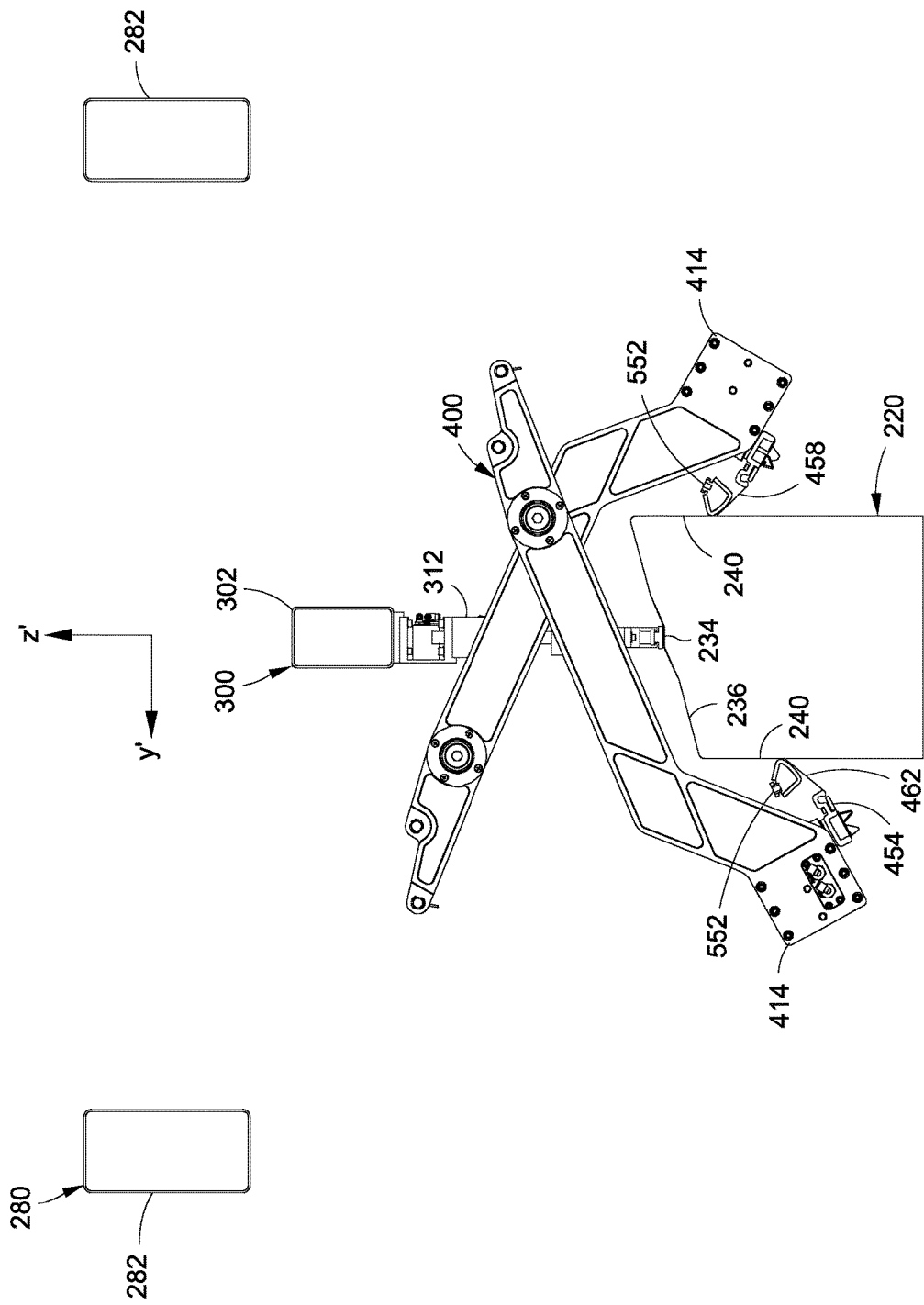
FIG. 39 is an end view of the stringer forming apparatus of FIG. 33 showing further rotation of the tension arms as the nosepieces conform the ply carrier to the web contour on opposite sides of the blade form tool.

FIG. 39 is an end view of the stringer forming apparatus 200 (FIG. 11) showing the process of forming the ply carrier 450 (FIG. 38) and the material layer 458 to the web contours 240 on opposite sides of the form tool 220. The chord frame 280 (FIG. 33), the array of stomp feet 310, and the forming modules 520 (FIG. 28) may maintain the same position as in the previous step. The tension arms 414 may be positioned to maintain a constant tension arm 414 angle on each side of the form tool 220. The Y motion and the Z″ motion capability of each one of the forming modules 520 may be immobilized such that the Z' and Y' axes are active with regard to motion of the forming beams 502 and forming modules 520 when the nosepieces 552 are swept along the web contours 240 of the form tool 220. The tension management system 400 may also be active along the Z' axis when the nosepieces 552 are swept along the web contours 240.

The forming beams 502 (FIG. 30) may be actuated (e.g., via the forming Z' actuators 504) to move the respective array of forming modules 520 along the Z' direction at least along the length of the web contour 240 on the respective side of the form tool 220. With the array of nosepieces 552 on each side of the form tool 220 compacted against the web contour 240, the forming Y actuators 514 (FIG. 27) of each forming beam 502 may be locked, and any changes in the web contour 240 in the lateral direction may be followed by the lateral force cylinder 540 (e.g., pneumatic cylinder) of each forming module 520. As the lateral width of each side of the ply carrier 450 is consumed as the nosepieces 552 (FIG. 29) move downwardly along the web contours 240, the lateral tension 462 in the each side of the ply carrier 450 may be relaxed by pivoting each tension arm 414 downwardly. As indicated above, the forming modules 520 may continually sense compaction pressure in the nosepieces 552 while the tension management system 400 continually senses lateral pressure in each side of the ply carrier 450 during the process of forming the ply carrier 450 to the flange contours 238 and the web contours 240 on each side of the form tool 220. The range of compaction pressure may be dependent upon the material system, the fiber orientation of the course 460 (FIG. 6) being applied to the form tool 220 (e.g., 0°, 45°, 90° fiber angle), and other factors.

Step 614 of the method 600 may include peeling the ply carrier 450 (FIG. 38) away from the form tool 220 (FIG. 39) in such a manner that the material layer 458 (FIG. 39) remains on the form tool 220. Once the nosepieces 552 (FIG. 39) reach the bottom of the web contour 240 (FIG. 39), the maximum stroke of the forming Z' actuator 504 may have been reached. In preparation for the process of peeling the ply carrier 450 off of the form tool 220, the lateral force cylinder 540 of each forming module 520 may be retracted which may withdraw the array of nosepieces 552 from contact with the ply carrier 450. Alternately, the nosepieces 552 may remain in contact with the ply carrier 450 with reduced or negligible compaction pressure, and the forming Z' actuators 504 (FIG. 26) may reverse direction and translate the forming modules 520 upwardly forcing the ply carrier 450 to peel off the web contour 240 and flange contour 238 on each side of the form tool 220.

During the peeling process, the chord frame 280 (FIG. 33) may maintain the same position as in the previous step. The forming beams 502 (FIG. 26) may be fully retracted in the Z' direction. The cylinder rod lock 536 (FIG. 28) of each one of the vertical force cylinders 532 (FIG. 28) may be deactivated, and each one of the vertical cylinder rods 534 (FIG. 28) may be fully retracted into its vertical force cylinder 532. The forming beams 502 may be returned to their maximum inboard Y position. In addition, the array of stomp feet 310 (FIG. 39) may be fully retracted along their stomp foot actuator 312 (FIG. 39) axes.

Figure 40:
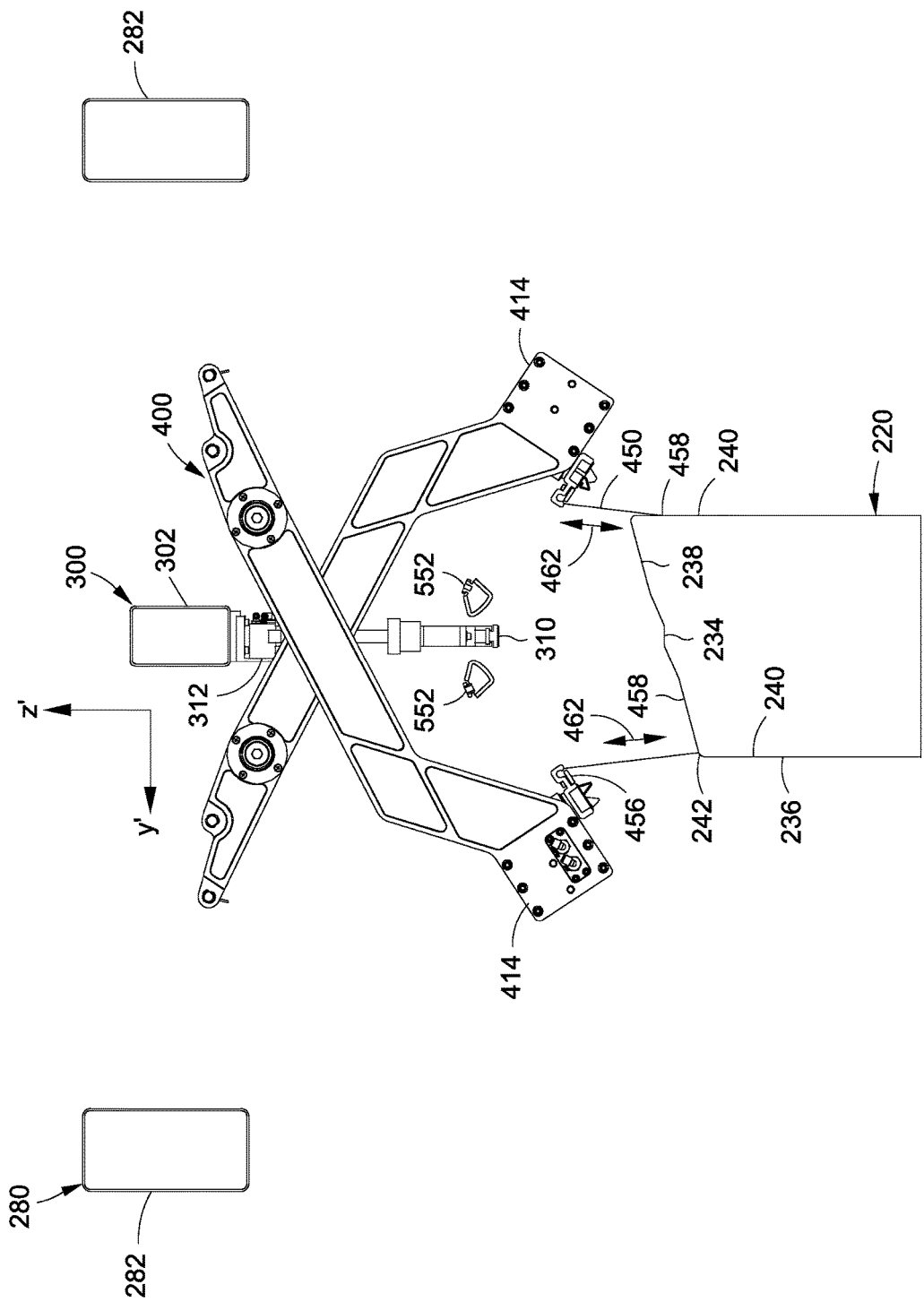
FIG. 40 is an end view of the stringer forming apparatus of FIG. 33 showing the tension arms translated upwardly and the ply carrier peeled away from the web contours of the blade form tool.
Figure 41:
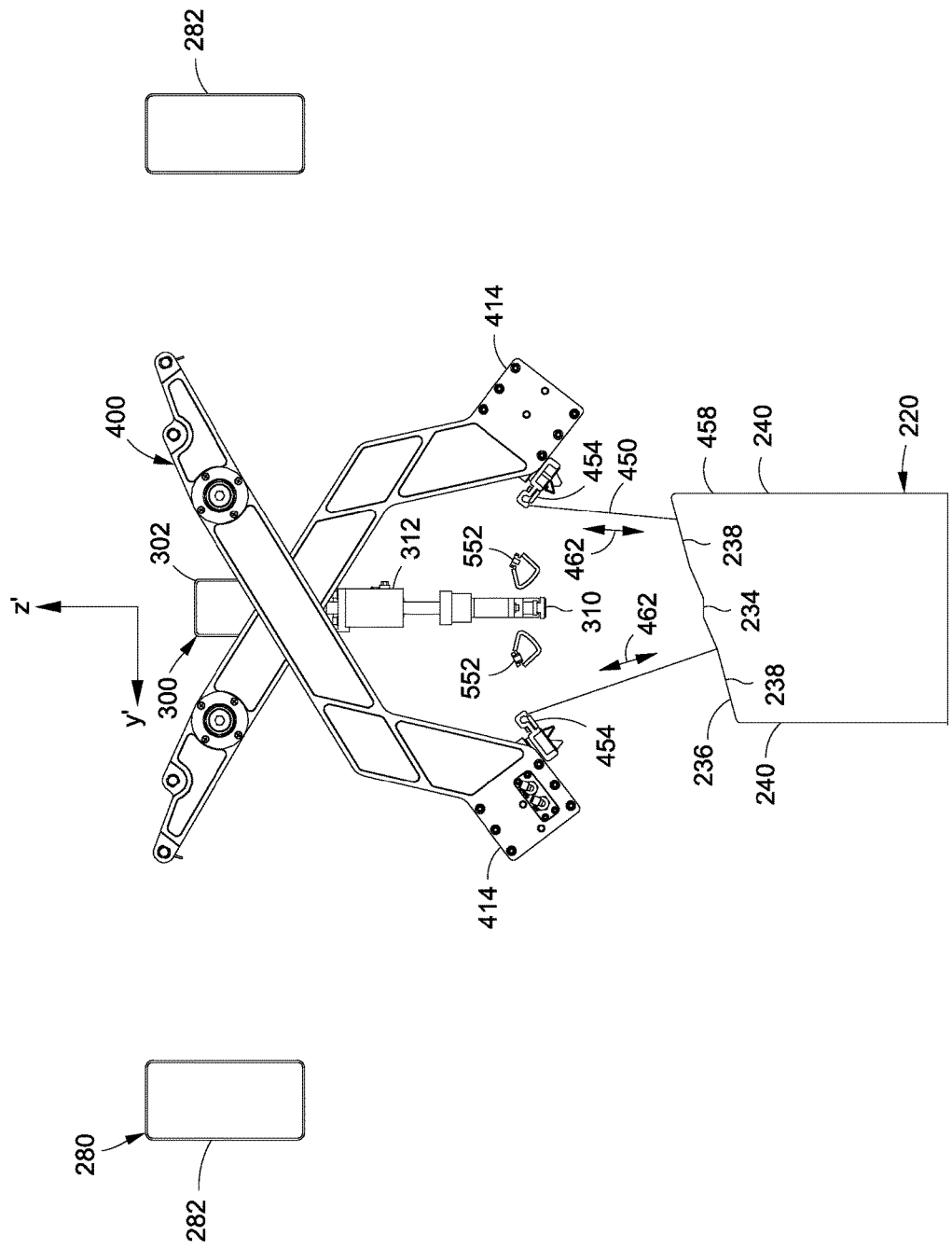
FIG. 41 is an end view of the stringer forming apparatus of FIG. 33 showing further upward translation of the tension arms as the ply carrier is peeled away from the flange contours of the blade form tool.

FIG. 40 is an end view of the stringer forming apparatus 200 showing the ply carrier 450 after peeling away from the web contour 240 and the start of peeling away from the flange contour 238 on each side of the form tool 220. FIG. 41 shows further upward translation of the tension arms 414 as the ply carrier 450 is peeled away from the flange contours 238 of the form tool 220. In some examples, the tension arms 414 may be positioned to maintain a constant ply carrier angle C relative to horizontal throughout the peeling step. In other examples, the ply carrier angle C may vary as the ply carrier 450 is peeled off of the form tool 220.

The tension arm vertical position actuators 406 (FIG. 6) may be activated to vertically translate the tension arms 414 upwardly to their fully retracted Z' position which may cause the ply carrier 450 to peel off the remainder of web contours 240.

Figure 42:
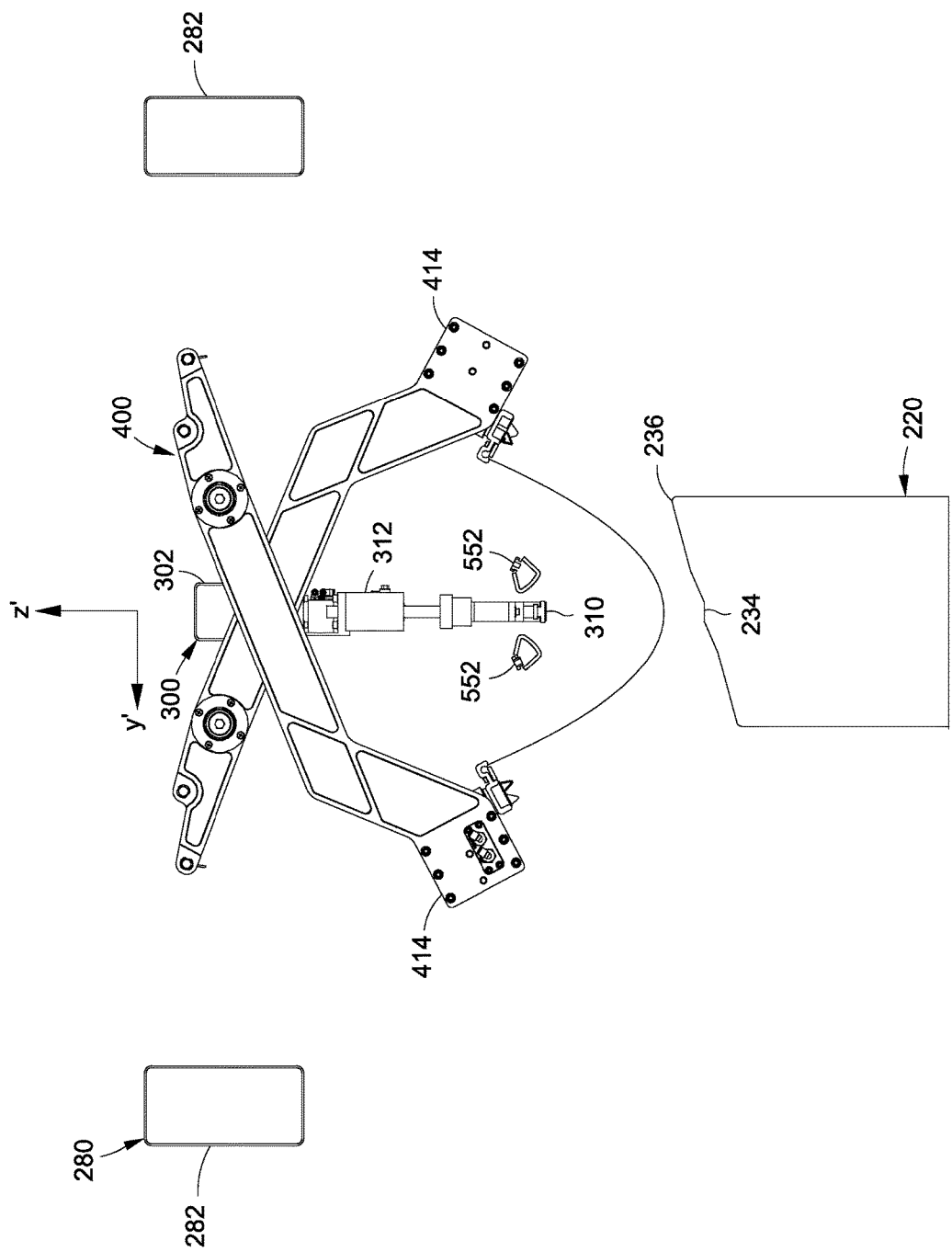
FIG. 42 is an end view of the stringer forming apparatus of FIG. 33 after the ply carrier is peeled away from the blade form tool.

FIG. 42 shows the stringer forming apparatus 200 (FIG. 11) after the ply carrier 450 (FIG. 41) is peeled away from the form tool 220 after which the tension management system 400, the stomp system 300, and forming system 500 (FIG. 30) are in their respective initial positions. After the tension arms 414 have been retracted in their Z' direction, the chord frame 280 (FIG. 33) may be rotated back to a 0° pitch angle B relative to horizontal. Rotating the chord frame 280 back to a horizontal orientation may start peeling the ply carrier 450 off of a low point on the flange contour 238 (FIG. 41) of the form tool 220. The chord frame 280 may be raised along the Z direction to its maximum height which may complete the process of peeling the ply carrier 450 from the form tool 220 (FIG. 34). Each one of the tension arms 414 may be returned to a 0° rotation angle such that the stomp beam 302, the tension management system 400, and the forming system 500 may be in the carrier exchange position shown in FIG. 33 and described above. The stringer forming apparatus 200 may be moved along the car rails 204 to the next spanwise position 206 (FIG. 7) along the form tool 220. The empty ply carrier 450 may be removed from the tension arms and replaced with a ply carrier 450 supporting a new material layer 458 (FIG. 41). The above-described cycle of stomping, conforming, and peeling the ply carrier 450 may be repeated to apply the new material layer 458 at the new spanwise position 206 on the form tool 220.

FIGS. 43-44 are cross-sectional views of alternative embodiments of a form tool 220 (FIG. 34) that may be implemented for use with the stringer forming apparatus 200 (FIG. 11). As distinguished from the blade form tool 222 of FIGS. 33-42 which is used to layup both a first stringer half 110 (e.g., the left half) and a second stringer half 112 (e.g., the right half) of a complete stringer 106 (FIGS. 3-5), each one of the blade form tools 222 in FIGS. 43-33 is symmetrical and may be used to layup up a pair of first stringer halves 110 and a pair of second stringer halves 112. For example, the blade form tool 222 of FIG. 43 may be used to layup a pair of first stringer halves 110. The blade form tool 222 of FIG. 44 may be used to layup a pair of second stringer halves 112.

FIGS. 45-46 are cross-sectional views of the blade stringer 122 charges that were each assembled from a first stringer half 110 and a second stringer half 112. FIG. 45 shows a blade stringer 122 assembled from a first stringer half 110 laid up on the form tool 220 of FIG. 43 and a second stringer half 112 laid up on the form tool 220 of FIG. 44. FIG. 46 also shows a blade stringer 122 assembled from a first stringer half 110 laid up on the form tool 220 of FIG. 43 and a second stringer half 112 laid up on the form tool 220 of FIG. 44. Each one of the form tools 220 in FIGS. 43-33 may include spanwise curvature 228 (FIG. 10) corresponding to the curvature in the wing skins of the left and right wings 104 (FIG. 1) of an aircraft 100 (FIG. 1). In this regard, the blade stringers 106 of FIGS. 45 and 46 may respectively correspond to the left and right wings 104, or vice versa.

FIG. 47 is a cross-sectional view of a hat form tool 224. FIG. 48 is a cross-sectional view of a hat stringer 124 which may be laid up using the hat form tool 224 and the stringer forming apparatus 200 (FIG. 8) disclosed herein. As indicated above, the hat stringer 124 may have a hat-shaped cross-section including a cap 126 and a pair of webs 120 extending to a corresponding pair of flanges 116. The process of laying up the hat stringer 124 may be performed in a manner similar to that described above for laying a blade stringer 122 (FIG. 45).

Figure 49:
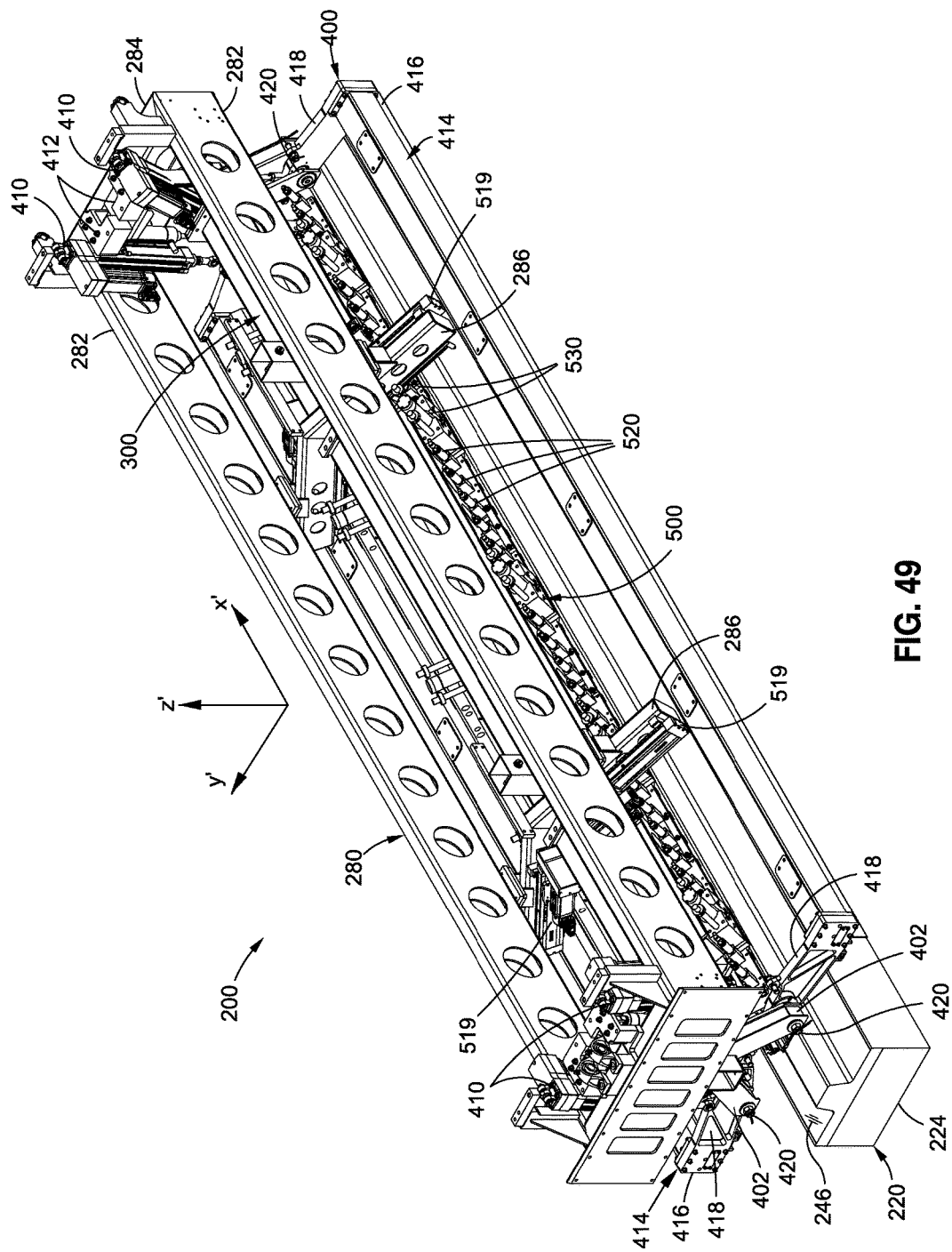
FIG. 49 is a perspective view of a further example of a stringer forming apparatus.

FIG. 49 is a perspective view of a further example of a stringer forming apparatus 200 described in the context of forming a hat stringer 124 on a spanwise segment of a hat form tool 224. The stringer forming apparatus 200 in FIG. 49 may be operated in a manner similar to the stringer forming apparatus 200 of FIG. 8 described above. The stringer forming apparatus 200 of FIG. 49 may be configured as a forming car 260 (FIG. 7) which may be translated along car rails 204 of the hat form tool 224 for guiding the stringer forming apparatus 200 in sequentially laying up composite plies to form a hat stringer 124. However, the stringer forming apparatus 200 may also be stationary.

The stringer forming apparatus 200 of FIG. 49 may include a chord frame 280 for supporting a tension management system 400, a stomp system 300, and a forming system 500. The chord frame 280 of FIG. 49 may be similar to the chord frame of FIG. 15 in that the chord frame 280 of FIG. 49 may include a parallel pair of side beams 282 which may be interconnected by an opposing pair of end beams 284. The chord frame 280 may include one or more cross beams 286 for supporting the stomp beam 302. In the example shown, the chord frame 280 includes a pair of cross beams 286 each comprised of angled portions forming an A-frame configuration for supporting the stomp beam 302 in the apex of the A-frame cross beams 286. However, the cross beams 286 may be provided in any configuration, including a straight configuration as shown in FIG. 15. Although not shown in FIG. 49, the chord frame 280 may be supported by a pair of end frames 264 on opposite ends of the stringer forming apparatus 200. Z actuators 288 may be mounted to the end frames 264 for independently moving the chord frame 280 in a manner to adjust the vertical position and the pitch angle B of the chord frame 280 to match the local tangent of the spanwise curvature of the hat form tool 224 as described above.

Figure 50:
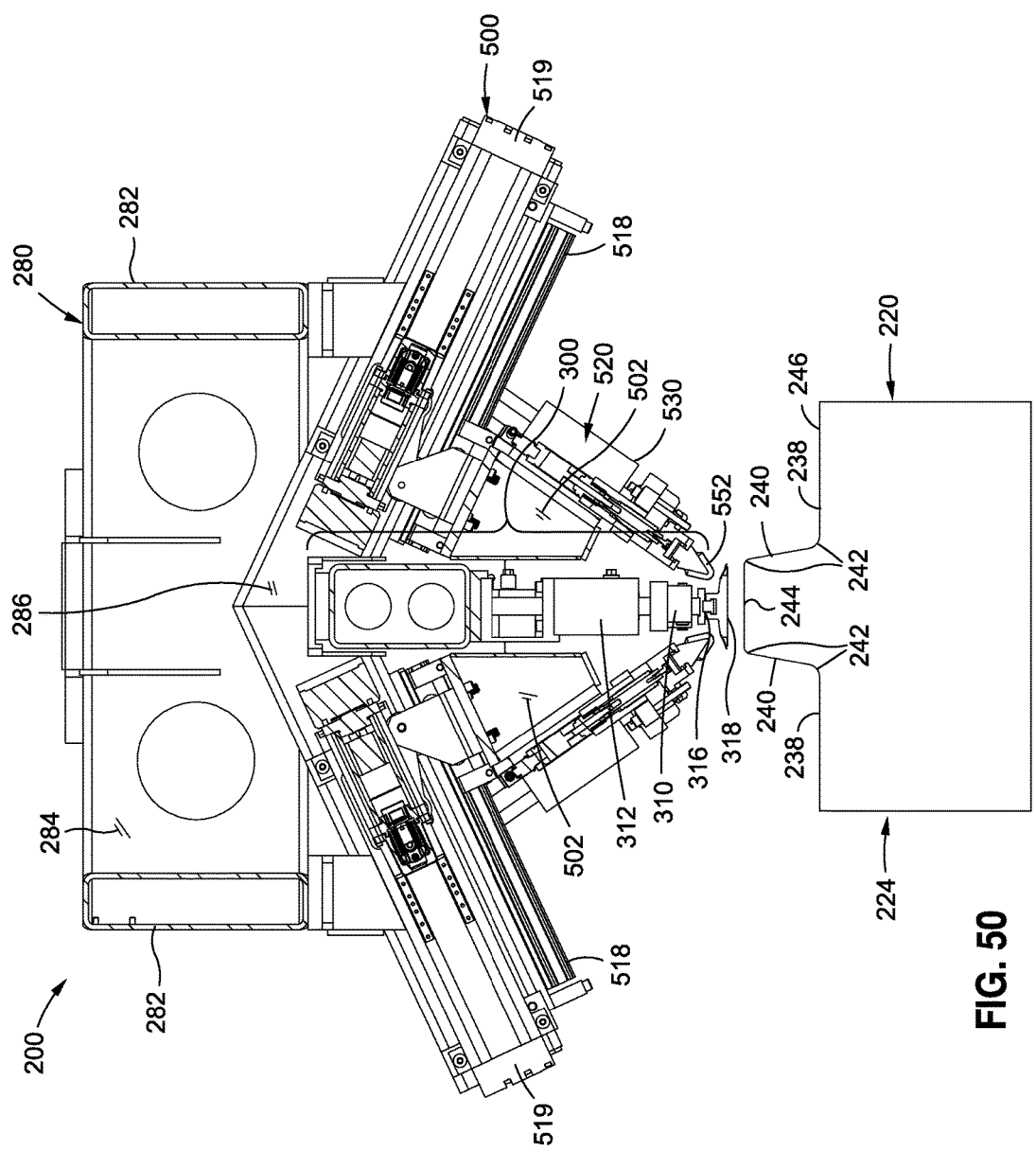
FIG. 50 is an end view taken along line 50 of FIG. 49 and illustrating the stringer forming apparatus mounted over a hat form tool for forming a hat stringer as shown in FIG. 48.

FIG. 50 is an end view of the stringer forming apparatus 200 taken along line 50 of FIG. 49 and illustrating the stringer forming apparatus 200 suspended over a hat form tool 224. As indicated above, the frame legs 266 (e.g., see FIG. 11) of the end frames 264 may straddle the hat form tool 224 and may be movably coupled to the car rails 204. As described in greater detail below, the stringer forming apparatus 200 may include a tension management system 400 for supporting the ply carrier 450 during application of a material layer 458 to the hat form tool 224. A material layer (not shown) such as a composite ply may be mounted to the lower surface 452 of the ply carrier 450. The stomp beam 302 is shown supported by the A-frame cross beams 286 which are supported by the side beams 282 of the chord frame 280.

The stomp beam 302 is part of the stomp system 300 and is described above with regard to FIGS. 21-23. The stomp system 300 may include an array of stomp foot actuators 312 which may be operatively coupled to the stomp beam 302 and actuated in a coordinated manner to clamp the ply carrier 450 and material layer 458 to the hat form tool 224 during the process of conforming the material layer 458 to the hat form tool 224. The stomp beam 302 may extend between the opposing end beams 284 of the chord frame 280. In contrast to the stomp system 300 of FIG. 21 wherein the stomp beam 302 is vertically movable relative to the chord frame 280, the stomp beam 302 shown in FIGS. 49-50 may be rigidly or non-movably coupled to the chord frame 280 by means of the A-frame cross beams 286. Vertical positioning of the stomp beam 302 may be effected by moving the chord frame 280 as a whole using the Z actuators 288 to position the stomp beam 302 relative to the hat form tool 224.

In FIG. 50, the stringer forming apparatus 200 may include left-hand and right-hand arrays of nosepieces 552 on opposite sides of the centrally-located array of stomp feet 310. The nosepieces 552 are part of the array of forming modules 520. The forming modules 520 may be mounted to a pair forming beams 502 on respective opposing sides of the stomp beam 302. Each array of forming modules 520 may be uniformly distributed along the length of each one of the forming beams 502 and may be configured to apply compaction pressure to the ply carrier 450 against the hat form tool contour 236 during the process of conforming the ply carrier 450 and material layer 458 to the form tool contour 236. On each side of the stomp beam 302, each forming beam 502 may be independently movable along the angled portion of the A-frame cross beams 286. Each angled portion of the A-frame cross beams 286 may include a cross beam rail 518 to which a forming beam 502 may be slidably coupled via an actuator bracket. The cross beam actuators 519 for each forming beam 502 may be operated in a synchronized manner to control the movement of the forming beam 502 along the angled portion of the A-frame cross beams 286 on each side of the stomp beam 302.

Each one of the forming modules 520 may include a forming module actuator 530. An array of the forming module actuators 530 on each side of the stomp beam 302 may be operated to control the position of the nosepieces 552 along a direction perpendicular (e.g., 90 degrees) to the orientation of the angled portion of the A-frame cross beams 286. However, the forming module actuators 530 may be configured to control the position of the nosepieces 552 along a direction other than 90 degrees to the orientation of the angled portion of the A-frame cross beams 286. As described in greater detail below, the cross beam actuators 519 and the forming module actuators 530 may be operated in a coordinated manner to laterally sweep the nosepieces 552 along the contours of the hat form tool 224 during the process of conforming the ply carrier 450 and material layer 458 to the form tool contour 236. In some embodiments, the forming modules 520 may include actuators having the capability to sense and control the magnitude of compaction pressure applied by the nosepieces 552 onto the ply carrier 450 via dynamic feedback during the process of conforming the ply carrier 450 to the form tool contour 236. However, in other embodiments, the cross beam actuators 519 and forming module actuators 530 may lack the capability to sense compaction pressure, and the movement of the nosepieces 552 may be preprogrammed to passively follow the form tool contour 236, with the nosepieces 552 applying compaction pressure onto the ply carrier 450 against the form tool 224 due to spring-loading or biasing of the nosepieces 552 against the form tool 224. In still other embodiments, the cross beam actuators 519 and forming module actuators 530 may be configured to vary the speed of the nosepieces 552 during the lateral sweep of the nosepieces 552 to optimize the conforming of the ply carrier 450 and material layer 458 to the geometry of the form tool 220. The speed of the nosepieces 552 may be varied when the nosepieces 552 are operated in the active mode (e.g., the actuators 519 and/or 530 sense compaction pressure) and/or when the nosepieces 552 are operated in the passive mode (e.g., the actuators 519 and/or 530 lack the capability to sense compaction pressure).

Figure 51:
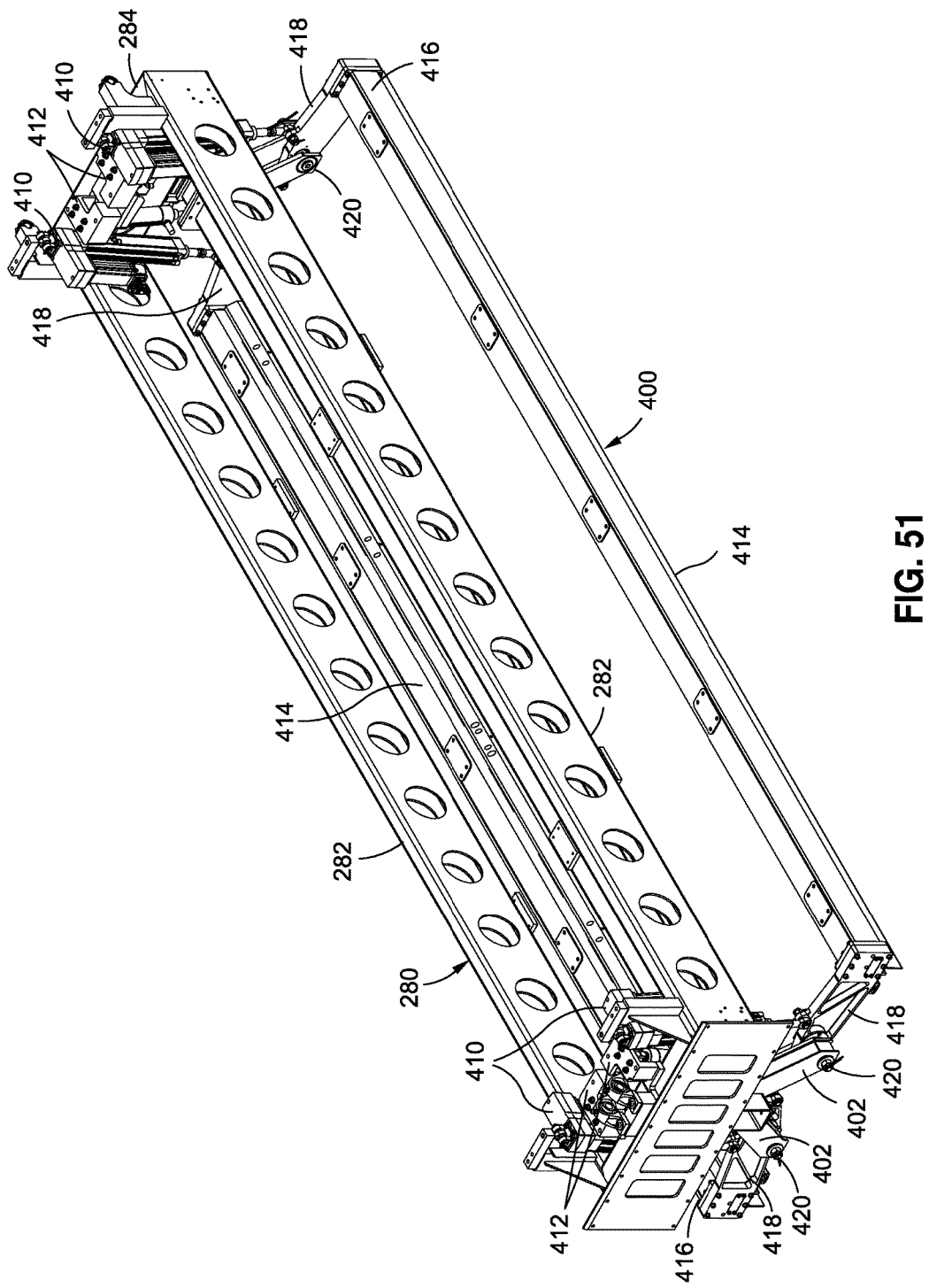
FIG. 51 is a perspective view of an example of a tension management system of the stringer forming apparatus of FIG. 49 and including a pair of tension arms each having a rotational position actuator and a rotational counterbalance cylinder at each end of each tension arm.

FIG. 51 is a perspective view of an example of a tension management system 400 of the stringer forming apparatus 200 of FIG. 49. The tension management system 400 may include a pair of tension arms 414 configured to support the lateral sides of the ply carrier 450. Each tension arm 414 may comprise a tension beam 416 and a pair of pivot arms 418 extending laterally from opposing ends of the tension beam 416. Each pivot arm 418 may be rotatably supported at a pivot point 420 on a tension arm support bracket 402 at each end of the chord frame 280. The tension arm support bracket 402 may be rigidly or non-movably coupled to the chord frame 280, and which is in contrast to the tension management system 400 of FIGS. 18-20 wherein the tension arms 414 are vertically movable relative to the chord frame 280 by means of vertical position actuators 410 on each of opposing ends of each tension arm 414.

Figure 52:
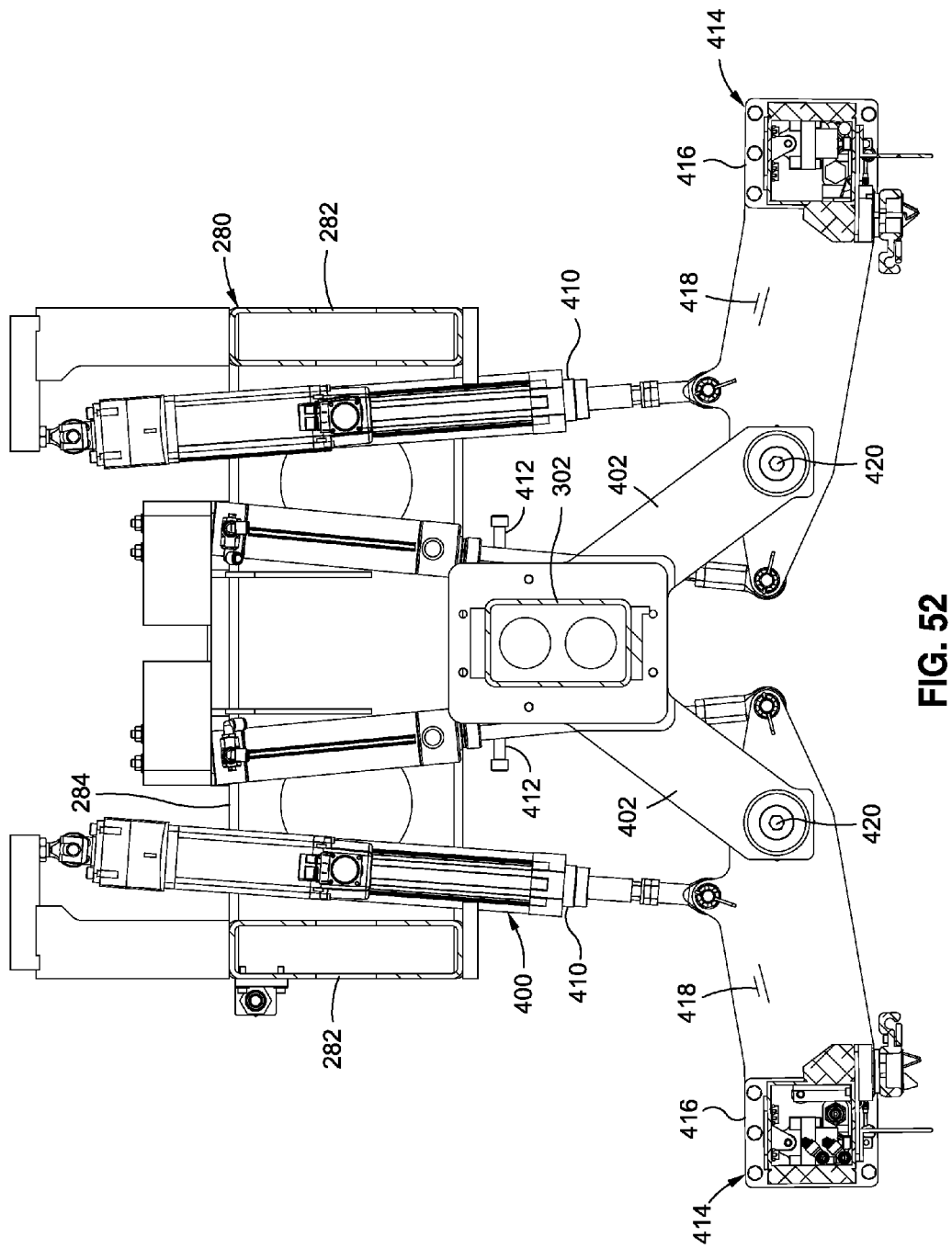
FIG. 52 is a cross-sectional view taken along line 52 of FIG. 51 and illustrating the pair of tension arms each having a rotational position actuator and a rotational counterbalance cylinder at each end of each tension arm.

FIG. 52 is a cross-sectional view taken along line 52 of FIG. 51 and illustrating the pair of tension arms 414 each having a rotational position actuator 410 and a rotational counterbalance cylinder 412 at each end of each tension arm 414. Each one of the tension arms 414 may include a tension beam 416 configured to support a stretcher rail 456 extending along a lateral side of the ply carrier 450. A material layer 458 such as a ply of composite material may be releasably adhered to the lower surface 452 of the ply carrier 450. In any one of the embodiments of the stringer forming apparatuses 200 disclosed herein, a stretcher rail 456 supporting one of the lateral sides 454 of the ply carrier 450 may be fixedly attached (e.g., hard-stop indexed) to a tension beam 416, and the remaining tension beam 416 supporting the opposite lateral side 454 of the ply carrier 450 may be spring-loaded to allow the stretcher rails 456 to take up slack in the ply carrier 450 as may occur due to variations in the manufactured width of the ply carrier 450 and/or due to wear (e.g., slight lateral stretching) of the ply carrier 450 over time and/or wear in the stringer forming apparatus 200. Providing spring-located capability to the stretcher rails 456 to take up slack in the ply carrier 450 may allow the relative location accuracy of the material layer 458 to be transferred to the layup on the form tool 220. Regarding the motion of the tension arms 414, each tension arm 414 may be rotatable about a pivot point 420 using one or more rotational position actuators 410. The pivot point 420 may be included in the tension arm support bracket 402. In some examples, each tension arm support bracket 402 may extend downwardly at an angle from the stomp beam 302.

The rotational position actuator 410 at the opposing ends of each tension arm 414 may control the position of the tension arm 414 relative to the hat form tool 224 during the process of forming the ply carrier 450 to the hat form tool 224. The position of the tension arms 414 relative to the hat form tool 224 may also be assisted by vertically translating the chord frame 280 as a whole using the Z actuators 288 (FIG. 8). In a manner described above with regard to FIGS. 33-42, the rotational counterbalance cylinders 412 of each tension arm 414 may counterbalance the mass of the tension arm 414, and thereby allow the rotational position actuators 410 to accurately sense and maintain lateral tension 462 in the ply carrier 450 within a predetermined range during the process of forming the ply carrier 450 and material layer 458 onto the form tool 224 and during the process of peeling the ply carrier 450 away from the form tool 224.

FIGS. 53-58 illustrate a sequence of operations for the process of conforming the ply carrier 450 and material layer 458 to a hat form tool 224 and peeling the ply carrier 450 away from the hat form tool 224 after completion of the conforming process. The sequence of operations involves coordinated movement of the components of the stomp system 300, the tension management system 400, and the forming system 500. Although the operational sequence in FIGS. 53-58 is described in the context of forming a material layer to a hat form tool, the operational sequence may be implemented for forming a material layer to any configuration of form tool, without limitation.

Figure 53:
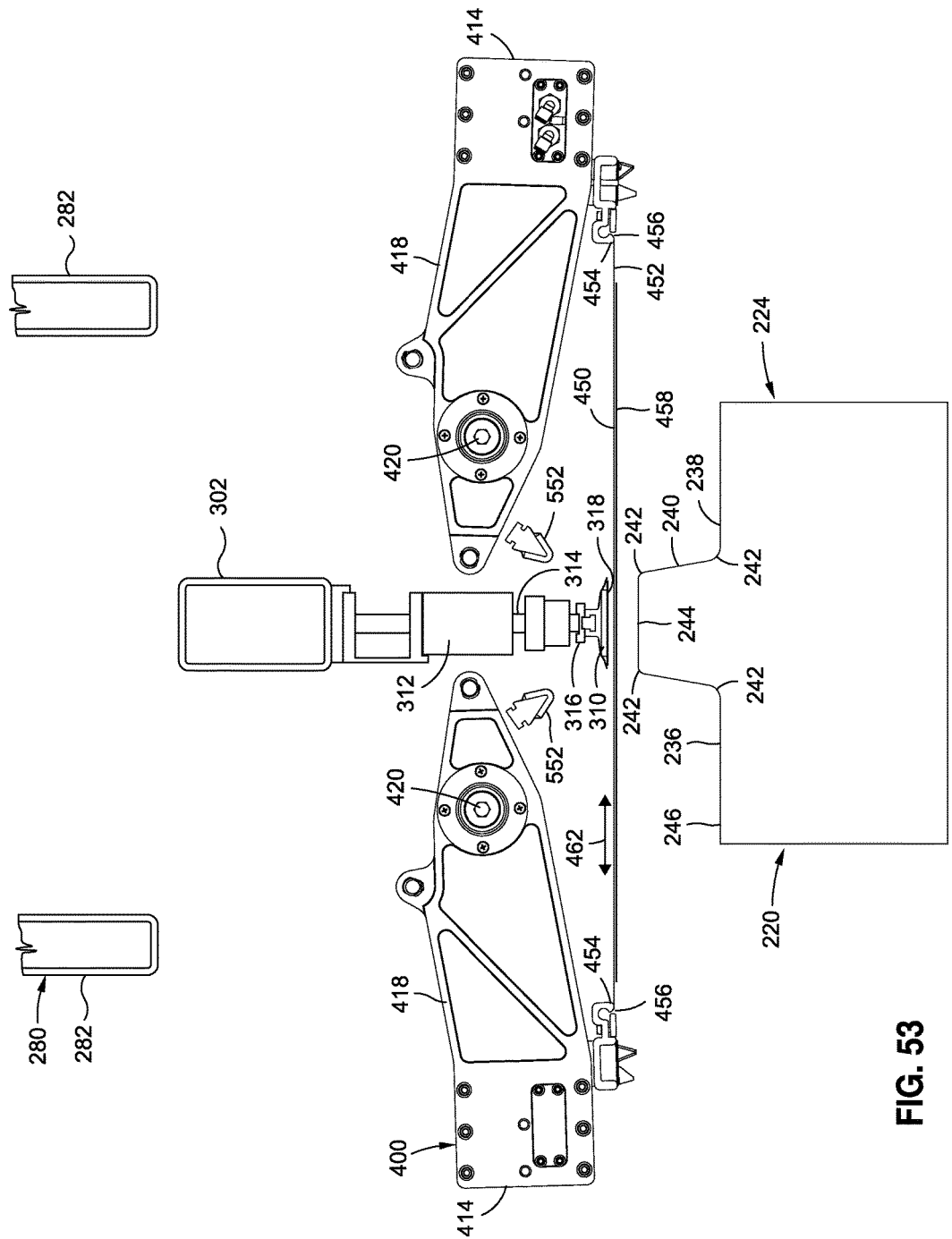
FIG. 53 is an end view of an example of a stringer forming apparatus and showing the tension management system, the stomp system, and the nosepieces in their respective initial positions prior to the start of the process of forming a ply carrier onto a hat form tool.

FIG. 53 shows an end view of the above-described stringer forming apparatus 200 for forming a hat stringer 124 and showing the chord frame 280, the tension management system 400, the stomp system 300, and the nosepieces 552 in their respective initial positions prior to the start of the process of forming a ply carrier 450 onto a hat form tool 224. The rotational position actuators 410 may be actuated to orient the forming beams 502 such that the ply carrier 450 is generally planar and is oriented generally parallel to the tool table 246 of the hat form tool 224. The Z actuators 288 (FIG. 8) on each end of the chord frame 280 may be actuated to adjust the pitch angle B of the chord frame 280 such that the ply carrier 450 is generally parallel to a local tangent (not shown) of the form tool 224, as described above. The chord frame 280 may be lowered until the ply carrier 450 is several inches above the cap contour 244 of the hat form tool 224. The stomp foot actuators 312 may be retracted and the stomp feet 310 may be positioned above and in non-contacting relation to the generally planar ply carrier 450. The forming beams 502 on the opposite sides of the stomp beam 302 may be positioned at their inboard limit. In addition, the forming actuator of each forming module 520 may be retracted such that the nosepieces 552 are positioned immediately above and in non-contacting relation to the ply carrier 450.

Figure 54:
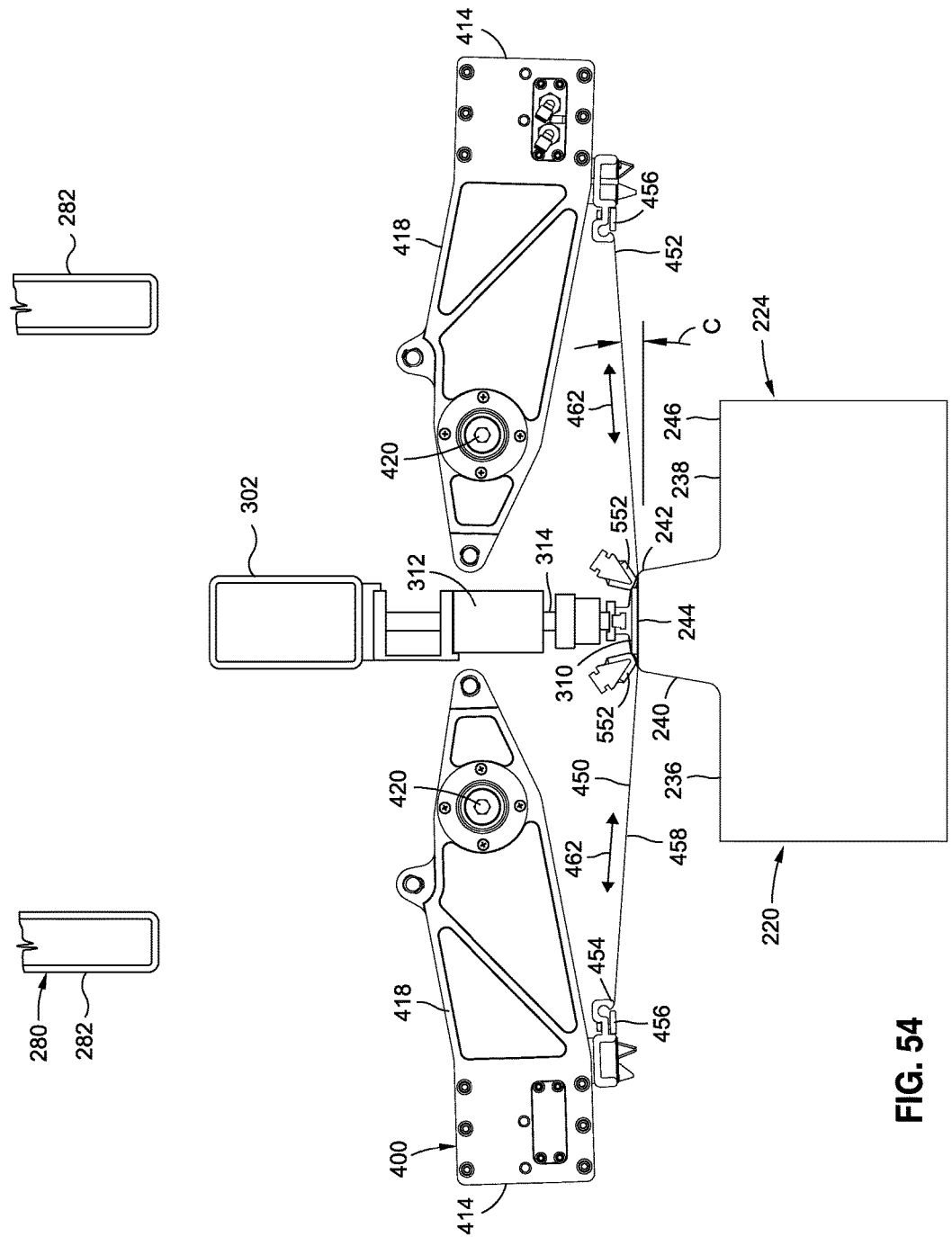
FIG. 54 is an end view of the stringer forming apparatus of FIG. 53 showing the stomp foot actuators capturing the ply carrier against the hat form tool and the nosepieces extended into contact with the ply carrier.

FIG. 54 is an end view of the stringer forming apparatus 200 of FIG. 53 showing the extension of the stomp foot actuators 312 and the lowering of the chord frame 280 causing the stomp feet 310 to stomp the ply carrier 450 onto the cap contour 244 of the hat form tool 224. As indicated above, the stomp system 300 may include one or more position sensors in the stomp foot actuators 312 to provide an indication of when the final stomp foot actuator 312 has contacted the form tool 224. In this regard, the final stomp foot actuator 312 may send a signal to the Z actuators 288 to stop vertically lowering the chord frame 280. The clamping of the ply carrier 450 onto the form tool 224 may lock the lateral position of the ply carrier 450 and may also compact the material layer 458 against the cap contour 244 of the hat form tool 224. Once the ply carrier 450 is clamped to the form tool 224 by the stomp foot actuators 312, the forming module actuators 530 may be extended causing the nosepieces 552 to contact the ply carrier 450 against the form tool 224 on opposite sides of the stomp feet 310.

During the stomping step, the rotational counterbalance cylinders 412 of the tension management system 400 may counterbalance the mass of the tension arms 414 and thereby allow the rotational position actuators 410 to sense and maintain the lateral tension 462 on each side of the ply carrier 450 within a predetermined range. In addition, the rotational position actuators 410 may be operated in a manner to control the ply carrier angle C on each side of the ply carrier 450 to prevent the ply carrier 450 from contacting the form tool 224. In the example shown, each side of the ply carrier 450 may be oriented at a relatively shallow ply carrier angle C (e.g., less than 15°) relative to horizontal.

Figure 55:
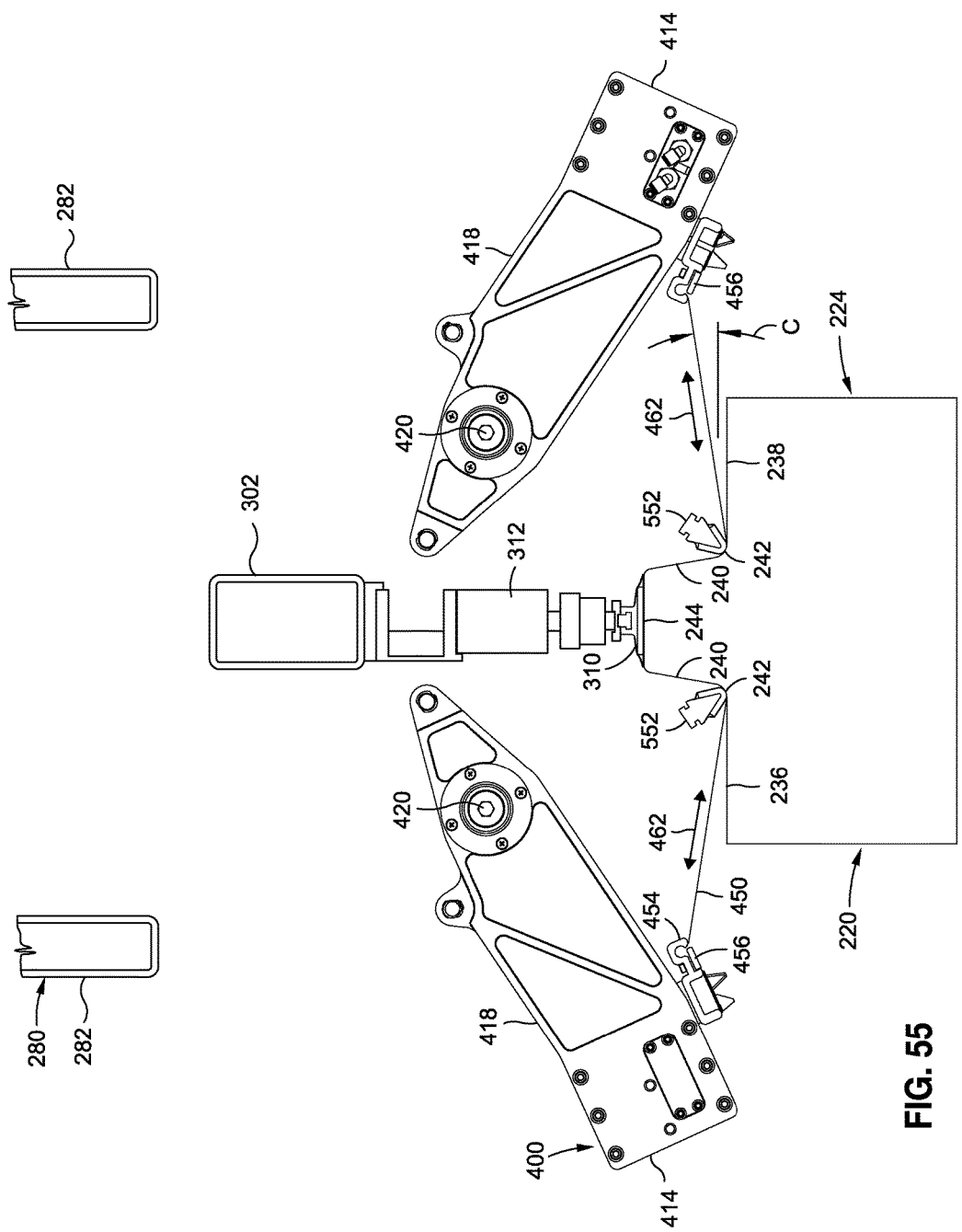
FIG. 55 is an end view of the stringer forming apparatus of FIG. 53 after forming the ply carrier to the web contours on opposite sides of the hat form tool and showing the nosepieces having reached the inner radius on each side of the hat form tool.

FIG. 55 is an end view of the stringer forming apparatus 200 of FIG. 53 after the nosepieces 552 have formed the ply carrier 450 around the radius 242 on each side of the cap contour 244. As indicated above, the forming module actuators 530 and the cross beam actuators 519 may cooperate to move the array of forming module actuators 530 on each side of the stomp beam 302 in a manner causing the array of nosepieces 552 to laterally sweep the ply carrier 450 against the form tool contour 236. As indicated above, the forming module actuators 530 may be preprogrammed to follow the contour of the form tool 224 such that the nosepieces 552 passively apply compaction pressure onto the ply carrier 450 against the form tool contour 236. In another embodiment, one or more of the forming module actuators 530 may include the capability for sensing compaction pressure of the nosepieces 552 onto the ply carrier 450. For example, one or more of the forming module actuators 530 may include position feedback to allow the forming module actuators 530 to sense the force on the nosepieces 552 and adjust the forming module actuators to maintain the compaction pressure of the nosepieces 552 within a predetermined range. In one example, the forming module actuators 530 may be configured similar to the vertical force cylinders 532 described above.

FIG. 55 illustrates the nosepieces 552 conforming the ply carrier 450 to the inner radii on each side of the hat form tool 224. The pivot points 420 of the tension arms 414 may be maintained in the same vertical position as in FIG. 54, and the rotational position actuators 410 may rotate the tension arms 414 downwardly to maintain the lateral tension 462 within the predetermined range. In addition, the rotational position actuators 410 may control the position of the tension arms 414 to control the ply carrier angle C in a manner preventing each side of the ply carrier 450 from contacting the form tool contour 236.

Figure 56:
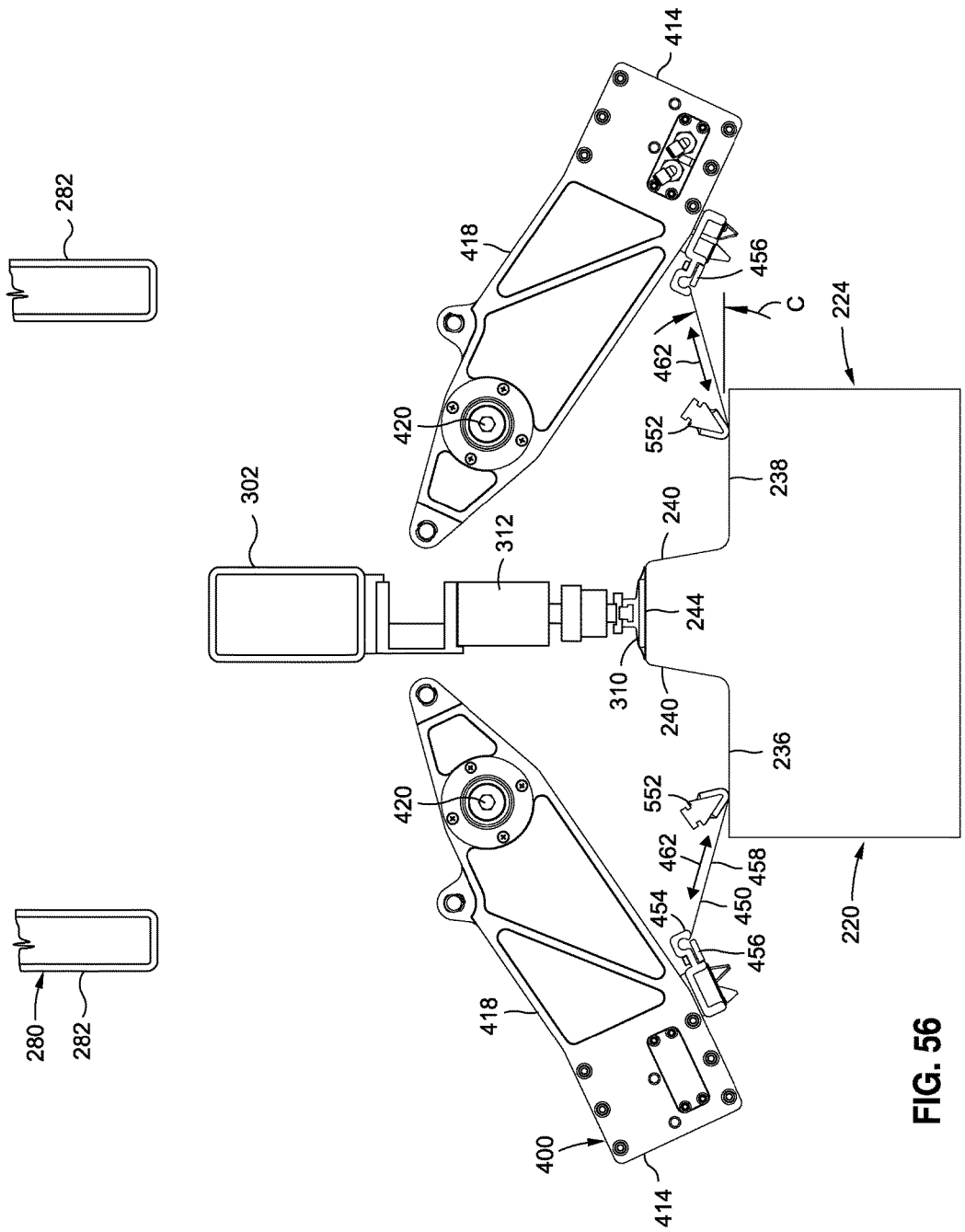
FIG. 56 is an end view of the stringer forming apparatus of FIG. 53 after the nosepieces have formed the ply carrier to the flange contours on opposite sides of the hat form tool.

FIG. 56 is an end view of the stringer forming apparatus 200 of FIG. 53 after the nosepieces 552 have formed the ply carrier 450 to the flange contours 238 on opposite sides of the hat form tool 224. The pivot points 420 of the tension arms 414 may be maintained in the same vertical position as in FIG. 55, and the rotational position actuators 410 may rotate the tension arms 414 downwardly as the lateral width of the ply carrier 450 on each side the form tool 224 is consumed as the material layer 458 is adhered to the form tool 224 or to a previously-applied material layer 458. In addition, the tension arms 414 may be pivoted about the pivot points 420 such that each side of the ply carrier 450 is oriented at an upward ply carrier angle C relative to horizontal such that lateral tension 462 on each side of the ply carrier 450 is slightly upward.

Advantageously, the rotational counterbalance cylinders 412 may balance the mass of the tension arms 414 for the rotational position actuators 410 in a manner allowing the rotational position actuators 410 to maintain the lateral tension 462 above a predetermined minimum to avoid the formation of pleats or wrinkles in the material layer 458 as may otherwise occur if insufficient lateral tension 462 were maintained in the ply carrier 450. In addition, the rotational position actuators 410 may maintain lateral tension 462 below a predetermined maximum to prevent premature separation of the material layer 458 from the ply carrier 450 as may otherwise occur if excessive lateral tension 462 were applied to the ply carrier 450. As indicated above, the range of lateral pressure on the ply carrier may be dependent upon the material system, the fiber orientation of the composite layer being applied to the form tool, and other factors.

Figure 57:
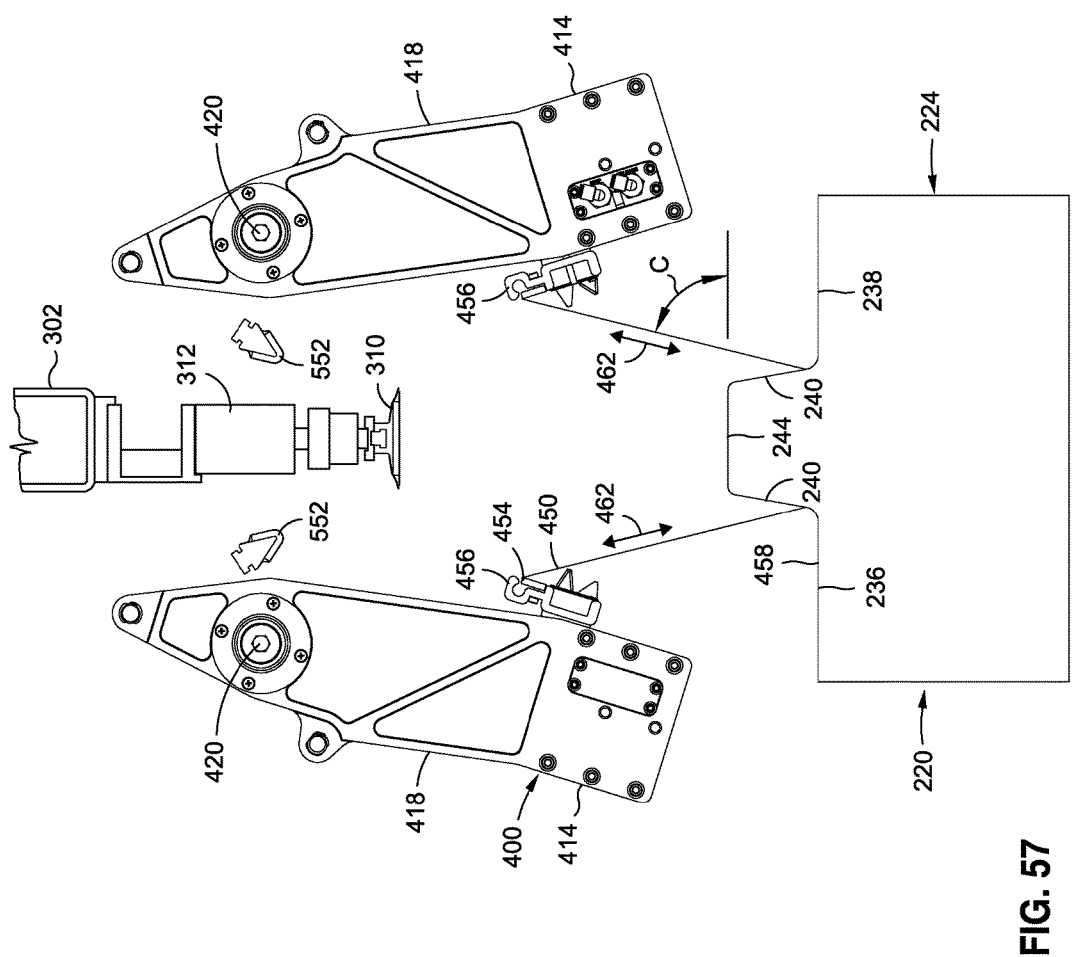
FIG. 57 is an end view of the stringer forming apparatus of FIG. 53 showing the tension arms rotated and translated upwardly causing the ply carrier to peel away from the hat form tool.

FIG. 57 is an end view of the stringer forming apparatus 200 of FIG. 53 showing the peeling of the ply carrier 450 away from the form tool 224 in a manner such that the material layer 458 remains on the form tool 224. As can be seen, the array of nosepieces 552 may be retracted from the form tool 224 such as by retracting the forming module actuators 530. In addition, the chord frame 280 may be translated vertically upwardly such as by actuating the Z actuators 288 (FIG. 8), and causing the stomp feet 310 to de-clamp from the cap contour 244 of the form tool 224 and move vertically upwardly. Simultaneously as the chord frame 280 is moved upwardly, the tension arms 414 on each side of the form tool 224 may be rotated downwardly causing the ply carrier 450 to peel away from the hat form tool 224 and leaving the material layer 458 on the form tool 224. As indicated above, the rotational position actuators 410 may position the tension arms 414 to maintain the lateral tension 462 on each side of the ply carrier 450 within a predetermined range during the ply carrier peeling process to avoid excessive lateral tension 462 that may otherwise pull the material layer 458 off of the form tool 224. In addition, the position of the tension arms 414 may be controlled in a manner to maintain each side of the ply carrier 450 at a predetermined ply carrier angle C throughout the peeling process to avoid pulling the material layer 458 off of the form tool 224 as may otherwise occur if the ply carrier 450 were oriented perpendicular to the instant location where the ply carrier 450 is being peeled.

Figure 58:
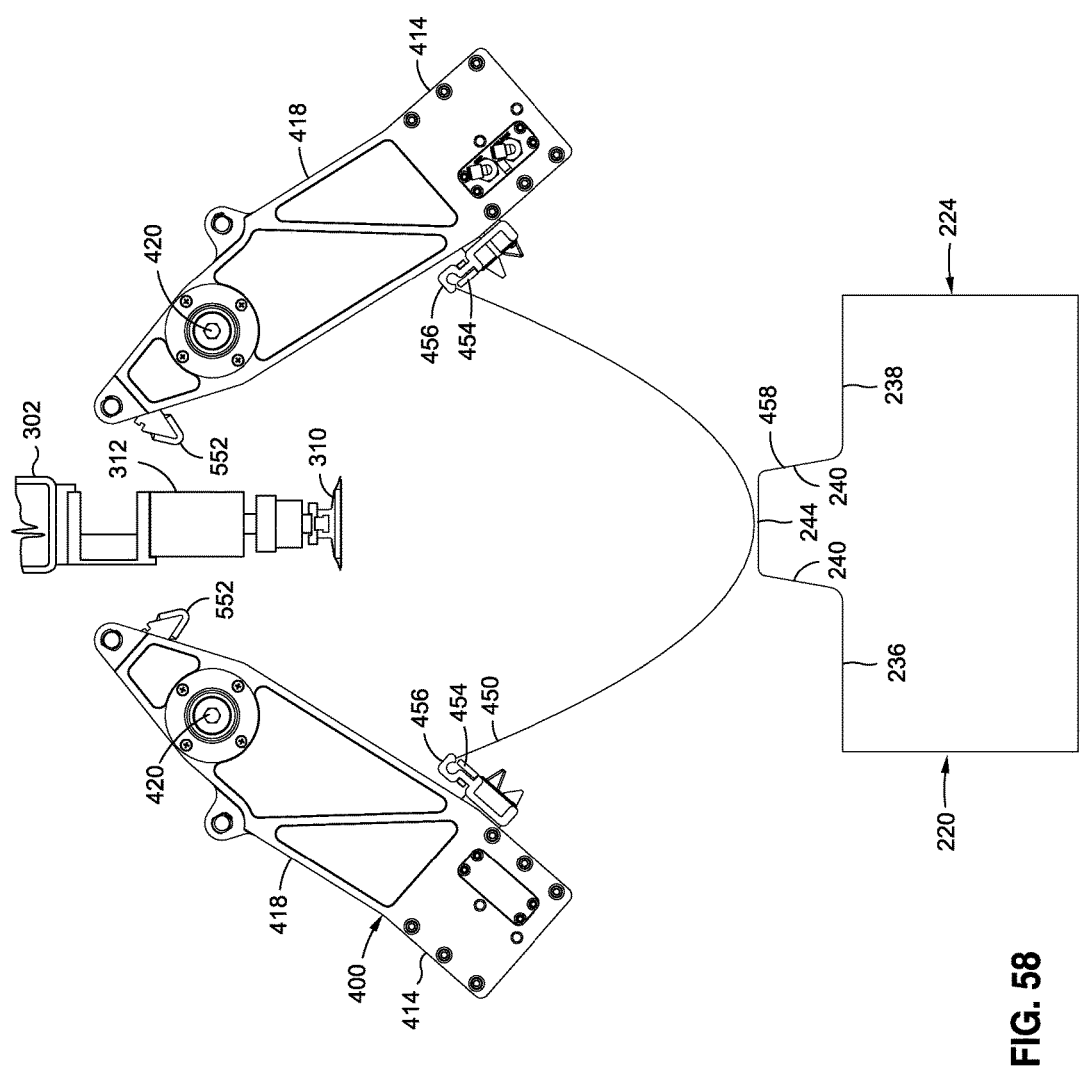
FIG. 58 is an end view of the stringer forming apparatus of FIG. 53 showing the ply carrier peeled away from the hat form tool.

FIG. 58 is an end view of the stringer forming apparatus 200 of FIG. 53 showing the ply carrier 450 after peeling away from the hat form tool 224. The tension arms 414 may be rotated back to the position shown in FIG. 53. The chord frame 280 may be raised to provide clearance with the form tool 224. In addition, the chord frame 280 may be rotated back to a pitch angle B of 0° relative to horizontal to place the ply carrier 450 in a carrier exchange position. The stringer forming apparatus 200 may be moved to the next spanwise position along the form tool 224 and the empty ply carrier 450 may be removed from the tension arms 414 and replaced with a new ply carrier 450 supporting a new material layer 458. The above-described process may be repeated to apply the new material layer 458 at the new spanwise position on the form tool 224.

The above-described examples of the stringer forming apparatuses 200 (FIGS. 8 and 49) and methods advantageously provide a means for automatically laying up one or more material layers or composite plies over a form tool 220 (FIGS. 34 and 53) of relatively long length in a cost-effective manner and with minimal human intervention. Addition, the stringer forming apparatuses 200 and methods may allow for forming stringers of any configuration including stringers (FIG. 45) and hat stringers (FIG. 48) at high production rates and with a high degree of accuracy and consistency. The stringer forming apparatuses 200 may be adaptable for a wide variety of form tool geometries, and are not limited to blade form tools (FIG. 34) and hat form tools (FIG. 53). Furthermore, the stringer forming apparatuses 200 may accommodate variations in contour along the spanwise direction 226 and/or along the lateral direction 230 of a form tool 220.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An apparatus for forming a material layer onto a form tool, comprising:
at least one nosepiece configured to laterally sweep a ply carrier onto a form tool contour by moving laterally relative to the ply carrier while conforming the ply carrier and the material layer to the form tool contour;
a pair of tension arms configured to support opposing lateral sides of the ply carrier having the material layer mounted to a lower surface thereof;
one or more actuators configured to position the tension arms during forming of the ply carrier to the form tool contour;
wherein each tension arm is configured to apply tension to the ply carrier within a region limited to between the lateral side supported by the tension arm and the nosepiece nearest the tension arm; and
the one or more actuators being configured to sense and control lateral tension applied by the tension arms to corresponding regions of the ply carrier during forming of the ply carrier to the form tool contour.

2. The apparatus of claim 1, wherein the actuators of the tension arms include:
a tension arm vertical position actuator operative to translate at least one of the tension arms and sense lateral tension in the ply carrier.

3. The apparatus of claim 2, further including:
a vertical counterbalance cylinder operative to counterbalance a mass of the tension arm during translation in such a manner allowing the tension arm vertical position actuator to sense and maintain lateral tension in the ply carrier within a predetermined range.

4. The apparatus of claim 1, wherein the actuators of the tension arms include:
a rotational position actuator operative to adjust an angular position of the tension arms and sense lateral tension in the ply carrier.

5. The apparatus of claim 4, further including at least one of:
a rotational counterbalance cylinder operative to counterbalance a mass of the tension arm during pivoting in such a manner allowing the rotational position actuator to sense and maintain lateral tension in the ply carrier within a predetermined range.

6. The apparatus of claim 1, further including:
a chord frame having opposing ends and supporting the tension arms; and
one or more Z actuators at each end of the chord frame operative to adjust a pitch angle of the chord frame relative to the form tool.

7. The apparatus of claim 1, further including:
at least one stomp foot actuator operative to clamp the ply carrier to the form tool.

8. The apparatus of claim 7, further including:
a stomp beam coupled to a chord frame and supporting the stomp foot actuator; and
at least one stomp beam actuator configured to vertically position the stomp beam relative to the chord frame.

9. The apparatus of claim 1, further including:
one or more forming module actuators configured to sense and control compaction pressure applied by the nosepiece onto the ply carrier.

10. The apparatus of claim 1, further including:
a pair of forming beams coupled to a chord frame and supporting an array of forming modules each having a nosepiece; and
a pair of forming Z' actuators and a pair of forming Y actuators at each of opposing ends of each one of the forming beams and configured to translate the forming beams relative to the chord frame.

11. The apparatus of claim 1, wherein:
the ply carrier has a higher degree of elasticity along a lengthwise direction of the form tool than along a lateral direction.

12. A stringer forming apparatus for laying up a course of composite material on a form tool, comprising:
a tension management system, including:
a pair of tension arms configured to support opposing lateral sides of a ply carrier having the course mounted thereto;
one or more actuators configured to sense and control lateral tension in the ply carrier during forming to a form tool contour;
a stomp system, including:
an array of stomp foot actuators configured to clamp the ply carrier onto the form tool;
a forming system, including:
an array of forming modules each including a nosepiece configured to form the ply carrier to the form tool contour by moving laterally relative to the ply carrier while conforming the ply carrier and course to the form tool contour, each forming module configured to sense and control compaction pressure applied by the nosepiece onto the ply carrier;
wherein each tension arm is configured to apply tension to the ply carrier within a region limited to between the lateral side supported by the tension arm and the nosepieces located on a side of the array of stomp foot actuators nearest the tension arm; and
the one or more actuators being configured to sense and control lateral tension applied by the tension arms to corresponding regions of the ply carrier during forming of the ply carrier to the form tool contour.

13. A method of laying up a material layer, comprising the steps of:
positioning a ply carrier over a form tool, the ply carrier having a material layer mounted to a lower surface of the ply carrier;
conforming the ply carrier to a form tool contour by laterally sweeping a nosepiece relative to the ply carrier;
supporting the ply carrier on opposing lateral sides using a pair of tension arms; and
maintaining lateral tension in the ply carrier within a predetermined range in a region of the ply carrier limited to between the nosepiece and one of the lateral sides during the conforming of the ply carrier to the form tool contour.

14. The method of claim 13, wherein the step of maintaining lateral tension in the ply carrier comprises:
positioning the tension arms using one or more actuators;
counterbalancing a mass of the tensions arms;
sensing, using the one or more actuators, the lateral tension in the ply carrier based on force remaining on the tension arms after counterbalancing the mass; and
adjusting, using the one or more actuators, the position of the tension arms in such a manner to maintain the lateral tension with the predetermined range.

15. The method of claim 13, further including the step of:
peeling the ply carrier away from the form tool.

16. The method of claim 15, wherein the step of peeling the ply carrier includes:
sensing and maintaining lateral tension in the ply carrier within a predetermined range during the peeling of the ply carrier.

17. The method of claim 13, wherein the step of conforming the ply carrier includes:
laterally sweeping the nosepiece across the form tool.

18. The method of claim 17, wherein the step of laterally sweeping the nosepiece includes:
compacting the ply carrier and material layer against the form tool during sweeping of the nosepiece.

19. The method of claim 18, wherein the step of compacting the ply carrier and material layer includes:
sensing and maintaining, using at least one of a forming module actuator and a cylinder, compaction pressure of the nosepiece on the ply carrier within a predetermined range.

20. The method of claim 13, further including:
stomping the ply carrier onto the form tool prior to conforming the ply carrier to the form tool contour.

21. The method of claim 13, wherein the step of positioning the ply carrier includes:
adjusting a pitch angle of the ply carrier to be complementary to a local chord angle of the form tool prior to conforming the ply carrier to the form tool contour.

* * * * *